US012496971B2

(12) United States Patent
Ng et al.

(10) Patent No.: US 12,496,971 B2
(45) Date of Patent: Dec. 16, 2025

(54) SYSTEMS AND METHODS FOR WORK VEHICLES

(71) Applicant: Kubota Corporation, Osaka (JP)

(72) Inventors: Pius Ng, Fremont, CA (US); Shan Wan, Fremont, CA (US); Kotaro Shimada, Fremont, CA (US); Shankar Radhakrishnan, Fremont, CA (US); William Ng, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 173 days.

(21) Appl. No.: 18/368,869

(22) Filed: Sep. 15, 2023

(65) Prior Publication Data

US 2025/0091514 A1 Mar. 20, 2025

(51) Int. Cl.
*B60R 1/23* (2022.01)
*A01B 69/04* (2006.01)
*G01C 21/36* (2006.01)
*G05D 1/00* (2006.01)
*A01G 3/08* (2006.01)

(52) U.S. Cl.
CPC .............. *B60R 1/23* (2022.01); *A01B 69/008* (2013.01); *G01C 21/3667* (2013.01); *G01C 21/3697* (2013.01); *G05D 1/0212* (2013.01); *A01G 3/08* (2013.01); *B60R 2300/207* (2013.01)

(58) Field of Classification Search
CPC ... B60R 1/23; B60R 2300/207; A01B 69/008; A01B 69/001; A01B 79/005; G01C 21/3667; G01C 21/3697; G05D 1/0212; A01G 3/08

See application file for complete search history.

(56) References Cited

U.S. PATENT DOCUMENTS

| | | | | |
|---|---|---|---|---|
| 12,201,044 | B2 * | 1/2025 | Palomares | A01B 69/008 |
| 2021/0105995 | A1 * | 4/2021 | Palomares | A01B 39/18 |
| 2021/0123728 | A1 * | 4/2021 | Smith | A01B 15/16 |
| 2021/0149406 | A1 * | 5/2021 | Javault | A01C 21/005 |
| 2021/0176909 | A1 * | 6/2021 | Foster | A01B 79/005 |

(Continued)

FOREIGN PATENT DOCUMENTS

| | | |
|---|---|---|
| EP | 4163860 A1 | 4/2023 |
| JP | 2020089345 A | 6/2020 |

(Continued)

OTHER PUBLICATIONS

Machine translation for JP2022114352A, Aug. 5, 2022, Sasaki Koji.*

(Continued)

*Primary Examiner* — Abdalla A Khaled
(74) *Attorney, Agent, or Firm* — Keating & Bennett, LLP

(57) ABSTRACT

A method includes selecting a registered route of a work vehicle system, the registered route including one or more task points each of which including a geographical location, capturing first data of an agricultural item before a particular agricultural task is performed by a work vehicle at a particular task point of the one or more task points, capturing second data of the agricultural item after the particular agricultural task is performed at the particular task point, and displaying the first data of the agricultural item and the second data of the agricultural item on a display.

19 Claims, 32 Drawing Sheets

(56) References Cited

U.S. PATENT DOCUMENTS

| | | | |
|---|---|---|---|
| 2021/0185886 A1* | 6/2021 | Sibley | G05D 1/0274 |
| 2021/0192211 A1* | 6/2021 | Sibley | A01B 69/004 |
| 2021/0272255 A1* | 9/2021 | Barrick | G06V 20/188 |
| 2022/0058770 A1* | 2/2022 | Peake | A01B 63/002 |
| 2022/0132723 A1* | 5/2022 | Anderson | B60W 60/0011 |
| | | | 701/25 |
| 2022/0212602 A1* | 7/2022 | Watanabe | B60R 11/04 |
| 2022/0377962 A1* | 12/2022 | Susko | G05D 1/0246 |
| 2023/0107444 A1* | 4/2023 | Anderson | A01D 41/127 |
| | | | 382/110 |
| 2023/0114806 A1* | 4/2023 | Nishii | G06Q 50/02 |
| | | | 701/50 |
| 2023/0165181 A1* | 6/2023 | Scheiner | A01M 7/0089 |
| | | | 47/1.41 |
| 2023/0196761 A1* | 6/2023 | Swanson | G01C 21/3826 |
| 2023/0320274 A1* | 10/2023 | Vandike | G06V 20/56 |
| | | | 701/50 |
| 2023/0322423 A1 | 10/2023 | Kinoshita et al. | |
| 2024/0057504 A1* | 2/2024 | Glovier | A01B 79/005 |
| 2024/0057505 A1* | 2/2024 | Liu | A01B 79/005 |
| 2024/0303839 A1* | 9/2024 | Herman | G06V 20/188 |
| 2025/0091515 A1* | 3/2025 | Ng | B60K 35/28 |

FOREIGN PATENT DOCUMENTS

| | | | |
|---|---|---|---|
| JP | 2022114352 A | * | 8/2022 |
| WO | 2022145410 A1 | | 7/2022 |

OTHER PUBLICATIONS

Official Communication issued in International Patent Application No. PCT/JP2024/031212, mailed on Nov. 19, 2024, 9 pages.

* cited by examiner

SYSTEMS AND METHODS FOR WORK VEHICLES

BACKGROUND

1. Field of the Invention

The present invention relates to systems and methods which can be used to register routes that can be used by a plurality of vehicles to perform a variety of tasks. More specifically, the present invention relates to systems and methods which can be used to register routes for autonomous vehicles.

2. Description of the Related Art

Conventional systems and methods for controlling autonomous vehicles typically require extensive setup and calibration time. Further, the routing of autonomous vehicles in conventional systems often must be performed using a very cumbersome programming process which requires that a specific autonomous vehicle may only use a route if the route was registered using the specific autonomous vehicle. Accordingly, conventional systems and methods for controlling autonomous vehicles are inefficient and difficult to operate.

SUMMARY OF THE INVENTION

Preferred embodiments of the present invention provide systems and methods to register routes that can be used by autonomous vehicles to perform a variety of tasks.

A method according to a preferred embodiment of the present invention includes selecting a registered route of a work vehicle system, the registered route including one or more task points each of which including a geographical location, capturing first data of an agricultural item before a particular agricultural task is performed by a work vehicle at a particular task point of the one or more task points, capturing second data of the agricultural item after the particular agricultural task is performed at the particular task point, and displaying the first data of the agricultural item and the second data of the agricultural item on a display.

In a preferred embodiment of the present invention, the particular agricultural task includes pruning the agricultural item.

In a preferred embodiment of the present invention, the first data of the agricultural item includes first image data of the agricultural item before the particular agricultural task is performed at the particular task point, and the second data of the agricultural item includes second image data of the agricultural item after the particular agricultural task is performed at the particular task point.

In a preferred embodiment of the present invention, the first data of the agricultural item includes first three-dimensional data of the agricultural item before the particular agricultural task is performed at the particular task point, and the second data of the agricultural item includes second three-dimensional data of the agricultural item after the particular agricultural task is performed at the particular task point.

In a preferred embodiment of the present invention, the method further includes capturing third data of the agricultural item during the particular agricultural task being performed at the particular task point.

In a preferred embodiment of the present invention, the third data of the agricultural item includes image data of the agricultural item and/or three-dimensional data of the agricultural item.

In a preferred embodiment of the present invention, the method further includes selecting the particular agricultural task for the work vehicle to perform at the one or more task points when the work vehicle follows the registered route.

In a preferred embodiment of the present invention, the first data of the agricultural item and the second data of the agricultural item are displayed on a same screen of the display.

In a preferred embodiment of the present invention, the work vehicle does not move between when first data of the agricultural item is captured and when the second data of the agricultural item is captured.

In a preferred embodiment of the present invention, each of the first data of the agricultural item and the second data of the agricultural item is associated with an agricultural item identifier of the agricultural item, and the agricultural item identifier is displayed on the display when the first data of the agricultural item and the second data of the agricultural item are displayed on the display.

In a preferred embodiment of the present invention, the method further includes displaying, on the display, the second data of the agricultural item superimposed on the first data of the agricultural item.

In a preferred embodiment of the present invention, the method further includes controlling the work vehicle to stop at each of the one or more task points to perform the particular agricultural task.

In a preferred embodiment of the present invention, the method further includes registering the registered route in the work vehicle system. The registering the registered route in the work vehicle system includes controlling a route recording work vehicle to record a new route, the route recording work vehicle being the work vehicle or another work vehicle different from the work vehicle, and saving the new route as the registered route in the work vehicle system.

In a preferred embodiment of the present invention, the registering the registered route in the work vehicle system includes receiving an instruction to start recording the new route, and receiving an instruction to stop recording the new route. When the instruction to start recording the new route is received, a position of the route recording work vehicle is saved as a location of a start point of the new route, and when the instruction to stop recording the new route is received, a position of the route recording work vehicle is saved as a location of an end point of the new route.

In a preferred embodiment of the present invention, the method further includes displaying an agricultural field map including a position of the route recording work vehicle, an area surrounding the route recording work vehicle, and the location of the start point of the new route when the instruction to start recording the new route is received, and displaying an agricultural field map including a position of the route recording work vehicle, an area surrounding the route recording work vehicle, and the location of the end point of the new route when the instruction to stop recording the new route is received.

In a preferred embodiment of the present invention, the method further includes displaying an agricultural field map. The registering the registered route in the work vehicle system includes receiving an instruction to add the one or more task points to the new route, when the instruction to add the one or more task points to the new route is received, a position of the route recording work vehicle is saved as a location of the one or more task points of the new route, the agricultural field map includes a position of the route recording work vehicle, an area surrounding the route recording work vehicle, and the location of the one or more task points, and the agricultural field map is displayed when the instruction to add the one or more task points to the new route is received.

In a preferred embodiment of the present invention, the controlling the route recording work vehicle to record the new route includes manually, remotely, or autonomously controlling the route recording work vehicle.

In a preferred embodiment of the present invention, the method further includes registering the registered route in the work vehicle system, and the registering the registered route in the work vehicle system includes adding the one or more task points to the registered route using at least one of artificial intelligence or an object detection system.

In a preferred embodiment of the present invention, the method further includes registering the registered route in the work vehicle system, and the registering the registered route in the work vehicle system includes adding the one or more task points to the registered route using a user interface.

A work vehicle system according to a preferred embodiment of the present invention includes a user interface including an input to receive one or more inputs from a user, a display, and a processor operatively connected to the input and the display. The processor is configured or programmed to select, based on the one or more inputs received by the input, a registered route of the work vehicle system, the registered route including one or more task points each of which including a geographical location; receive first data of an agricultural item before a particular agricultural task is performed by a work vehicle at a particular task point of the one or more task points; receive second data of the agricultural item after the particular agricultural task is performed at the particular task point; and control the display to display the first data of the agricultural item and the second data of the agricultural item.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Figure 1:
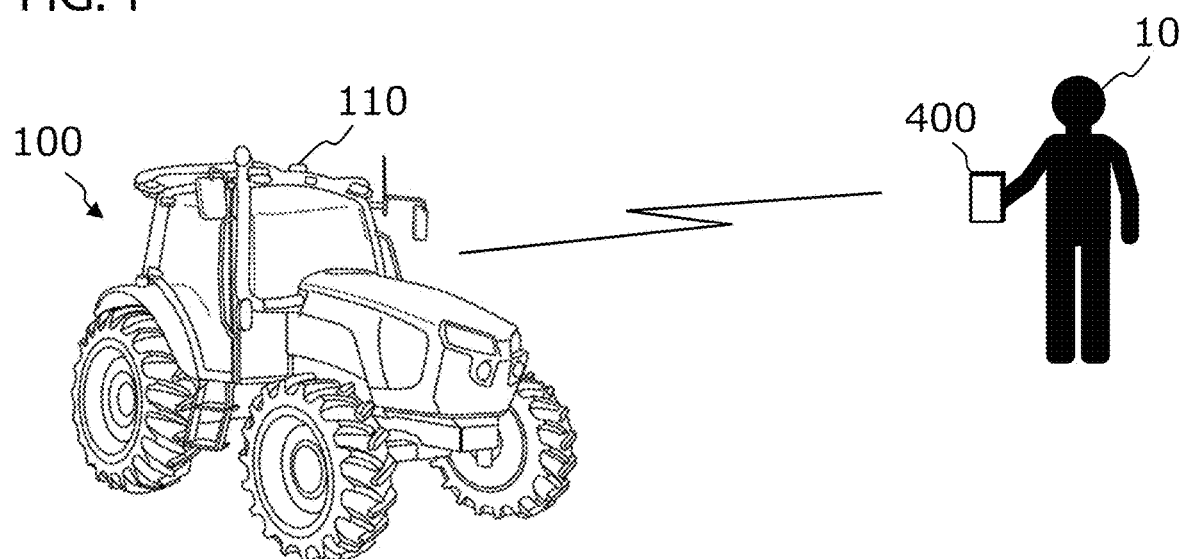
FIG. 1 is a diagram for describing an overview of an autonomous work vehicle system according to a preferred embodiment of the present invention.

FIG. 1 is a diagram for describing an overview of a work vehicle system according to a preferred embodiment of the present disclosure. FIG. 1 illustrates a work vehicle 100 and a terminal 400 defining a user interface for use by a user 10. The work vehicle 100 can include an agricultural machine such as a tractor, harvester, rice transplanter, vehicle for crop management, vegetable trans-planter, mower, seeder, spreader, and mobile robot for agriculture or other agricultural machines. In the present preferred embodiment shown in FIG. 1, the work vehicle 100 is a tractor. The work vehicle 100 can have an implement attached to its rear and/or its front. While performing agricultural work according to the particular type of implement, the work vehicle is able to automatically or autonomously travel within a field. The agricultural work to be performed in the present preferred embodiment may be any task including, for example, pruning of an agricultural item, imaging of an agricultural item, tilling, seeding, planting of crops, spraying, harvesting, or other agricultural work. The techniques according to the present preferred embodiment and any subsequent preferred embodiment are similarly applicable to agricultural machines other than tractors.

The work vehicle 100 has a self-driving function. In other words, the work vehicle 100 can travel by the action of a controller, rather than manually. As discussed in more detail below, a controller according to the present preferred embodiment is provided inside the work vehicle 100, and is able to control the speed, steering and/or other functions or operations of the work vehicle 100. A portion or an entirety of the controller may reside outside the work vehicle. For example, control signals, commands, data, etc., may be communicated between the work vehicle 100 and a controller residing outside the work vehicle 100.

The work vehicle 100 that performs self-driving may move autonomously while sensing the surrounding environment, without any person being involved in the controlling of the movement or other operations of the work vehicle 100, and can perform autonomous movement to travel within a field or outside a field (e.g., on roads) in an unmanned manner. During autonomous movement, operations of detecting and avoiding obstacles may be performed. As discussed in more detail below, the work vehicle 100 that performs self-driving can also have the function of moving partly based on the user's instructions. For example, the work vehicle 100 can operate not only in a self-driving mode but also in a manual driving mode, where the work vehicle moves through manual operations of the user/driver.

The work vehicle 100 includes a positioning device 110 such as a GNSS receiver. Based on the position of the work vehicle 100 as identified by the positioning device 110 and a target path previously stored in a storage device, the controller causes the work vehicle 100 to automatically travel. In addition to controlling the travel of the work vehicle 100, the controller can also control the operation of the implement. As a result, while automatically traveling, the work vehicle 100 can perform a task or work using the implement.

The terminal 400 may be a mobile apparatus such as a smartphone, a tablet computer, a remote control, or a stationary computer such as a desktop personal computer (PC). The terminal 400 can be used by a user 10 who is in a field in which the work vehicle 100 performs agricultural work, or at a remote location from the field in which the work vehicle performs agricultural work. In response to a manipulation by the user 10, the terminal 400 can transmit command signals to the work vehicle 100.

In a preferred embodiment of the present invention, the work vehicle 100 includes a processing unit (also referred to as a "processor" or "path generating device") to generate a target path along which the work vehicle 100 moves. The path generating device generates the target path P along which the work vehicle 100 travels when performing tasks within the field. Based on the information entered by the user and map information stored in the storage device, the path generating device generates the target path P. The controller controls a drive device (e.g., a steering device, a transmission, and a power unit) of the work vehicle 100 along the generated target path P. As a result, the work vehicle 100 automatically moves along the target path P.

Hereinafter, more specific examples of the configuration and operation of a system according to the present preferred embodiment will be described.

Figure 2:
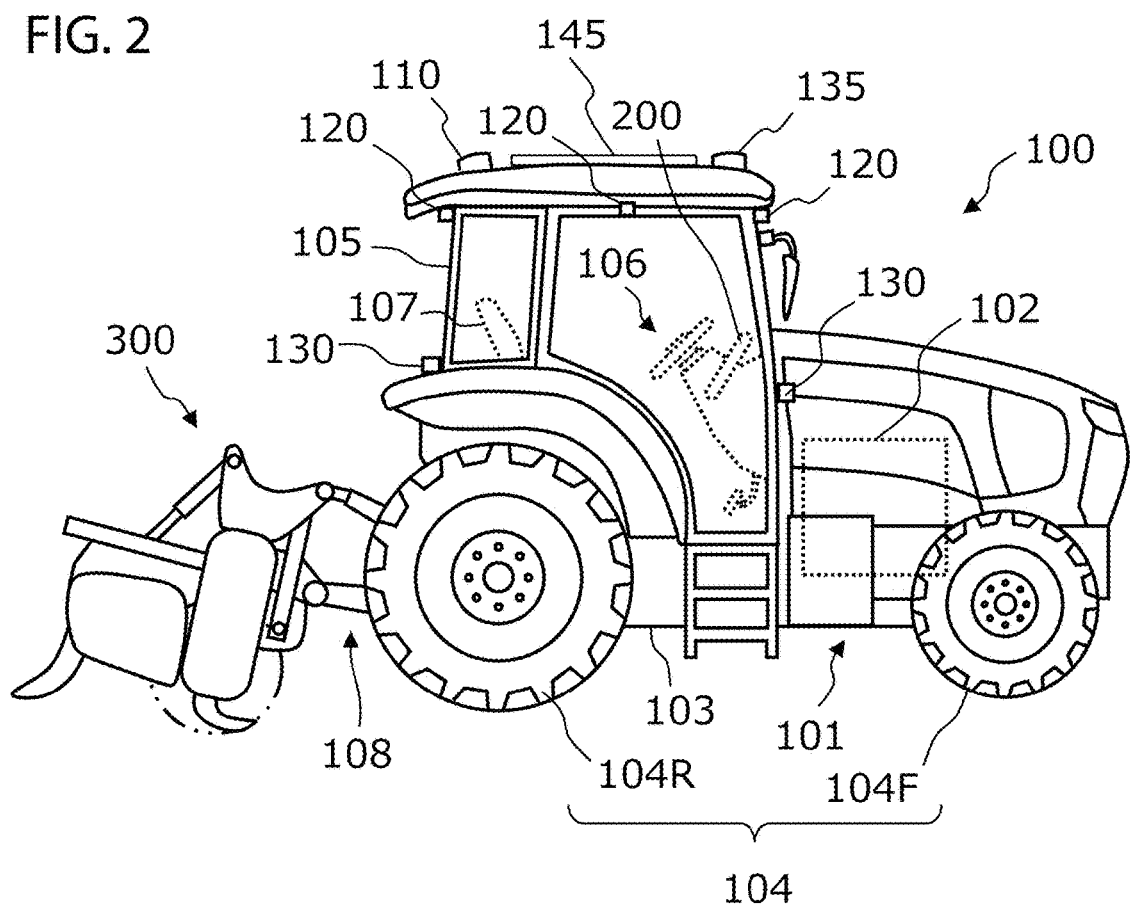
FIG. 2 is a side view schematically showing a work vehicle and an implement attached to the work vehicle.

FIG. 2 is a side view schematically showing the work vehicle 100 and an example implement 300 that is linked to the work vehicle 100. The work vehicle 100 according to the present preferred embodiment functions in both a manual driving mode and a self-driving mode. In the self-driving mode, the work vehicle 100 is able to perform unmanned travel and autonomous operation.

As shown in FIG. 2, the work vehicle 100 includes a vehicle body 101, a prime mover (engine) 102, and a transmission 103. On the vehicle body 101, tires (wheels) 104 and a cabin 105 are provided. The tires 104 include a pair of front wheels 104F and a pair of rear wheels 104R. Inside the cabin 105, a driver's seat 107, a steering device 106, an operational terminal 200, and switches for manipulation are provided. The front wheels 104F and/or the rear wheels 104R may be crawlers, rather than tires.

The work vehicle 100 shown in FIG. 2 further includes a plurality of cameras 120. The cameras 120 may be provided at the front/rear/right/left of the work vehicle 100, for example. The cameras 120 capture images of the surrounding environment of the work vehicle 100, and generate image data. The images acquired by the cameras 120 may be transmitted to a computer for monitoring purposes. For example, the images can be used to monitor the work vehicle 100 during unmanned driving.

The work vehicle 100 further includes the positioning device 110. The positioning device 110 can include a GNSS receiver. The GNSS receiver includes an antenna to receive a signal(s) from a GNSS satellite(s) and a processing circuit to determine the position of the work vehicle 100 based on the signal(s) received by the antenna. The positioning device 110 receives a GNSS signal(s) transmitted from a GNSS satellite(s), and performs positioning on the basis of the GNSS signal(s). GNSS is a general term for satellite positioning systems, such as GPS (Global Positioning System), QZSS (Quasi-Zenith Satellite System, e.g., MICHIBIKI), GLONASS, Galileo, BeiDou, and the like. Although the positioning device 110 in the present preferred embodiment is disposed above the cabin 105, it may be disposed at any other position.

Instead of or in addition to the GNSS receiver, the positioning device 110 may include any other type of device, such as a LiDar sensor 135. Additionally, the positioning device 110 may utilize the data acquired by the cameras 120 for positioning. When objects serving as characteristic points exist in the environment that is traveled by the work vehicle 100, the position of the work vehicle 100 can be estimated with a high accuracy based on data that is acquired with the LiDar sensor 135 or cameras 120 and an environment map that is previously recorded in a storage device. The LiDAR sensor 135 or cameras 120 may be used together with the GNSS receiver. By correcting or complementing position data based on the GNSS signal(s) using the data acquired by the LiDAR sensor 135 or cameras 120, it becomes possible to identify the position of the work vehicle 100 with a higher accuracy. Furthermore, the positioning device 110 may complement the position data by using a signal from an inertial measurement unit (IMU). The IMU can measure tilts and minute motions of the work vehicle 100. By complementing the position data based on the GNSS signal using the data acquired by the IMU, the positioning performance can be improved.

In a preferred embodiment of the present invention, the work vehicle 100 further includes a plurality of obstacle sensors 130. In the example shown in FIG. 2, the obstacle sensors 130 are provided at the front and the rear of the cabin 105. The obstacle sensors 130 may be disposed at other positions. For example, one or more obstacle sensors 130 may be disposed at any position selected from among the sides, the front, and the rear of the vehicle body 101, and the cabin 105. The obstacle sensors 130 may be used to detect an obstacle in the surroundings during self-traveling to come to a halt or detour around the obstacle.

The positioning device 110, the cameras 120, the obstacle sensors 130, and the LiDar sensor 135 may be disposed at other positions on the work vehicle 100, and the work vehicle 100 can include any combination of the positioning device 110, the cameras 120, the obstacle sensors 130, and the LiDAR sensor 135.

In a preferred embodiment of the present invention, a solar panel 145 may be provided at the top or any suitable location of the work vehicle 100 to generate electrical energy to be stored in a battery of the work vehicle 100. The solar powered electrical energy can be used to drive various electrical systems and components of the work vehicle 100 including an electric motor if preferably included.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force for changing the steering angle of the front wheels 104F. When automatic steering is performed, under the control of a controller disposed in the work vehicle 100, the steering angle may be automatically adjusted by the power of the hydraulic device or electric motor.

A linkage device 108 is provided at the rear of the vehicle body 101. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the work vehicle 100. The linkage device 108 is able to raise or lower the three-point link with a hydraulic device, for example, thus changing the position or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement may be connected frontward of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, a harrow, or other implement, may be connected to the work vehicle 100 for use.

Figure 3:
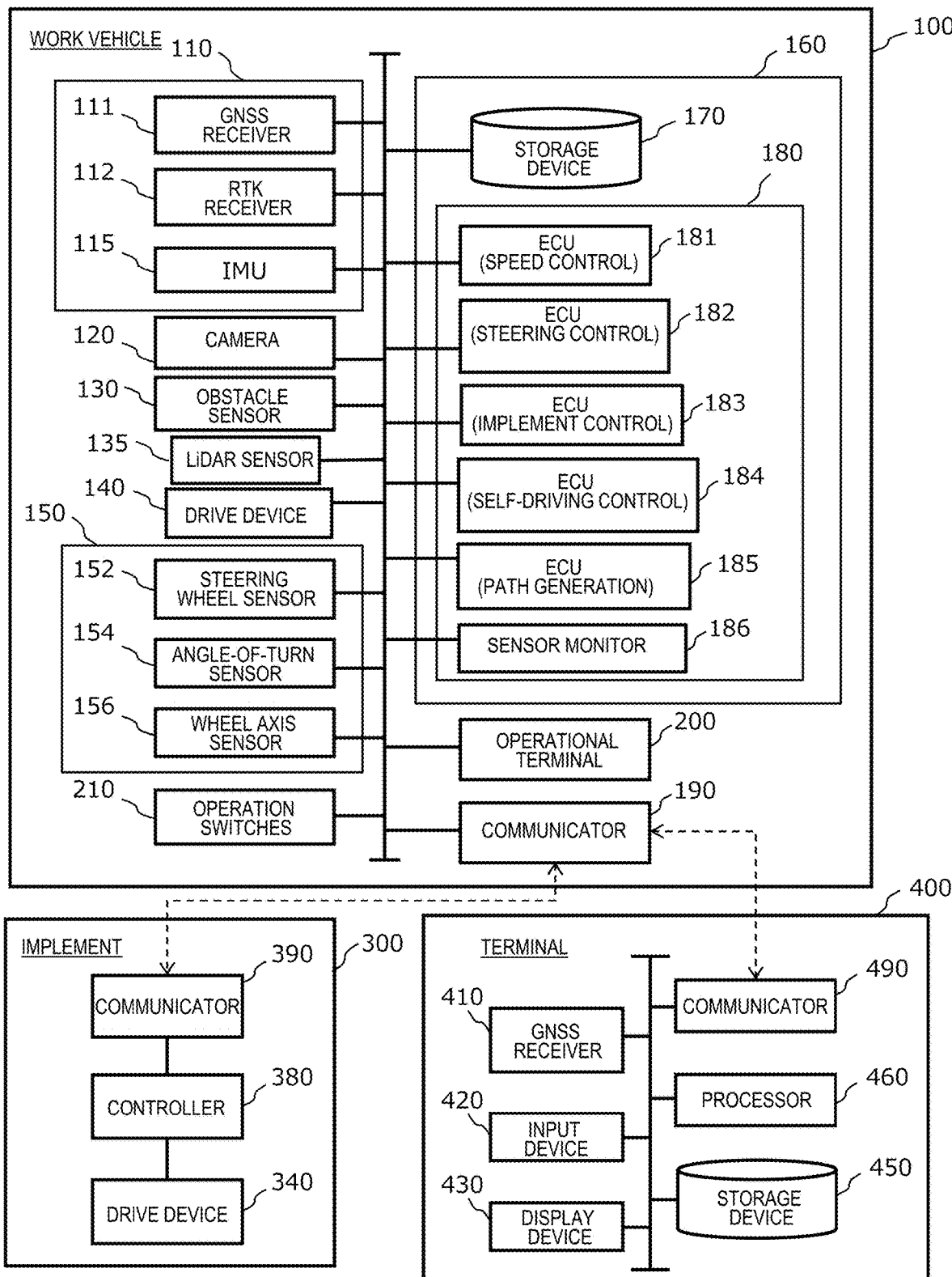
FIG. 3 is a block diagram showing an example configuration of the work vehicle, the implement, and a user terminal.

The work vehicle 100 shown in FIG. 3 is able to perform manual (human) driving, but alternatively, may only support unmanned driving. In that case, component elements which are only required for human driving, e.g., the cabin 105, the steering device 106, and the driver's seat 107 do not need to be provided in the work vehicle 100. An unmanned work vehicle 100 may travel via autonomous driving, or by remote manipulation by a user.

FIG. 3 is a block diagram showing an example configuration of the work vehicle 100, the implement 300, and the user terminal 400. The work vehicle 100 and the implement 300 can communicate with each other via a communication cable that is included in the linkage device 108. The work vehicle 100 and the user terminal 400 are able to communicate with each other via wireless communication.

In addition to the positioning device 110, the cameras 120, the obstacle sensors 130, the LIDAR sensor 135, and the operational terminal 200, the work vehicle 100 in the example of FIG. 3 includes a drive device 140, sensors 150 to detect the operating status of the work vehicle 100, a control system 160, a communicator 190, and operation switches 210. The positioning device 110 includes a GNSS receiver 111, an RTK receiver 112, and an inertial measurement unit (IMU) 115. The sensors 150 include a steering wheel sensor 152, an angle-of-turn sensor 154, and a wheel axis sensor 156. The control system 160 includes a storage device 170 and a controller 180. The controller 180 includes a plurality of electronic control units (ECU) 181 to 185 and a sensor monitor 186. The implement 300 includes a drive device 340, a controller 380, and a communicator 390. The terminal 400 includes a GNSS receiver 410, an input device 420, a display device 430, a storage device 450, a processor 460, and a communicator 490. Note that FIG. 3 shows component elements which are relatively closely related to the self-driving operation by the work vehicle 100, while other component elements are omitted from illustration.

Figure 4:
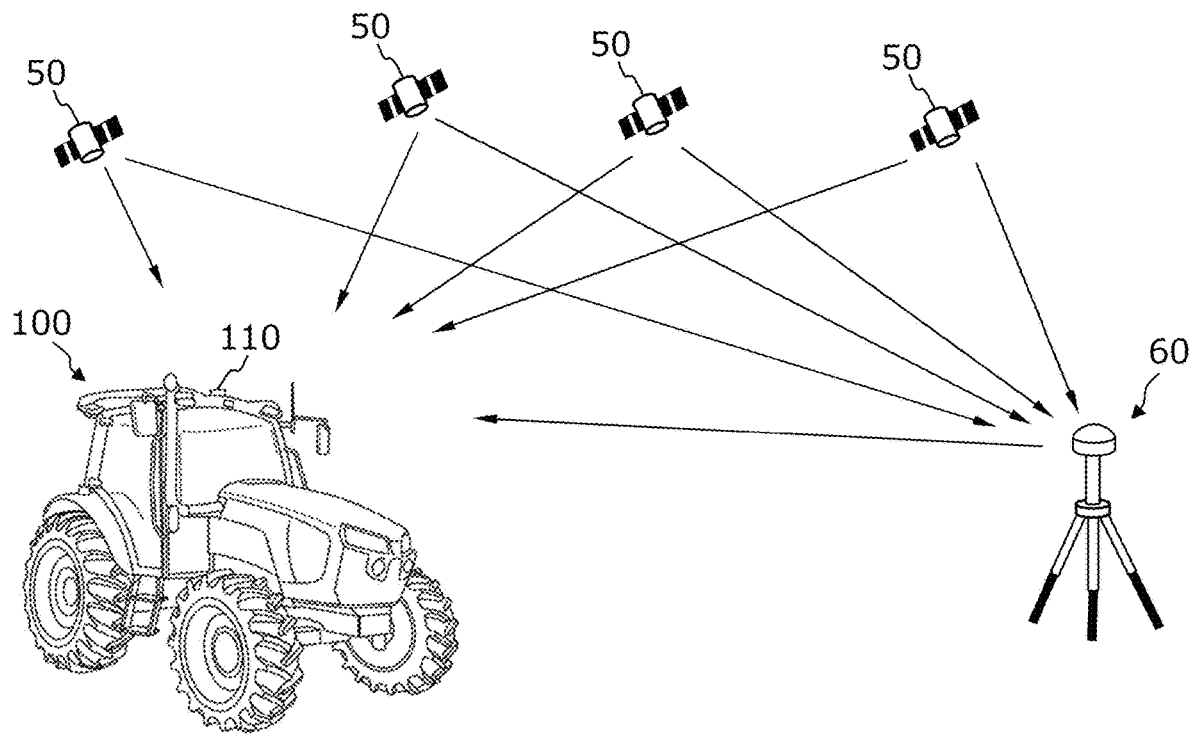
FIG. 4 is a conceptual diagram showing an example work vehicle which performs positioning based on an RTK-GNSS.

The positioning device 110 shown in FIG. 3 performs positioning of the work vehicle 100 by utilizing an RTK (Real Time Kinematic)-GNSS. FIG. 4 is a conceptual diagram showing an example of the work vehicle 100 which performs positioning based on an RTK-GNSS. In the positioning based on an RTK-GNSS, not only GNSS signals transmitted from multiple GNSS satellites 50, but also a correction signal that is transmitted from a reference station 60 is used. The reference station 60 may be disposed near the field that is traveled by the work vehicle 100 (e.g., at a position within 1 km of the work vehicle 100). The reference station 60 generates a correction signal of, e.g., an RTCM format based on the GNSS signals received from the multiple GNSS satellites 50, and transmits the correction signal to the positioning device 110. The GNSS receiver 111 in the positioning device 110 receives the GNSS signals transmitted from the multiple GNSS satellites 50. The RTK receiver 112, which includes an antenna and a modem, receives the correction signal transmitted from the reference station 60. The positioning device 110 may include a processor which calculates the position of the work vehicle 100 based on the GNSS signals and the correction signal, thus achieving positioning. Use of an RTK-GNSS enables positioning with an accuracy on the order of several cm of errors, for example. Positional information (including latitude, longitude, and altitude information) is acquired through the highly accurate positioning by an RTK-GNSS. The positioning device 110 may calculate the position of the work vehicle 100 as frequently as, e.g., one to ten times per second.

Note that the positioning method is not limited to an RTK-GNSS, and any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the positioning device 110 may lack the RTK receiver 112.

The positioning device 110 in the present preferred embodiment further includes an IMU 115. The IMU 115 includes a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the GNSS signals and the correction signal but also on a signal that is output from the IMU 115, the positioning device 110 can estimate the position and orientation of the work vehicle 100 with a higher accuracy. The signal that is output from the IMU 115 may be used for the correction or complementation of the position that is calculated based on the GNSS signals and the correction signal. The IMU 115 outputs a signal more frequently than the GNSS signals. Utilizing this highly frequent signal allows the position and orientation of the work vehicle 100 to be measured more frequently (e.g., about 10 Hz or above), Instead of the IMU 115, a 3-axis accelerometer and a 3-axis gyroscope may be separately provided. The IMU 115 may be provided as a separate device from the positioning device 110.

In addition to or instead of the GNSS receiver 111, the RTK receiver 112, and the IMU 115, the positioning device 110 may include other kinds of sensors, e.g., LiDAR sensors or image sensors. Depending on the environment that is traveled by the work vehicle 100, it is possible to estimate the position and orientation of the work vehicle 100 with a high accuracy based on data from such sensors.

In the example shown in FIG. 3, the processor of the positioning device 110 calculates the position of the work vehicle 100 based on signals which are output from the GNSS receiver 111, the RTK receiver 112, and the IMU 115. The positional calculation may instead be performed by any device other than the positioning device 110. For example, the controller 180 or an external computer may acquire output data from each receiver and each sensor as is required for positioning, and calculate the position of the work vehicle 100 based on such data.

In addition, each camera 120 is an imager that images the surrounding environment of the work vehicle 100, and includes image sensors, an optical system including one or more lenses and a signal processing circuit. During travel of the work vehicle 100, the cameras 120 can image the surrounding environment of the work vehicle 100, and generate image data (e.g., motion pictures). The images generated by the cameras 120 may be used when a remote supervisor checks the surrounding environment of the work vehicle 100 with the terminal 400, for example. The images generated by the cameras 120 may also be used for the purpose of positioning or obstacle detection. As shown in FIG. 3, a plurality of cameras 120 may be provided at different positions on the work vehicle 100, or a single camera may be provided.

The obstacle sensors 130 detect objects around the work vehicle 100. Each obstacle sensor 130 may include a laser scanner or an ultrasonic sonar, for example. When an object exists at a position closer to the obstacle sensor 130 than a predetermined distance, the obstacle sensor 130 outputs a signal indicating the presence of an obstacle. A plurality of obstacle sensors 130 may be provided at different positions of the work vehicle 100. For example, a plurality of laser scanners and a plurality of ultrasonic sonars may be disposed at different positions of the work vehicle 100. Providing a multitude of obstacle sensors 130 can reduce blind spots in monitoring obstacles around the work vehicle 100.

The drive device 140 includes various devices that are needed for the traveling of the work vehicle 100 and the driving of the implement 300, e.g., the aforementioned prime mover 102, transmission 103, steering device 106, and linkage device 108. The prime mover 102 may include an internal combustion engine such as a diesel engine. Instead of an internal combustion engine or in addition to an internal combustion engine, the drive device 140 may include one or more electric motors that are dedicated to traction and steering purposes.

The steering wheel sensor 152 measures the angle of rotation of the steering wheel of the work vehicle 100. The angle-of-turn sensor 154 measures the angle of turn of the front wheels 104F, which are the wheels responsible for steering. Measurement values by the steering wheel sensor 152 and the angle-of-turn sensor 154 are used for steering control by the controller 180.

The wheel axis sensor 156 measures the rotational speed, i.e., the number of revolutions per unit time, of a wheel axis that is connected to a tire 104. The wheel axis sensor 156 may include a sensor utilizing a magnetoresistive element (MR), a Hall generator, or an electromagnetic pickup, for example. The wheel axis sensor 156 may output a numerical value indicating the number of revolutions per minute (unit: rpm) of the wheel axis, for example. The wheel axis sensor 156 is used to measure the speed of the work vehicle 100.

The storage device 170 includes one or more storage media such as a flash memory or a magnetic disc. The storage device 170 stores various data generated by the positioning device 110, the cameras 120, the obstacle sensors 130, the sensors 150, and the controller 180. The data that is stored by the storage device 170 may include map data in the environment that is traveled by the work vehicle 100 and data of a target path for use during self-driving. The storage device 170 also stores a computer program(s) to cause the ECUs in the controller 180 to perform various operations (to be described later). Such a computer program(s) may be provided for the work vehicle 100 via a storage medium (e.g., a semiconductor memory or an optical disc) or through telecommunication lines (e.g., the Internet). Such a computer program(s) may be marketed as commercial software.

The controller 180 includes a plurality of ECUs. The plurality of ECUs may include, for example, an ECU 181 for speed control, an ECU 182 for steering control, an ECU 183 for implement control, an ECU 184 for self-driving control, and an ECU 185 for target path generation. The ECU 181 controls the prime mover 102, the transmission 103, and the brakes included in the drive device 140, thus controlling the speed of the work vehicle 100. The ECU 182 controls the hydraulic device or electric motor included in the steering device 106 based on a measurement value of the steering wheel sensor 152, thus controlling the steering of the work vehicle 100. In order to cause the implement 300 to perform a desired operation, the ECU 183 controls the operation of the three-point link, the PTO shaft, etc., that are included in the linkage device 108. Also, the ECU 183 generates a signal to control the operation of the implement 300, and transmits this signal from the communicator 190 to the implement 300. Based on signals which are output from the positioning device 110, the steering wheel sensor 152, the angle-of-turn sensor 154, and the wheel axis sensor 156, the ECU 184 performs computation and control for achieving self-driving. During self-driving, the ECU 184 sends the ECU 181 a command to change the speed, and sends the ECU 182 a command to change the steering angle. In response to the command to change the speed, the ECU 181 controls the prime mover 102, the transmission 103, or the brakes to change the speed of the work vehicle 100. In response to the command to change the steering angle, the ECU 182 controls the steering device 106 to change the steering angle. The ECU 185, which functions as a processing unit (i.e., the path generating device), generates a target path for the work vehicle 100, and records the target path thus generated to the storage device 170. The ECU 184 sends necessary commands to the ECUs 181 and 182 so that the work vehicle 100 moves along the target path generated by the ECU 185. In a preferred embodiment, the controller 180 includes a sensor monitor 186 that monitors data measured by the camera 120, obstacle sensor 130, and LiDAR sensor 135.

Through the action of these ECUs, the controller 180 is able to perform self-driving. During self-driving, the controller 180 can control the drive device 140 based on the position of the work vehicle 100 as measured or estimated by the positioning device 110 and the target path stored in the storage device 170. As a result, the controller 180 causes the work vehicle 100 to travel along the target path.

The plurality of ECUs included in the controller 180 may communicate with one another according to a vehicle bus standard such as CAN (Controller Area Network). Instead of CAN, faster communication methods may be used, e.g., Automotive Ethernet (registered trademark). Although the ECUs 181 to 185 are illustrated as individual corresponding blocks in FIG. 3, each of these functions may be implemented by a plurality of ECUs. Alternatively, an onboard computer that integrates the functions of at least some or all of the ECUs 181 to 185 may be provided. The controller 180 may include ECUs other than the ECUs 181 to 185, and any number of ECUs may be provided in accordance with functionality. Each ECU can include a processing circuit including one or more processors.

The communicator 190 is a circuit that performs communications with the communicator 390 of the implement 300. The communicator 190 includes circuitry to perform exchanges of signals complying with an ISOBUS standard such as ISOBUS-TIM, for example, between itself and the communicator 390 of the implement 300. This causes the implement 300 to perform a desired operation, or allows information to be acquired from the implement 300. The communicator 190 may further include a communication circuit and an antenna to exchange signals complying with any arbitrary wireless communication standard (e.g., Wi-Fi (registered trademark), 3G, 4G, 5G or other cellular mobile communication, or Bluetooth (registered trademark)) between itself and the communicator 490 of the terminal 400. Moreover, the communicator 190 can communicate with an external computer via a wired or wireless network. The external computer may be a server computer which centralizes management of information concerning fields by using a cloud, and assists in agriculture by utilizing the data on the cloud, for example. Such an external computer may be configured to perform a part of the functionality of the work vehicle 100. For example, the path generation function of the ECU 185 may be performed by an external computer. In that case, the external computer functions as a "processor" or "processing unit".

The operational terminal 200 is a terminal for the user to perform a manipulation related to the traveling of the work vehicle 100 and the operation of the implement 300, and may also be referred to as a virtual terminal (VT). The operational terminal 200 may include a display device such as a touch screen panel, and/or one or more buttons. The display device may be a display such as a liquid crystal or an organic light-emitting diode (OLED), for example. By manipulating the operational terminal 200, the user can perform various manipulations, such as switching ON/OFF the self-driving mode, setting a target path, recording or editing a map, and switching ON/OFF the implement 300. At least some of these manipulations can also be realized by manipulating the operation switches 210. The operational terminal 200 may be configured to be detachable from the work vehicle 100. A user who is remote from the work vehicle 100 may manipulate the detached operational terminal 200 to control the operation of the work vehicle 100. Instead of the operational terminal 200, the user may manipulate a smartphone, a tablet computer, or a personal computer (PC), or other apparatuses on which necessary application software is installed, to control the operation of the work vehicle 100. The terminal 400 may cover the functionality of the operational terminal 200.

Figure 5:
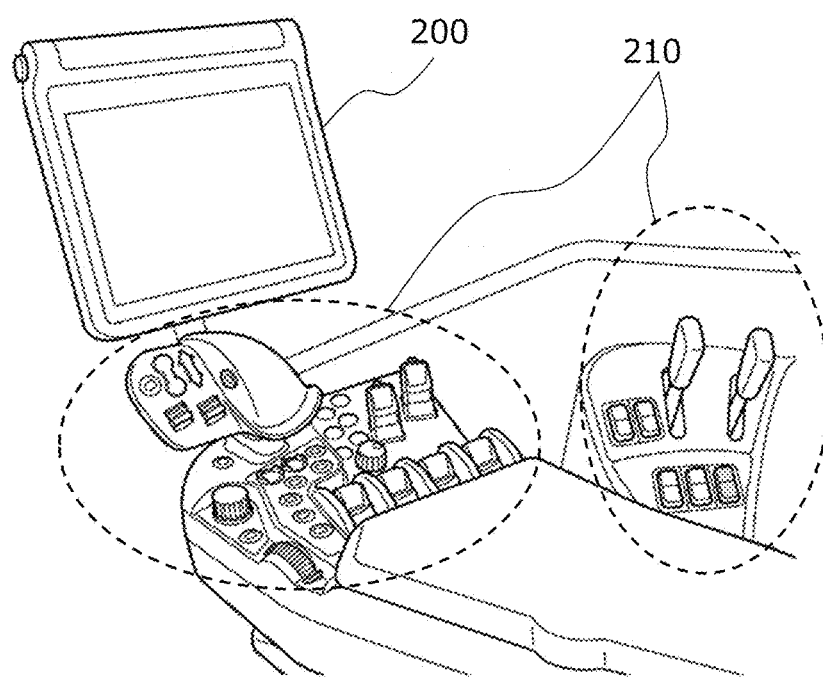
FIG. 5 is a schematic diagram showing an example of an operational terminal and operation switches.

FIG. 5 is a schematic diagram showing an example of the operational terminal 200 and operation switches 210 to be provided in the cabin 105. In the cabin 105, switches 210, which are a multitude of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving, and lacks human driving functionality, the work vehicle 100 does not need to include the operation switches 210.

The drive device 340 in the implement 300 performs a necessary operation for the implement 300 to perform a predetermined task. The drive device 340 includes devices adapted to the intended use of the implement 300, e.g., a pump, a hydraulic device, an electric motor, or a pump. The controller 380 controls the operation of the drive device 340. In response to a signal that is transmitted from the work vehicle 100 via the communicator 390, the controller 380 causes the drive device 340 to perform various operations. Moreover, a signal that is in accordance with the state of the implement 300 may be transmitted from the communicator 390 to the work vehicle 100.

The terminal 400 may be a mobile apparatus such as a smartphone, a tablet computer, or a remote control, for example. Based on signals transmitted from the multiple GNSS satellites, the GNSS receiver 410 in the terminal 400 can output data including information of the position of the terminal 400. The GNSS receiver 410 may output data of an NMEA format, for example. The input device 420 is a device that accepts input operations from the user, and may include one or more buttons or switches. The display device 430 may be a display such as a liquid crystal or an OLED, for example. The input device 420 and the display device 430 may be implemented as a touch screen panel. The storage device 450 may include a semiconductor storage medium such as a flash memory or a magnetic disc, for example. The storage device 450 stores a computer program(s) to be executed by the processor 460 and various data that is generated by the processor 460. By executing the computer program(s) stored in the storage device 450, the processor 460 performs the operations discussed in more detail below.

Figure 6:
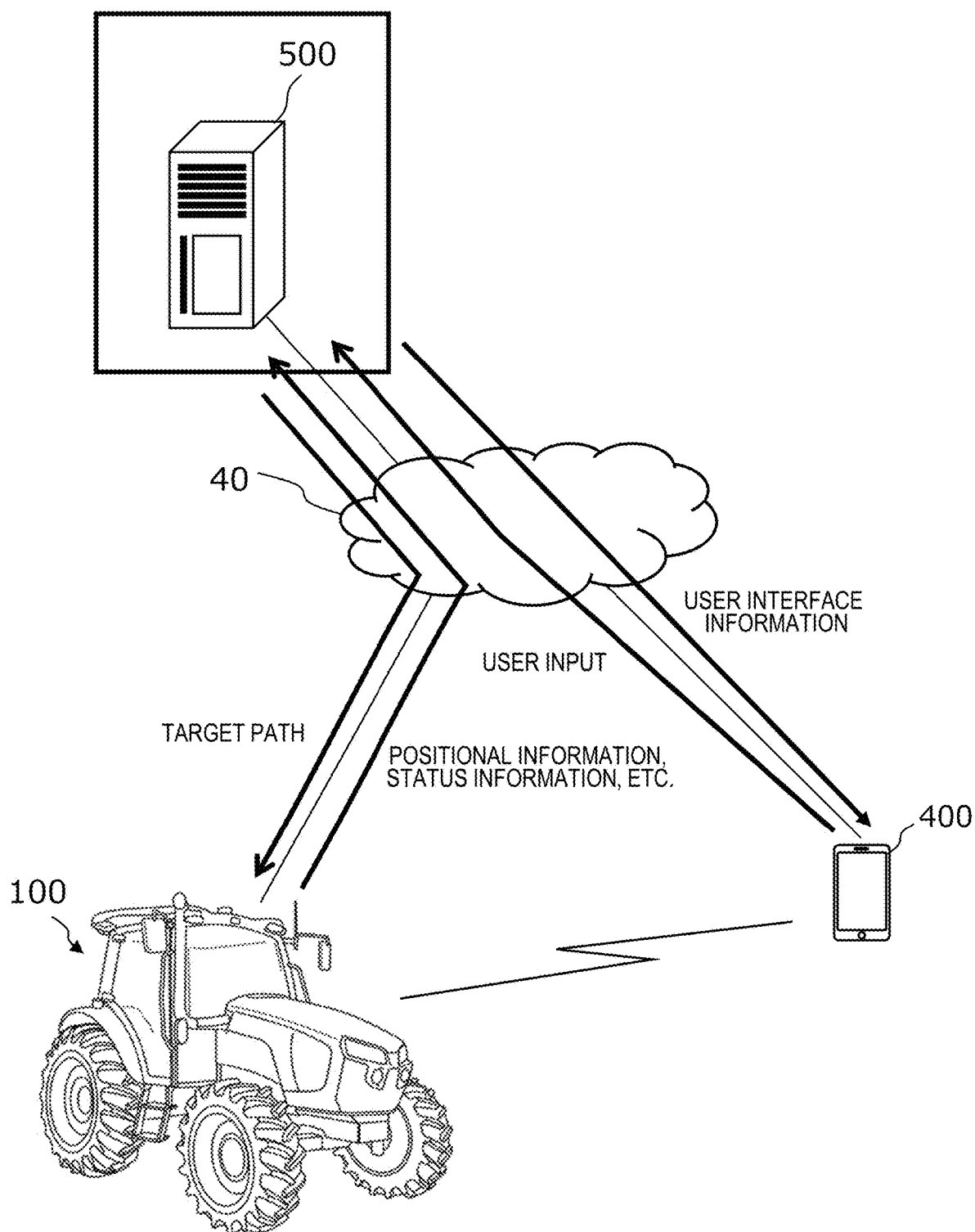
FIG. 6 is a diagram schematically showing an example configuration of a system in which a processing unit communicates with the work vehicle via a network.

FIG. 6 is a diagram schematically showing a configuration of a system in which a processing unit 500 that communicates with the work vehicle 100 via the network 40 generates a target path. In this example, rather than the controller 180 of the work vehicle 100, the external processing unit 500 generates the target path, and transmits this information to the work vehicle 100. The processing unit 500 may be a computer such as a cloud server.

Figure 7:
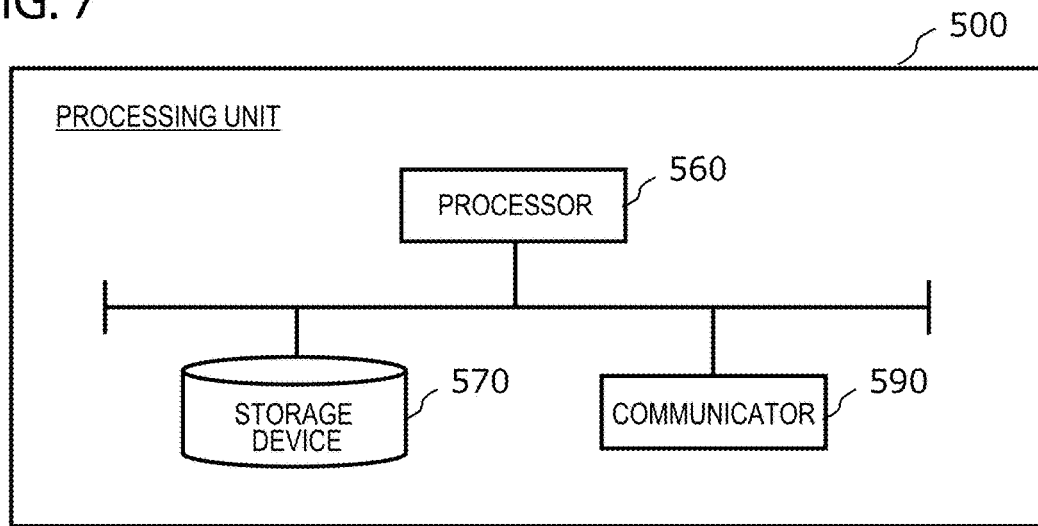
FIG. 7 is a block diagram showing an example configuration for the processing unit.

FIG. 7 is a block diagram showing a configuration of the processing unit 500. The processing unit 500 includes one or more processors 560, a storage device 570, and a communicator 590. The storage device 570 includes a memory in which a computer program to be executed by the processor 560 is stored. The communicator 590 exchanges signals with the communicator 190 of the work vehicle 100 and with the communicator 490 in the terminal 400. In this preferred embodiment, when the terminal 400 is used to schedule a new job for the work vehicle 100, the user input data information is transmitted to the processing unit 500 via the network 40. Based on the positional information of the work vehicle 100 and the user input data information, the processor 560 of the processing unit 500 generates a target path. The communicator 590 of the processing unit 500 transmits information of the target path to the work vehicle 100, and the work vehicle 100 moves along the target path, as discussed in more detail below.

In another preferred embodiment of the present invention, instead of the processing unit 500, the terminal 400 may generate the target path. In that case, the terminal 400 acquires positional information of the work vehicle 100 from the work vehicle 100 or the processing unit 500. Based on the positional information of the work vehicle 100, the processor 460 of the terminal 400 generates the target path. The terminal 400 can transmit a signal including the information of the target path to the work vehicle 100. Through such an operation, effects similar to those of each of the aforementioned preferred embodiments can be obtained.

Figure 8:
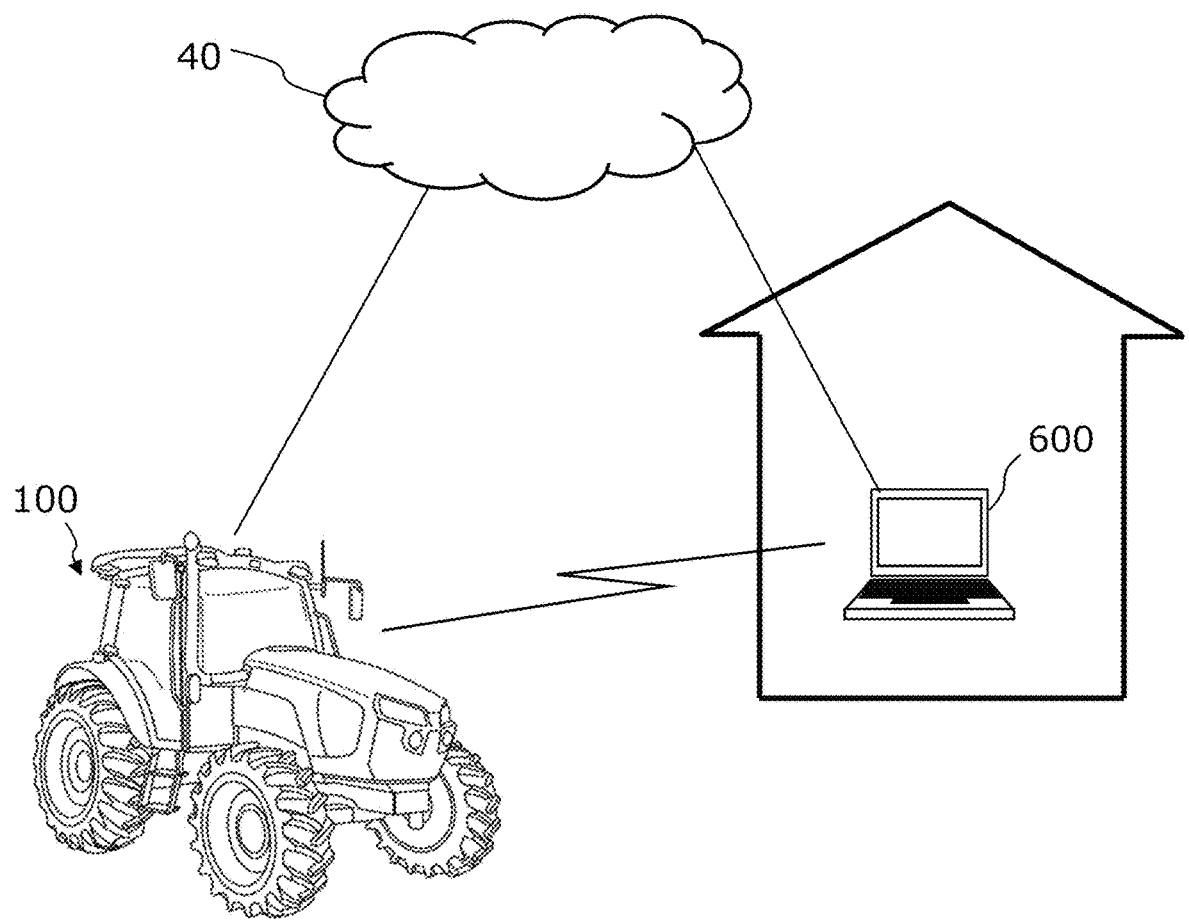
FIG. 8 is a diagram schematically showing an example of a system in which a monitoring terminal communicates with the work vehicle.

In each of the above preferred embodiments, instead of the terminal 400, a monitoring terminal 600 for monitoring the work vehicle 100 may perform the operation of controlling the work vehicle 100. Such a monitoring terminal 600 may be provided at the home or the office of a user who monitors the work vehicle 100, for example. FIG. 8 is a diagram schematically showing an example of a system in which the monitoring terminal 600 controls the work vehicle 100. The monitoring terminal 600 can include a laptop computer or a personal computer, for example, and is able to communicate with the work vehicle 100 via the network 40. Note that the monitoring terminal 600 may be a mobile computer such as a smartphone or a tablet computer. By manipulating the monitoring terminal 600, the user is able to control the work vehicle 100 along a desired route, as in each of the above preferred embodiments. The configuration of the monitoring terminal 600 is similar to the configuration of the terminal 400 shown in FIG. 3. In this example, the configuration of the work vehicle 100 is similar to that in the embodiment shown in FIG. 3. Instead of the ECU 185 in the controller 180 of the work vehicle 100, the monitoring terminal 600 may generate the target path. In that case, the monitoring terminal 600 acquires positional information of the work vehicle 100. Based on the user input data and the positional information of the work vehicle 100, the monitoring terminal 600 can generate the target path, and transmits this information to the work vehicle 100.

Figure 9:
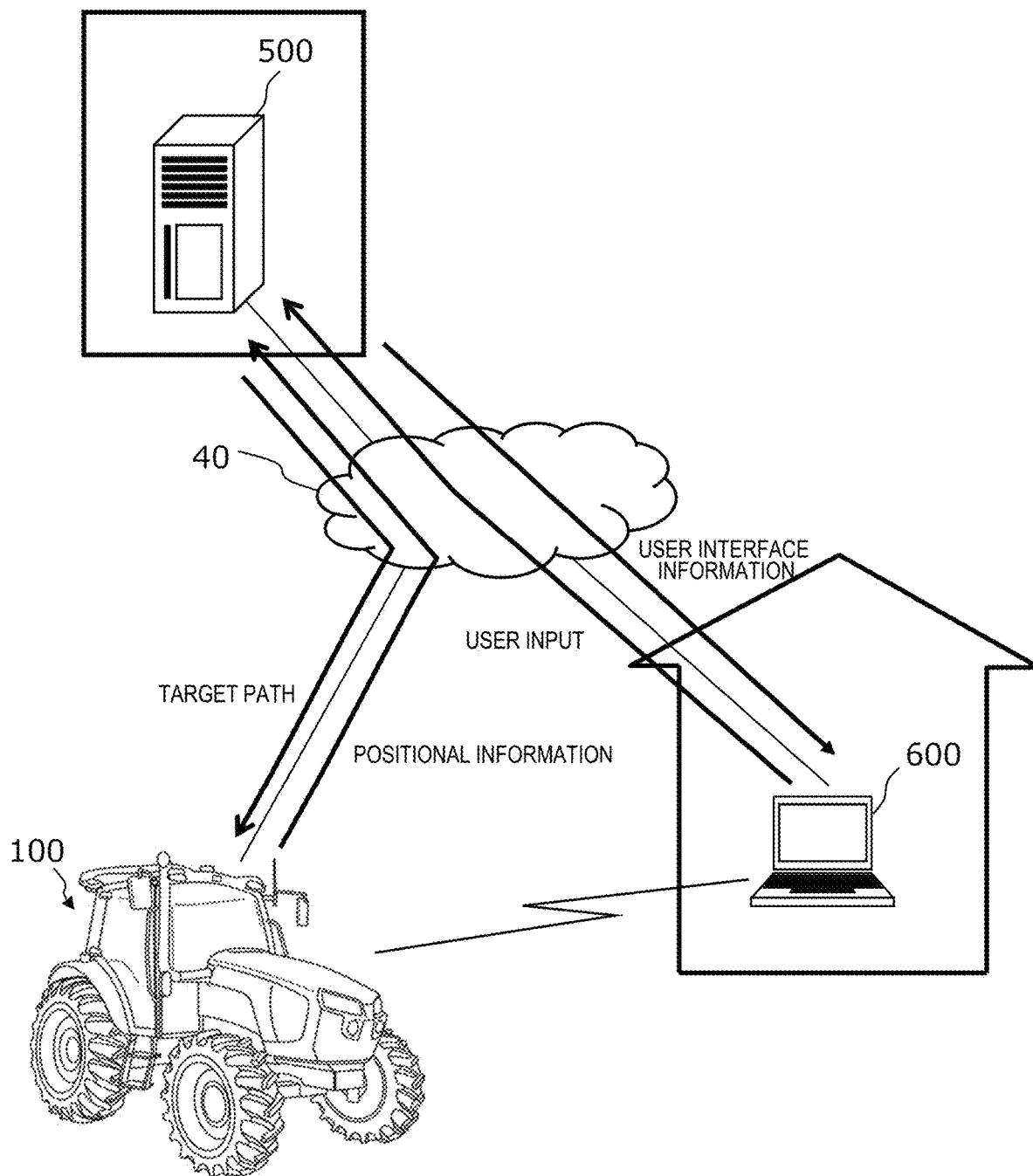
FIG. 9 is a diagram schematically showing another example of a system in which a monitoring terminal communicates with the work vehicle.

FIG. 9 is diagram schematically showing another example of a system in which the monitoring terminal 600 controls the work vehicle 100. This system corresponds to the system shown in FIG. 6 except that the terminal 400 is replaced by the monitoring terminal 600. In this system, the monitoring terminal 600 transmits user input data information to the processing unit 500 on the basis of a user's manipulation. The processing unit 500 generates a target path similarly to the example of FIG. 6, and transmits it to the work vehicle 100.

In a preferred embodiment of the present invention, one or more of the terminal 400, the operational terminal 200, or the monitoring terminal 600 can be used to control one or more of the work vehicle(s) 100. More specifically, one or more of the terminal 400, the operational terminal 200, or the monitoring terminal 600 can include a user interface that can be used to register a new work vehicle 100 with the work vehicle system, register a new route with the work vehicle system, schedule a job with the work vehicle system, and view results related to a job. In the example discussed in detail below, a user interface of the terminal 400 (e.g., a user interface in which the input device 420 and the display device 430 are implemented as a touch screen panel) is used to register a new work vehicle 100 with the work vehicle system, register a new route with the work vehicle system, schedule a job with the work vehicle system, and view results related to the job. However, a user interface of the operational terminal 200 and a user interface of the monitoring terminal 600 can provide the same or similar functionality.

Figure 10:
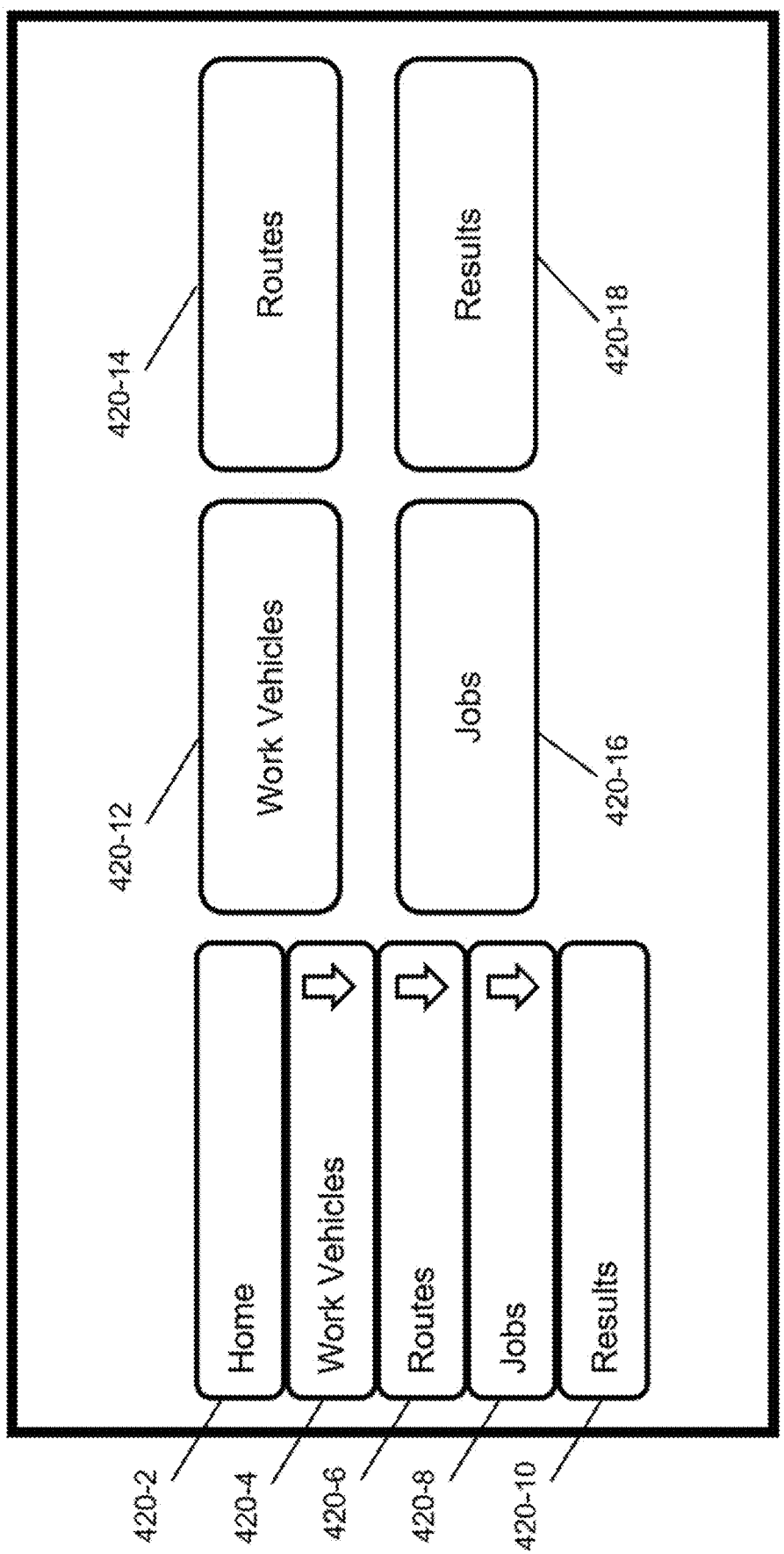
FIG. 10 is an example of a user interface according to a preferred embodiment of the present invention.

FIG. 10 shows an example of the user interface of the terminal 400 (e.g., a user interface) in which a display screen includes a home button 420-2, a work vehicles pull down menu 420-4, a routes pull down menu 420-6, a jobs pull down menu 420-8, and a results menu button 420-10. As shown in FIG. 10, the display screen can also include a work vehicles button 420-12, a routes button 420-14, a jobs button 420-16, and a results button 420-18.

Figure 11:
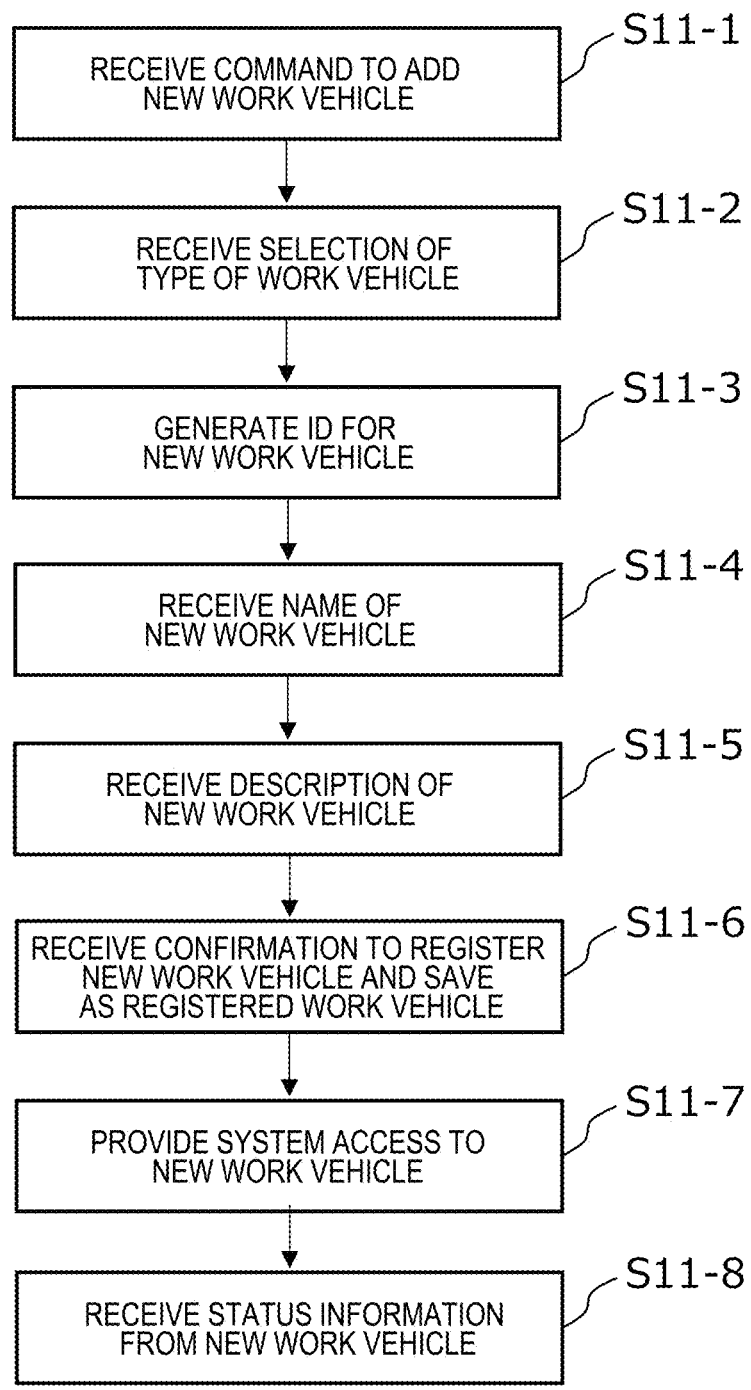
FIG. 11 is a flowchart that shows steps related to a process of registering a new work vehicle according to a preferred embodiment of the present invention.

FIG. 11 shows a flowchart that includes steps related to the process of registering a new work vehicle 100 with the work vehicle system. In a preferred embodiment, the processor 460 of the terminal 400 and/or the processor 560 of the processing unit 500 can be configured or programmed to perform the steps shown in FIG. 11. In a case in which the processor 560 performs the steps shown in FIG. 11, the processor 560 can be configured or programmed to perform these steps in accordance with inputs received using the input device 420 of the terminal 400.

Figure 12:
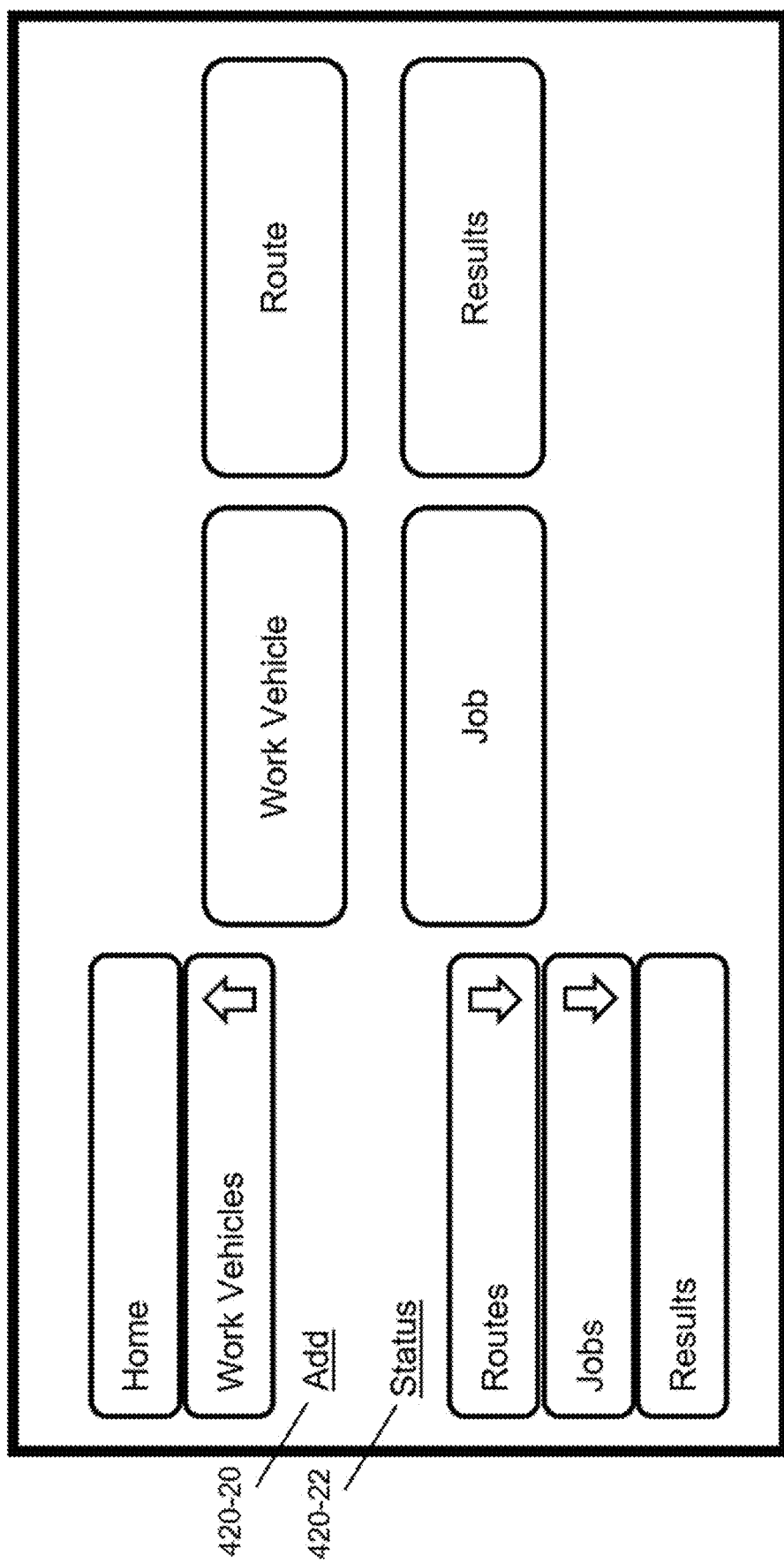
FIG. 12 is an example of a user interface according to a preferred embodiment of the present invention.

In step S11-1, an input to add a new work vehicle to the work vehicle system is received using the user interface of the terminal 400. For example, the user interface allows a user to input a command to add a new work vehicle to the work vehicle system. More specifically, if a user presses the work vehicles pull down menu 420-4 shown in FIG. 10, the user interface proceeds to a display screen shown in FIG. 12, in which an "Add" button 420-20 and a "Status" button 420-22 are displayed. In step S11-1, a user is able to press the "Add" button 420-20 to input a command to add a new work vehicle to the work vehicle system. When the "Add" button 420-20 has been pressed, the user interface of the terminal 400 proceeds to a display screen shown in FIG. 13.

Figure 13:
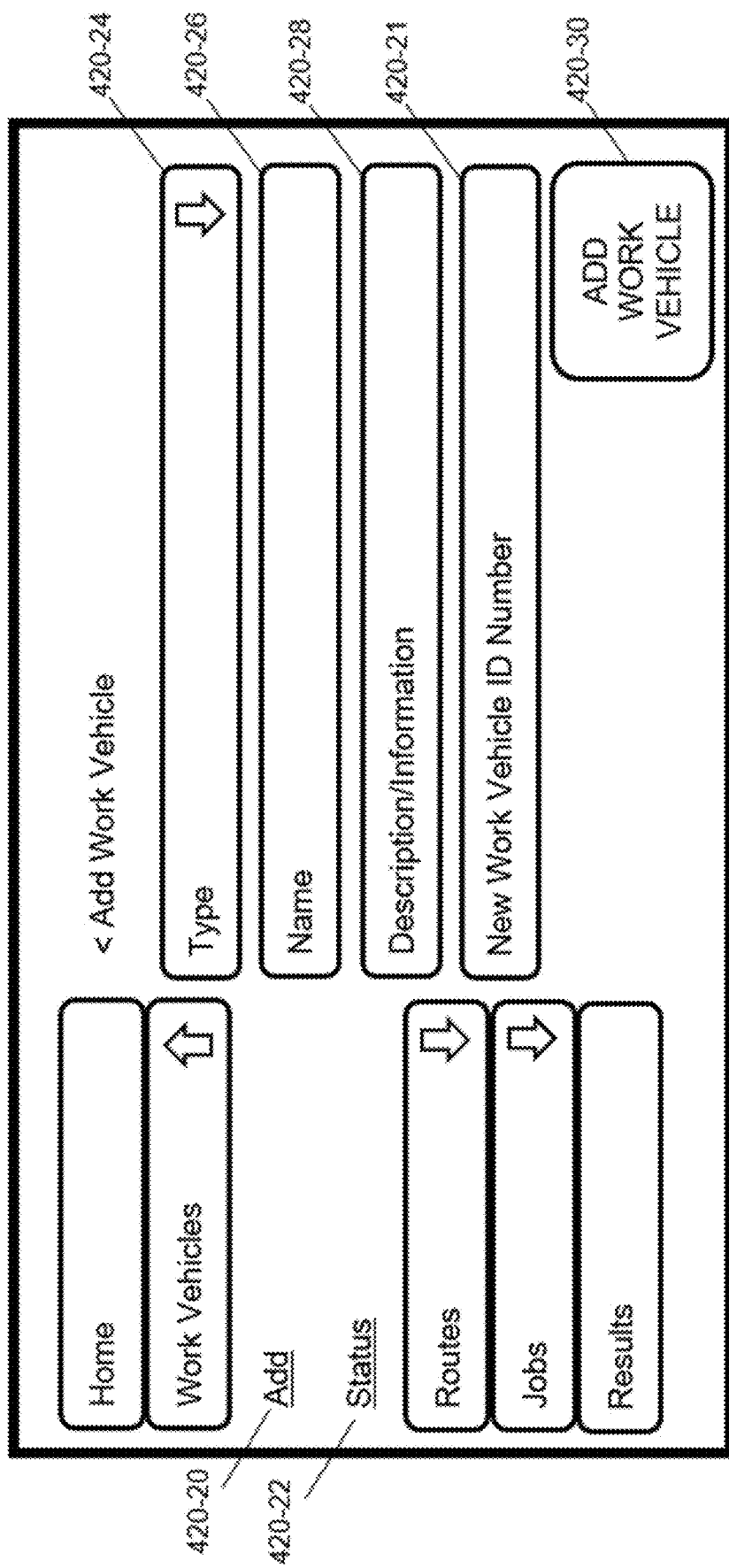
FIG. 13 is an example of a user interface according to a preferred embodiment of the present invention.

In a preferred embodiment of the present invention, step S11-1 can include a new work vehicle verification process in which the work vehicle system identifies and confirms a particular work vehicle that corresponds to the new work vehicle to be registered with the work vehicle system. For example, the new work vehicle verification process can include receiving/a user entering an identification number (e.g., an identifier) associated with the particular work vehicle that corresponds to the new work vehicle to be registered with the work vehicle system to confirm that the correct work vehicle is being registered with the work vehicle system. For example, as shown in FIG. 13, the user interface of the terminal 400 allows a user to enter an identification number associated with the particular work vehicle that corresponds to the new work vehicle to be registered with the work vehicle system using the new work vehicle type identification number field 420-21.

In another preferred embodiment, the new work vehicle verification process can include the user using the terminal 400 to scan a machine-readable code such as a two-dimensional barcode (e.g., an identifier) associated with the particular work vehicle (e.g., located on the particular work vehicle) that corresponds to the new work vehicle to be registered with the work vehicle system to confirm that the correct work vehicle is being registered with the work vehicle system.

In step S11-2, a selection of a type of work vehicle that corresponds to the new work vehicle is received using the user interface of the terminal 400. The user interface of the terminal 400 shown in FIG. 13 allows a user to select a type of work vehicle that corresponds to the new work vehicle using the work vehicle type field 420-24. For example, the user interface allows a user to select whether the new work vehicle is a tractor, harvester, rice transplanter, vehicle for crop management, vegetable trans-planter, mower, seeder, spreader, mobile robot for agriculture, or other agricultural machine or vehicle. When the type of work vehicle that corresponds to the new work vehicle has been selected, a work vehicle system identifier (e.g., a work vehicle system identification number) for the new work vehicle is generated and assigned to the new work vehicle in step S11-3.

In step S11-4, a name for the new work vehicle is received using the user interface of the terminal 400, and in step S11-5, a description, information, or comment regarding the new work vehicle is received using the user interface of the terminal 400. For example, the user interface of the terminal 400 shown in FIG. 13 also allows a user to provide a name for the new work vehicle using the name field 420-26 in step S11-4 and input a description, information, or comment regarding the new work vehicle using the comment field 420-28 in step S11-5. When the type of work vehicle that corresponds to the new work vehicle has been selected, a name for the new work vehicle has been provided, and any relevant description, information, or comment regarding the new work vehicle has been input, the user interface of the terminal 400 allows a user to input a confirmation to register the new work vehicle using the button 420-30 in step S11-6. In other words, in step S11-6, a confirmation to register the new work vehicle in the work vehicle system is received using the user interface of the terminal 400.

In step S11-6, when the confirmation to register the new work vehicle is received, the new work vehicle is saved as a registered work vehicle in the work vehicle system. For example, the new work vehicle can be added to a list of registered work vehicles that can be saved in the storage device 450 of the terminal 400 and/or the storage device 570 of the processing unit 500, for example.

When the confirmation to register the new work vehicle is received and the new work vehicle is saved as a registered work vehicle, system access is provided to the new work vehicle in step S11-7. For instance, in the example shown in FIG. 1, system access is provided to the new work vehicle 100 by enabling full data communication (e.g., data communication other than the data communication that was required to register the new work vehicle) between the work vehicle 100 and the terminal 400. Similarly, in the example shown in FIG. 6, system access is provided to the new work vehicle 100 by enabling full data communication between the work vehicle 100 and the processing unit 500 (e.g., via the network 40) and/or between the work vehicle 100 and the terminal 400.

Figure 34:
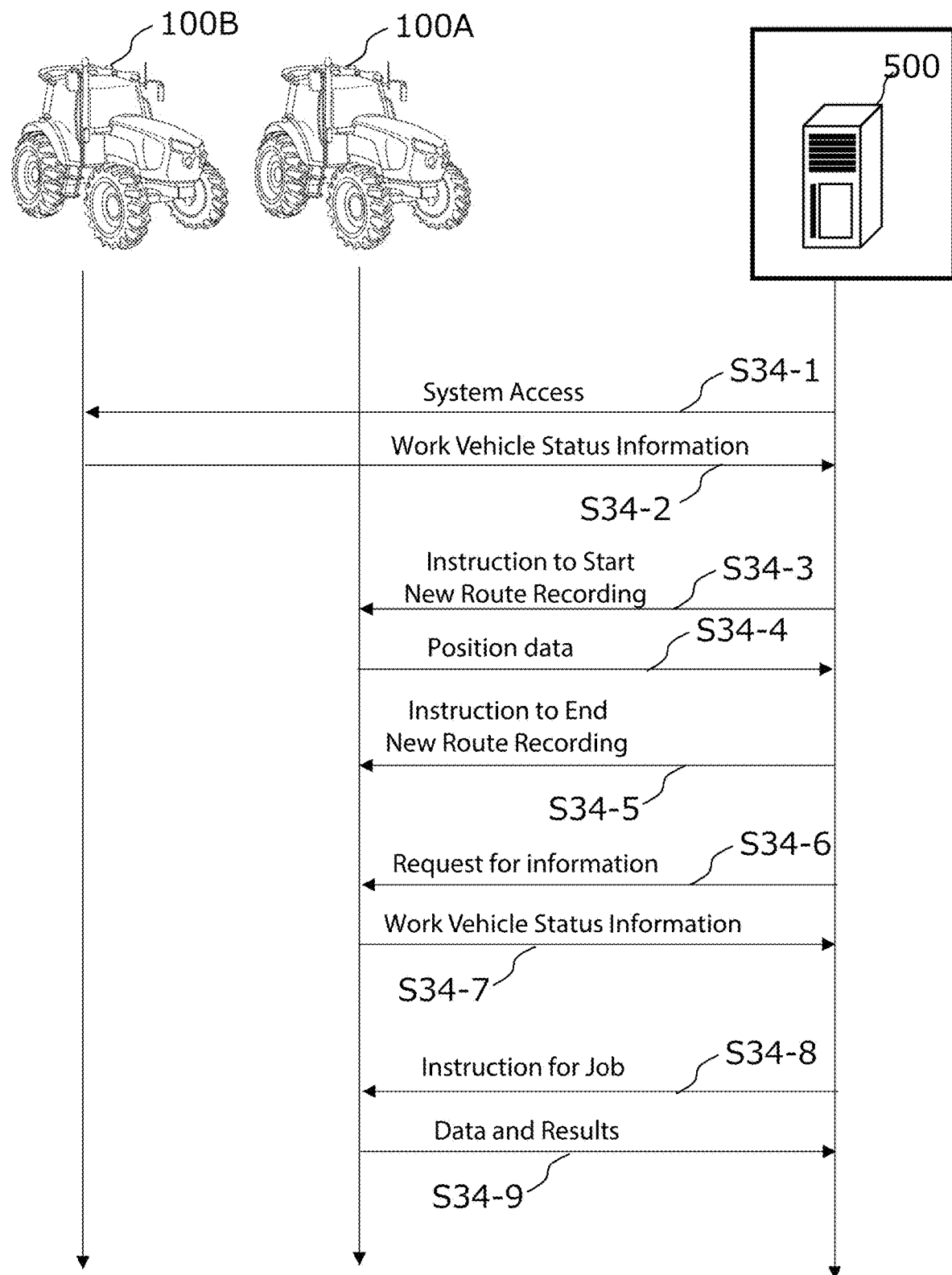
FIG. 34 is a flowchart that shows steps related to communication between a work vehicle system and work vehicles according to a preferred embodiment of the present invention.

In a preferred embodiment, step S11-7 in which system access is provided to the new work vehicle corresponds to step S34-1 in FIG. 34. FIG. 34 shows a flow chart of communication between the work vehicle system (e.g., the processing unit 500) and each of a work vehicle 100A and a work vehicle 100B. In FIG. 34, the work vehicle 100A is a work vehicle that has already been registered with the work vehicle system and has already received system access from the work vehicle system prior to step S34-1, and the work vehicle 100B is a work vehicle just registered with the work vehicle system. In step S34-1, system access is sent from the work vehicle system (e.g., the processing unit 500) to the new work vehicle 100 (100B) that was just registered with the work vehicle system. In FIG. 34, the flow chart shows communication between the processing unit 500 and the work vehicle 100A and the work vehicle 100B, however, communication can also be performed between the work vehicle 100A and the work vehicle 100B and each of the terminal 400, the operation terminal 200, and monitoring terminal 600 in accordance with the preferred embodiments of the present invention discussed above.

When system access is provided to the new work vehicle 100 in step S11-7, the new work vehicle 100 sends status information of the new work vehicle 100 to the system in step S11-8. For example, in step S11-8, the processing unit 500 and/or the terminal 400 receive status information from the new work vehicle 100. The status information of the new work vehicle 100 can include information such as the location of the new work vehicle 100 and the availability of the new work vehicle 100 (e.g., whether the new work vehicle 100 is available to complete a job or busy executing a job).

In a preferred embodiment, step S11-8 in which the new work vehicle 100 sends status information of the new work vehicle 100 to the work vehicle system corresponds to step S34-2 in FIG. 34. In step S34-2, the new work vehicle 100 (100B) that was just registered with the work vehicle system sends the status information of the new work vehicle 100 (100B) to the work vehicle system (e.g., the processing unit 500).

Figure 29:
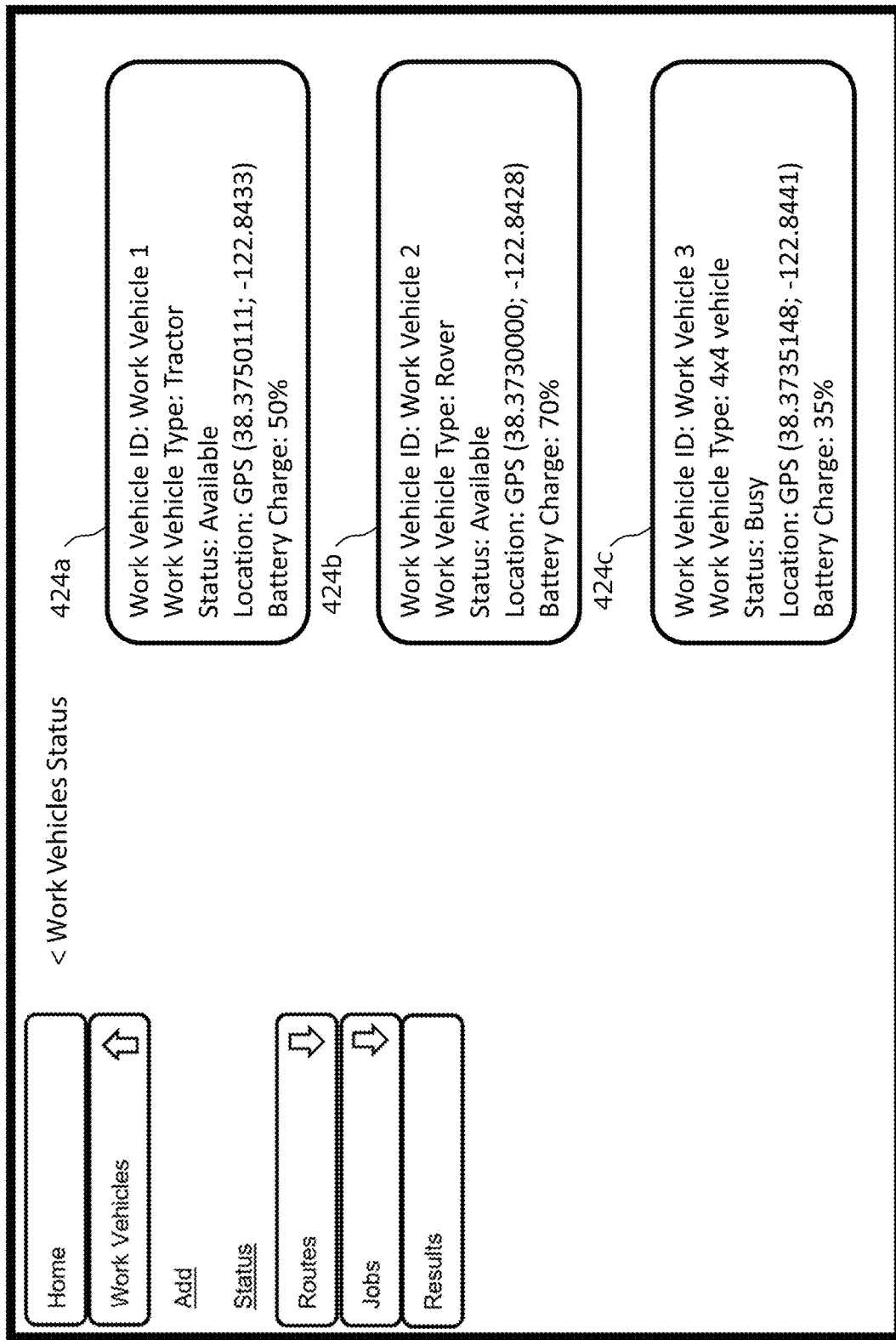
FIG. 29 is an example of a user interface according to a preferred embodiment of the present invention.

In a preferred embodiment of the present invention, the user interface can display the status information of each of the work vehicles 100 that have been registered with the work vehicle system. For example, the user interface of the terminal 400 can display the status of each of the work vehicles 100 that have been registered with the system in accordance with the steps discussed above with respect to FIG. 11. FIG. 29 shows an example of the user interface which displays a status information window 424a of a registered work vehicle 1, a status information window 424b of a registered work vehicle 2, and a status information window 424c of a registered work vehicle 3. The status information widows shown in FIG. 29 can include status information such as the work vehicle identifier, the type of the work vehicle, whether or not the work vehicle is available or busy (e.g., completing a job, broken and waiting for maintenance, or insufficient battery charge to complete a job), the location of the work vehicle, and the battery charge of the work vehicle. In a preferred embodiment, the user interface of the terminal 400 allows a user to press the "Status" button 420-22 shown in FIG. 13 to proceed to the display screen which displays the status information of the registered work vehicles 100.

Figure 30:
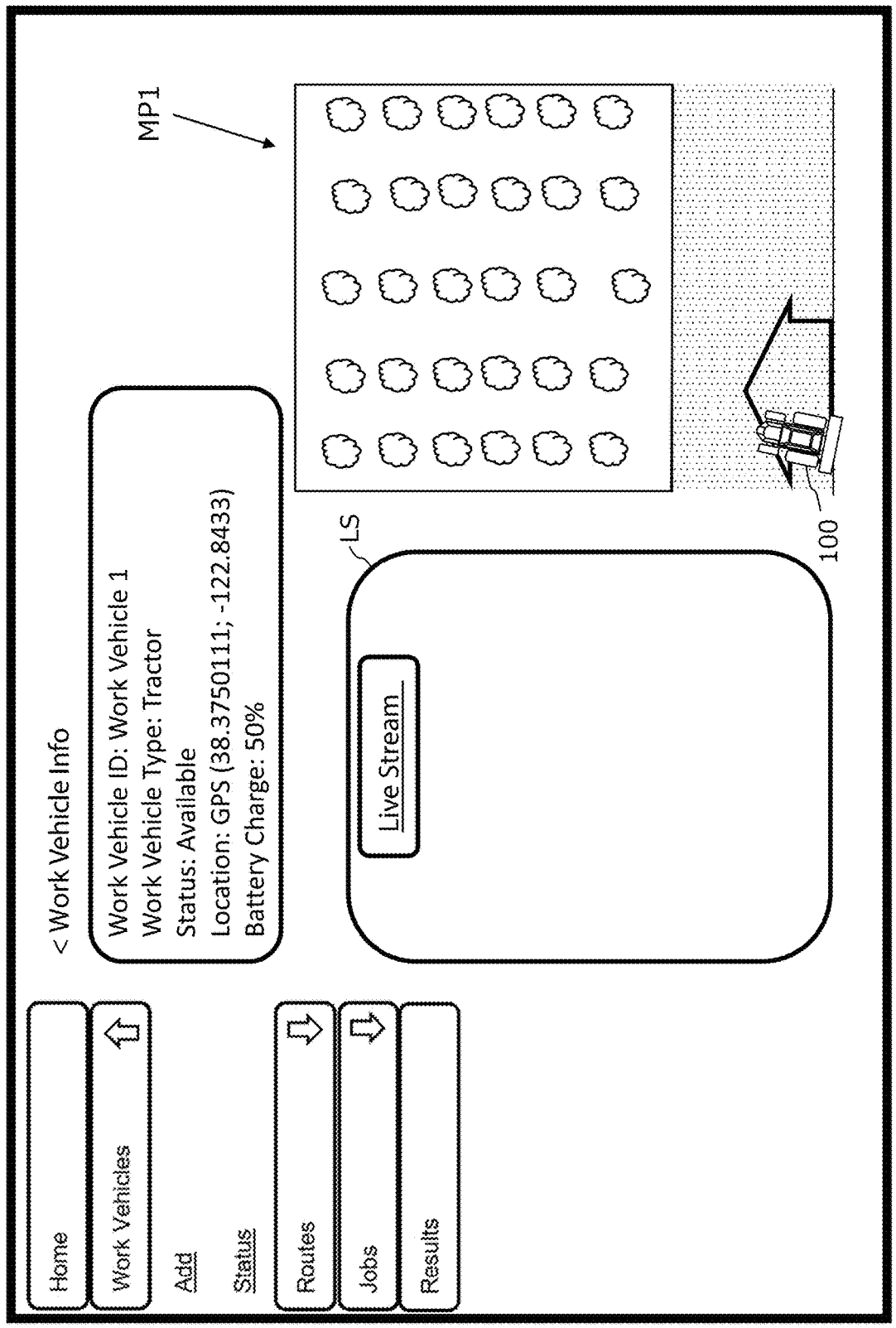
FIG. 30 is an example of a user interface according to a preferred embodiment of the present invention.

In a preferred embodiment of the present invention, the status information windows 424 (e.g., the status information window 424a for the registered work vehicle 1, the status information window 424b for the registered work vehicle 2, and the status information window 424c for the registered work vehicle 3) can each function as buttons of the user interface of the terminal 400. When one of the status information windows 424 is pressed, additional information regarding the respective registered work vehicle is displayed on the user interface. For example, if the status information window 424a of the registered work vehicle 1 shown in FIG. 29 is pressed, the user interface of the terminal 400 will proceed to a display screen shown in FIG. 30. In the display screen shown in FIG. 30, additional information regarding the work vehicle 1 such as an agricultural field map MP1 showing the location of the work vehicle 100 and a live stream (e.g., from the one or more cameras 120 of the work vehicle 1) can be displayed, for example.

Figure 14:
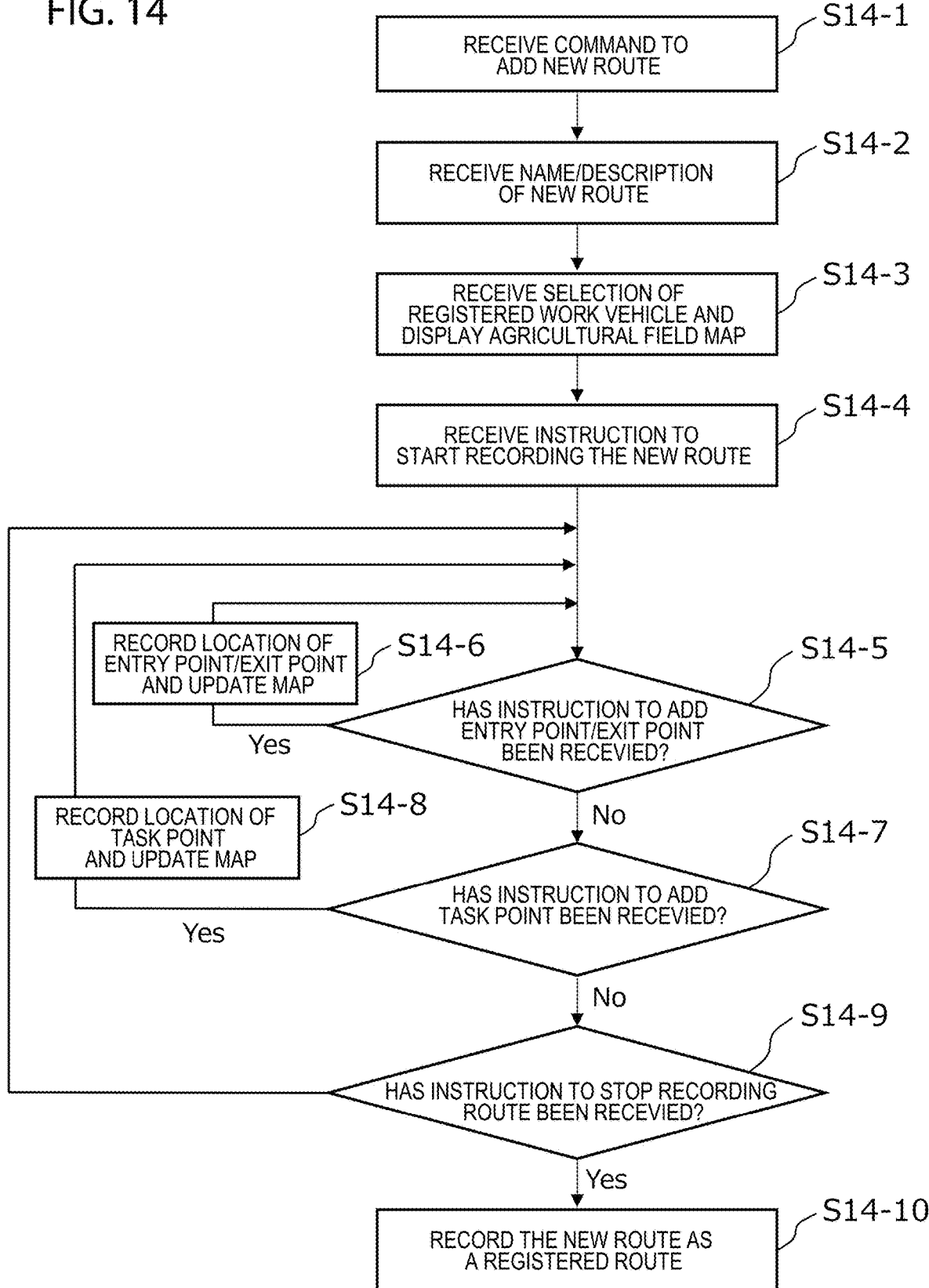
FIG. 14 is a flowchart that shows steps related to a process of registering a new route according to a preferred embodiment of the present invention.

FIG. 14 shows a flowchart that includes steps related to the process of registering a new route with the work vehicle system. In a preferred embodiment, the processor 460 of the terminal 400 and/or the processor 560 of the processing unit 560 can be configured or programmed to perform the steps shown in FIG. 14. In a case in which the processor 560 performs the steps shown in FIG. 14, the processor 560 can be configured or programmed to perform these steps in accordance with inputs received by the input device 420 of the terminal 400.

Figure 15:
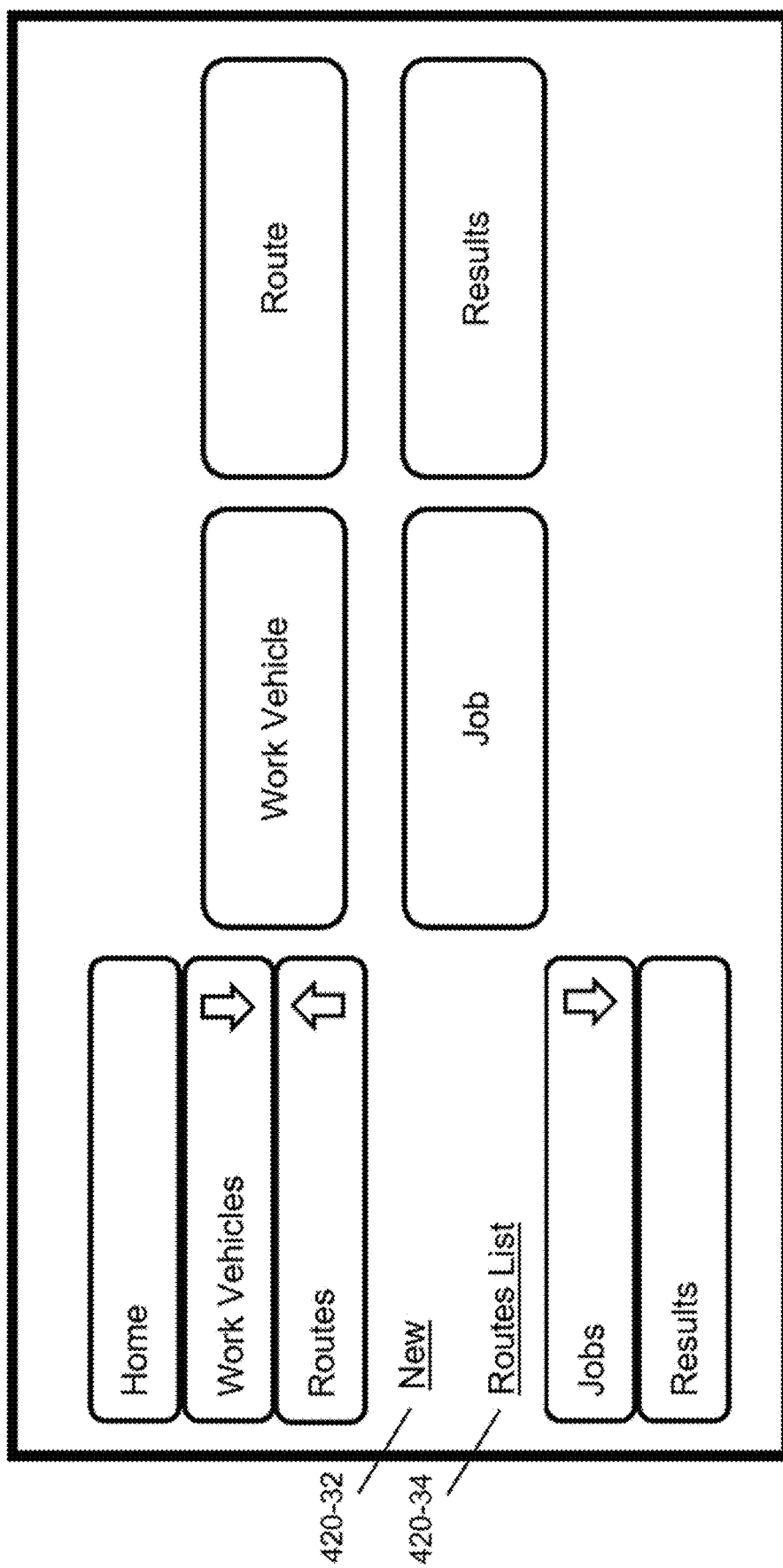
FIG. 15 is an example of a user interface according to a preferred embodiment of the present invention.

In step S14-1, an input to add a new route to the work vehicle system is received using the user interface of the terminal 400. For example, the user interface allows a user to input a command to add a new route to the work vehicle system. More specifically, if a user presses the routes pull down menu 420-6 shown in FIG. 10, the user interface of the terminal 400 will proceed to a display screen shown in FIG. 15, in which a "New" button 420-32 and a "Routes List" button 420-34 are displayed. In step S14-1, a user is able to press the "New" button 420-32 to input a command to add a new route to the work vehicle system. When the "New" button 420-32 has been pressed, the user interface of the terminal 400 will proceed to a display screen shown in FIG. 16.

In step S14-2, a name and a description, information, or comment is received for the new route using the user interface. For example, the user interface of the terminal 400 shown in FIG. 16 allows a user to provide a name for the new route using the name field 420-36 and input a description, information, or comment regarding the new route using the comment field 420-40.

In step S14-3, a selection of a work vehicle with which the new route will be recorded is received using the user interface. For example, the user interface of the terminal 400 shown in FIG. 16 also allows a user to use the work vehicle field/drop down menu 420-38 to select a work vehicle with which the new route will be recorded. In a preferred embodiment, the work vehicle selected in step S14-3 and used to record the new route must be a registered work vehicle (i.e., a work vehicle which has been previously registered with the system). For example, the work vehicle selected to be used to record the new route can be a work vehicle which has previously been registered with the system using the steps discussed above with respect to FIG. 11. The work vehicle selected to be used to record the new route can be selected from a plurality of registered work vehicles which have previously been registered with the system (e.g., the registered work vehicle 1, the registered work vehicle 2, and the registered work vehicle 3 shown in FIG. 29). The work vehicle field/drop down menu 420-38 can allow a user to search/scroll through a list of registered work vehicles from which to select the work vehicle to be used to record the new route.

Figure 16:
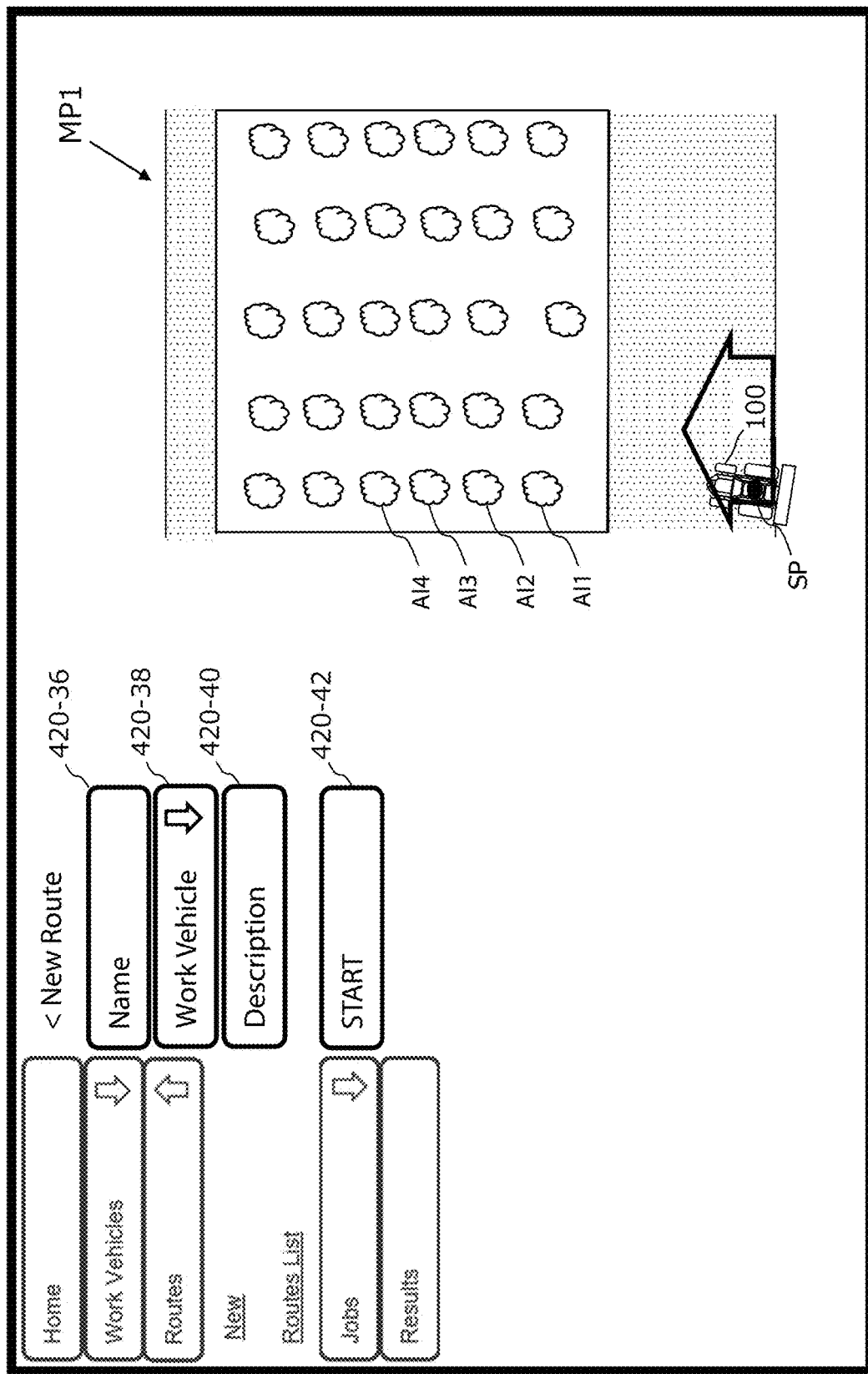
FIG. 16 is an example of a user interface according to a preferred embodiment of the present invention.

In step S14-3, when the selection of the work vehicle 100 with which the new route will be recorded is received, an agricultural field map MP1 is generated and displayed on the user interface of the terminal 400, as shown in FIG. 16, for example. The agricultural field map MP1 is a map that displays information including a current position of the work vehicle 100 (e.g., designated by a work vehicle icon) and an area surrounding the work vehicle 100. For example, the position of the work vehicle can be determined using the positioning device 110 and the area surrounding the work vehicle 100 can be obtained from Google Maps (registered trademark) or another source of map data and/or satellite data, for example. The agricultural field map MP1 can display information including a location of one or more agricultural items AI1 through AI4, such as a grape vine, plant, etc. If the work vehicle 100 is controlled such that the position of the work vehicle 100 is moved, the agricultural field map MP1 is updated to show a current position of the work vehicle 100.

In step S14-4, an instruction to start recording the new route is received using the user interface. For example, when the work vehicle 100 is positioned at a location that corresponds to a desired start point of the new route, the user interface of the terminal 400 allows a user to input an instruction to start recording the new route in step S14-4. For example, the user interface shown in FIG. 16 allows a user to input an instruction to start recording the new route by pressing the "START" button 420-42. When the user inputs the instruction to start recording the new route in step S14-4, the current position of the work vehicle 100 (e.g., determined using the positioning device 110) is saved in the system as the location of the start point SP of the new route, and the start point SP of the new route is displayed on the user interface of the terminal 400, as shown in FIG. 16, for example. For example, the location of the start point SP of the new route can be saved in the storage device 450 of the terminal 400 and/or the storage device 570 of the processing unit 500.

In a preferred embodiment, step S14-4 in which the instruction to start recording the new route is received using the user interface corresponds to step S34-3 in FIG. 34. In step S34-3, an instruction to start recording the new route is sent from the work vehicle system (e.g., the processing unit 500) to the work vehicle 100 that was selected in step S14-3 to be used to record the new route. In the example shown in FIG. 34, the work vehicle 100A corresponds to the work vehicle 100 that was selected in step S14-3 to be used to record the new route.

Once the user inputs an instruction to start recording the new route in step S14-4 (e.g., by pressing the "START" button 420-42), the work vehicle 100 can be controlled/moved in order to record the new route. For example, the work vehicle 100 can be controlled/moved by the user manually driving the work vehicle 100, by the user remotely driving the work vehicle 100, or by the work vehicle 100 being autonomously controlled. As mentioned above, when the position of the work vehicle 100 is controlled/moved, the agricultural field map MP1 is updated to show a current position of the work vehicle 100.

When the work vehicle 100 is being controlled/moved in order to record the new route, a position of the work vehicle (e.g., as determined using the positioning device 110) is periodically recorded/saved (e.g., in the storage device 450 and/or the storage device 570). For instance, a position of the work vehicle 100 can be periodically recorded/saved at a predetermined time interval (e.g., approximately every 2 seconds) or a predetermined distance interval (e.g., approximately every 0.5 meters traveled by the work vehicle 100). For example, as shown in FIG. 34, in step S34-4 the work vehicle 100 (100A) can periodically send position data including a position of the work vehicle to the work vehicle system (e.g., the processing unit 500). The plurality of positions of the work vehicle 100 recorded/saved at the predetermined time interval or the predetermined distance interval are saved as a plurality of navigation points. The plurality of navigation points can be displayed on the user interface of the terminal 400. An example of a plurality of navigation points NP1, NP2, and NP3 are shown in FIG. 17.

Figure 17:
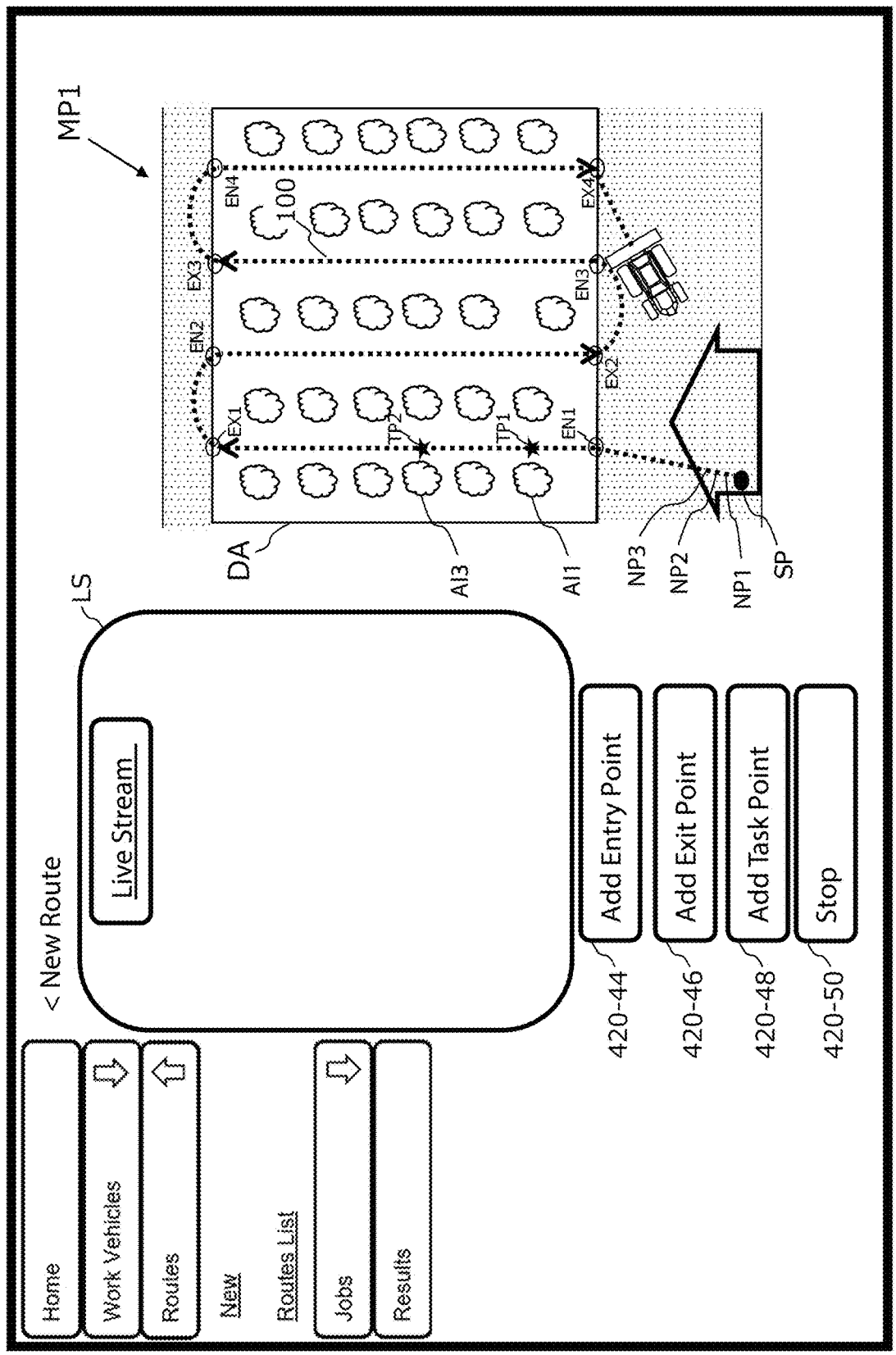
FIG. 17 is an example of a user interface according to a preferred embodiment of the present invention.

When the user inputs an instruction to start recording the new route in step S14-4 (e.g., by pressing the "START" button 420-42), the user interface of the terminal 400 proceeds to the display screen shown in FIG. 17. The user interface shown in FIG. 17 allows the user to input an instruction to add an entry point EN to the new route in step S14-5. For example, the user interface of the terminal 400 shown in FIG. 17 allows a user to input an instruction to add an entry point EN to the new route by pressing the "Add Entry Point" button 420-44 in step S14-5. When the user inputs an instruction to add an entry point EN to the new route, the current position of the work vehicle 100 (e.g., as determined using the positioning device 110) is recorded/saved (e.g., in the storage device 450 and/or the storage device 570) as a new entry point EN, and the new entry point EN is displayed on the user interface of the terminal 400 in step S14-6.

In a preferred embodiment of the present invention, an entry point EN can correspond to a position of the work vehicle 100 where the work vehicle 100 enters a designated area DA, such as a trellis area of a vineyard or a field of crops that includes one or more of the agricultural items. In the example shown in FIG. 17, the user interface of the terminal 400 displays a first entry point EN1, a second entry point EN2, a third entry point EN3, and a fourth entry point EN4, which correspond to positions of the work vehicle 100 where the work vehicle 100 entered the designated area DA. For example, the first entry point EN1 can be added to the new route as a result of the user inputting an instruction to add an entry point when the work vehicle 100 was positioned at a location of the first entry point EN1. In the present preferred embodiment, the first entry point EN1 can be added to the new route as a result of the user inputting an instruction to add an entry point only after the work vehicle 100 has been positioned at a location of the first entry point EN1 for at least a predetermined period of time (e.g., approximately 10 seconds), which can improve the accuracy and reliability of the current position of the work vehicle 100 determined using the positioning device 110. Similarly, the second entry point EN2 can be added to the new route as a result of the user inputting an instruction to add an entry point EN when the work vehicle 100 was positioned at a location of the second entry point EN2, the third entry point EN3 can be added to the new route as a result of the user inputting an instruction to add an entry point EN when the work vehicle 100 was positioned at a location of the third entry point EN3, the fourth entry point EN4 can be added to the new route as a result of the user inputting an instruction to add an entry point EN when the work vehicle 100 was positioned at a location of the fourth entry point EN4.

The user interface of the terminal 400 shown in FIG. 17 also allows the user to input an instruction to add an exit point EX to the new route in step S14-5. For example, the user interface of the terminal 400 shown in FIG. 17 allows a user to input an instruction to add an exit point EX to the new route by pressing the "Add Exit Point" button 420-46 in step S14-5. When the user inputs the instruction to add an exit point EX to the new route, the current position of the work vehicle 100 (e.g., as determined using the positioning device 110) is recorded/saved (e.g., in the storage device 450 and/or the storage device 570) as a new exit point EX and the new exit point EX is displayed on the user interface of the terminal 400 in step S14-6. In a preferred embodiment of the present invention, an exit point EX can correspond to a position of the work vehicle 100 where the work vehicle 100 exits the designated area DA. In the example shown in FIG. 17, the user interface of the terminal 400 displays a first exit point EX1, a second exit point EX2, a third exit point EX3, and a fourth exit point EX4, which correspond to positions of the work vehicle 100 where the work vehicle 100 exited the designated area DA. For example, the first exit point EX1 can be added to the new route as a result of the user inputting an instruction to add an exit point EX when the work vehicle 100 was positioned at a location of the first exit point EX1. In the present preferred embodiment, the first exit point EX1 can be added to the new route as a result of the user inputting an instruction to add an exit point only after the work vehicle 100 has been positioned at a location of the first exit point EX1 for at least a predetermined period of time (e.g., approximately 10 seconds), which can improve the accuracy and reliability of the current position of the work vehicle 100 determined using the positioning device 110. Similarly, the second exit point EX2 can be added to the new route as a result of the user inputting an instruction to add an exit point EX when the work vehicle 100 was positioned at a location of the second exit point EX2, the third exit point EX3 can be added to the new route as a result of the user inputting an instruction to add an exit point EX when the work vehicle 100 was positioned at a location of the third exit point EX3, and the fourth exit point EX4 can be added to the new route as a result of the user inputting an instruction to add an exit point EX when the work vehicle 100 was positioned at a location of the fourth exit point EX4.

The user interface of the terminal 400 shown in FIG. 17 also allows the user to input an instruction to add a task point TP to the new route in step S14-7. For example, the user interface of the terminal 400 shown in FIG. 17 allows a user to input an instruction to add a task point TP to the new route by pressing the "Add Task Point" button 420-48 in step S14-7. When the user inputs the instruction to add a task point TP to the new route, the current position of the work vehicle 100 (e.g., as determined using the positioning device 110) is recorded/saved (e.g., in the storage device 450 and/or the storage device 570) as a new task point TP, and the new task point TP is displayed on the user interface of the terminal 400 in step S14-8.

In a preferred embodiment of the present invention, a task point TP can correspond to a position of the work vehicle 100/a geographical location where the work vehicle 100 can perform a task. For example, the task point TP can correspond to a position of the work vehicle 100/a geographical location where the work vehicle 100 is positioned adjacent to an agricultural item AI to perform a task with respect to the agricultural item AI. In the example shown in FIG. 17, the user interface of the terminal 400 displays a first task point TP1 which corresponds to a position of the work vehicle 100 where the work vehicle 100 is positioned adjacent to an agricultural item AI1 to perform a task with respect to the agricultural item AI1, and a second task point TP2 which corresponds to a position of the work vehicle 100 where the work vehicle 100 is positioned adjacent to an agricultural item AI3 to perform a task with respect to the agricultural item AI3. For example, the first task point TP1 can be added to the new route as a result of the user inputting an instruction to add a task point TP when the work vehicle 100 was positioned at a location of the first task point TP1, and the second task point TP2 can be added to the new route as a result of the user inputting an instruction to add a task point TP when the work vehicle 100 was positioned at a location of the second task point TP2. In the present preferred embodiment, a task point (e.g., the first task point TP1) can be added to the new route as a result of the user inputting an instruction to add a task point when the work vehicle 100 has been positioned at a location of the task point (e.g., the first task point TP1) for at least a predetermined period of time (e.g., 10 seconds), which can improve the accuracy and reliability of the current position of the work vehicle 100 determined using the positioning device 110.

In a preferred embodiment, the user interface of the terminal 400 shown in FIG. 17 allows the user to input an instruction to add a task point TP to the new route in step S14-7 (e.g., by pressing the "Add Task Point" button 420-48 in step S14-7). However, in an alternative preferred embodiment, a task point TP can be added to the new route using artificial intelligence and/or an object detection system. For example, the controller 180 can be configured or programmed to execute an object detection function that processes image data collected by the one or more cameras 120 to detect when a particular agricultural item is adjacent to the work vehicle. In this case, the position of the work vehicle 100 (e.g., as determined using the positioning device 110) when the controller 180 determines that the particular agricultural item is adjacent to the work vehicle 100 can be recorded as a new task point TP.

In a preferred embodiment of the present invention, the user interface of the terminal 400 shown in FIG. 17 includes a live stream window LS. The live stream window LS shows an image or video stream that can be generated using image data obtained from the one or more the plurality of cameras 120 when the work vehicle is recording the new route. For example, the live stream window LS can show an image of an agricultural item (e.g., the first agricultural item AI1) when the work vehicle is positioned adjacent to the first agricultural item AI1.

Figure 18:
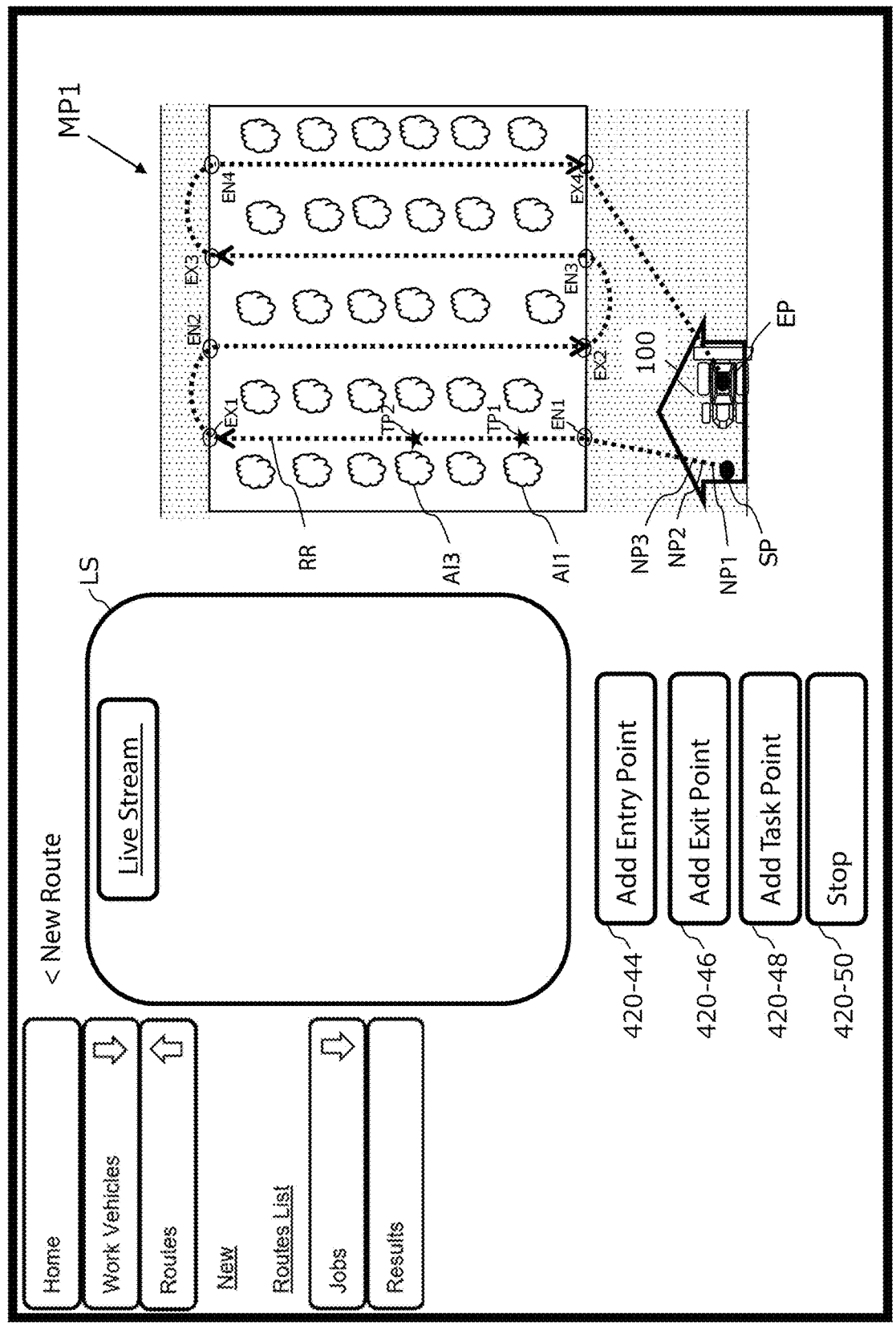
FIG. 18 is an example of a user interface according to a preferred embodiment of the present invention.

When the work vehicle 100 is positioned at a location that corresponds to a desired end point of the new route, the user interface of the terminal 400 allows a user to input an instruction to stop recording the new route (step S14-9). For example, the user interface of the terminal 400 shown in FIG. 18 allows a user to input an instruction to stop recording the new route by pressing the "STOP" button 420-50 in step S14-9. When the user inputs the instruction to stop recording the new route in step S14-9, the current position of the work vehicle 100 (e.g., as determined using the positioning device 110) is recorded/saved (e.g., in the storage device 450 and/or the storage device 570) as the end point EP of the new route, and the end point EP of the new route is displayed on the user interface of the terminal 400, as shown in FIG. 18, for example.

In a preferred embodiment, step S14-9 in which an instruction to stop recording the new route is received using the user interface corresponds to step S34-5 in FIG. 34. In step S34-5, an instruction to stop recording the new route is sent from the work vehicle system (e.g., the processing unit 500) to the work vehicle 100 that was used to record the new route. In the example shown in FIG. 34, the work vehicle 100A corresponds to the work vehicle 100 that was used to record the new route.

When the user inputs the instruction to stop recording the new route in step S14-9, the new route is recorded/saved (e.g., in the storage device 450 and/or the storage device 570) as a registered route RR in step S14-10. In a preferred embodiment, the registered route RR includes a plurality of waypoints including the start point SP, the navigation points NP and/or the entry points EN and the exit points EX, the task points TP, and the end point EP. The plurality of waypoints can be represented in the form of a list along with their corresponding positions (e.g., GPS coordinates of each of the plurality of waypoints).

Figure 31:
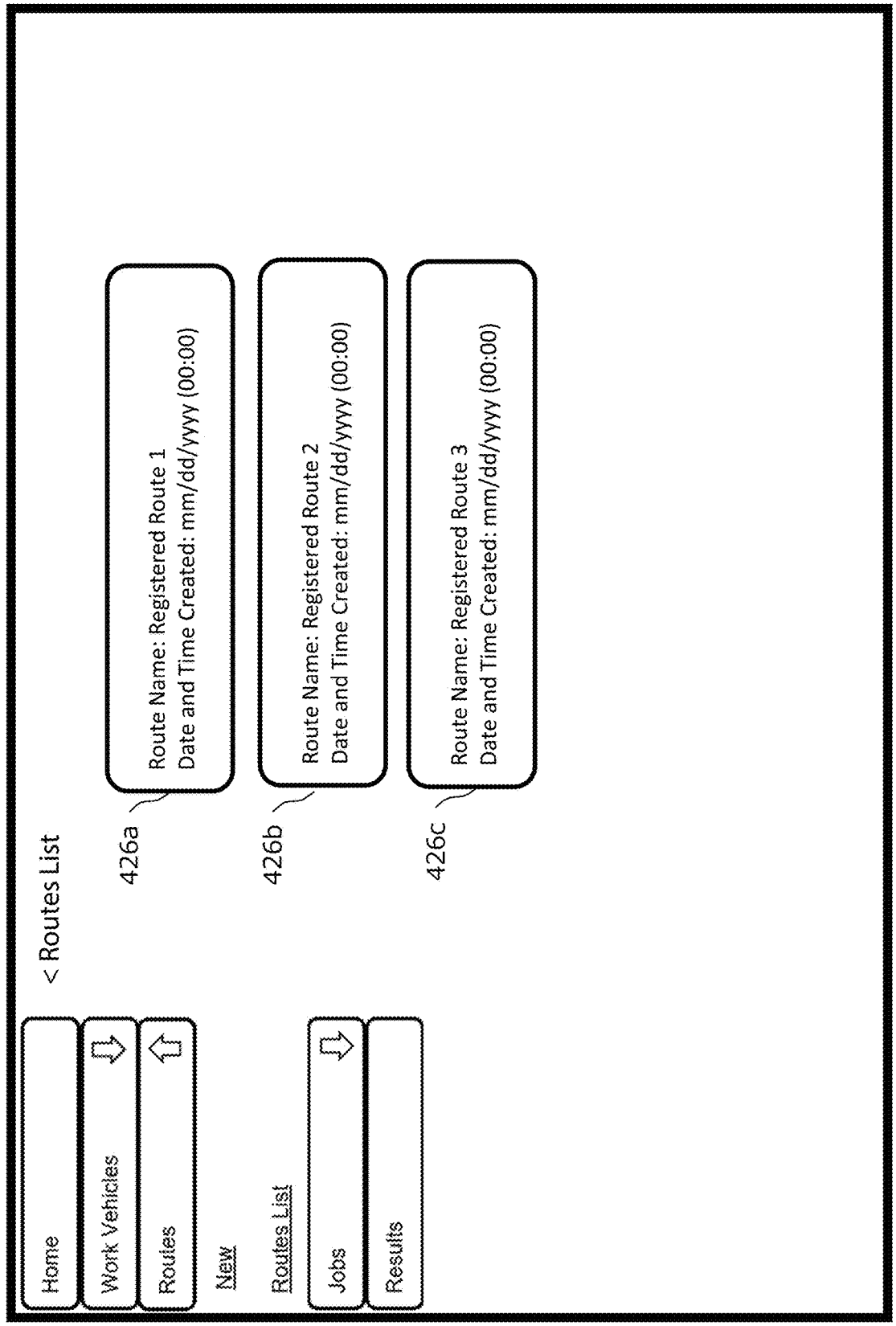
FIG. 31 is an example of a user interface according to a preferred embodiment of the present invention.

In a preferred embodiment of the present invention, the user interface of the terminal 400 can display the registered routes that have been recorded/saved. For example, the user interface can display information regarding each of the registered routes that have been recorded/saved in accordance with the step discussed above with respect to FIG. 14. FIG. 31 shows an example of the user interface of the terminal 400 which displays an information window 426*a* of a first registered route 1, an information window 426*b* of a second registered route 2, and an information window 426*c* of a third registered route 3. The information windows shown in FIG. 31 can include information such as the name of the registered route and the date and time at which the registered route was recorded/saved/created. In a preferred embodiment, the display screen of the user interface which displays information regarding each of the registered routes (e.g., the display screen of FIG. 31) can be reached by pressing the "Routes List" button 420-34 shown in FIG. 15.

Figure 32:
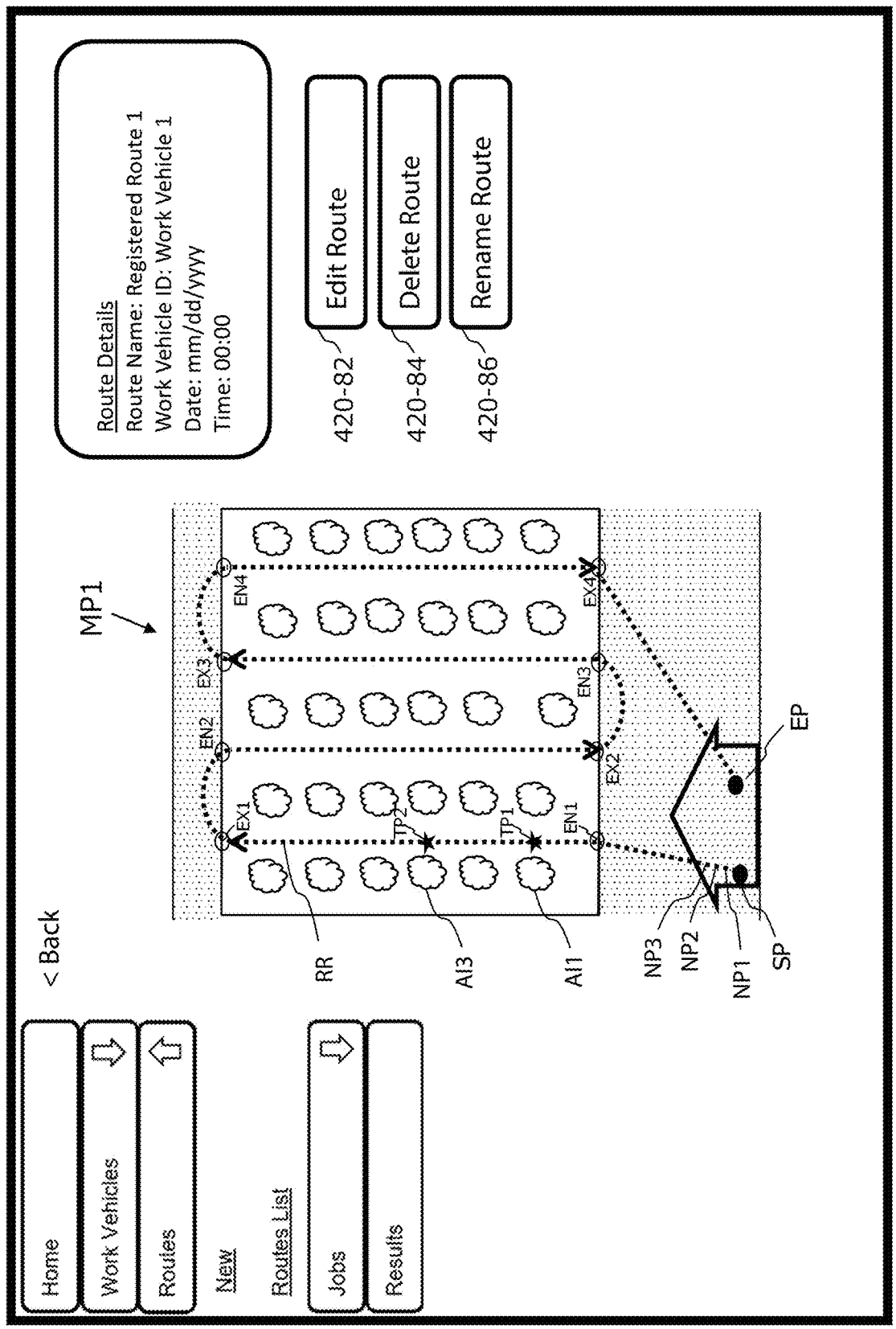
FIG. 32 is an example of a user interface according to a preferred embodiment of the present invention.

In a preferred embodiment of the present invention, the information windows 426 (the information window 426a of the registered route 1, the information window 426b of the registered route 2, and the information window 426c of the registered route 3) can function as buttons of the user interface of the terminal 400. For example, when one of the information windows 426 is pressed, a display screen of additional information regarding the respective registered route is displayed on the user interface of the terminal 400. For example, when the information window 426a shown in FIG. 31 is pressed, the user interface of the terminal 400 will proceed to the display screen shown in FIG. 32. In the display screen shown in FIG. 32, additional information regarding the registered route 1, such as an agricultural field map MP1 showing the registered route 1 (the registered route RR) is displayed.

In a preferred embodiment of the present invention, the user interface of the terminal 400 allows a user to modify/edit a registered route, deleted a registered route, and rename a registered route. For example, the user interface shown in FIG. 32 includes an "Edit Route" button 420-82 which a user can press to modify/edit the registered route RR, a "Delete Route" button 420-84 which the user can press to delete the registered route (e.g., remove/delete the registered route RR from the storage device 450 and/or the storage device 570 in which it is saved), and a "Rename Route" button 420-86 which the user can press to rename the registered route RR.

Figure 33:
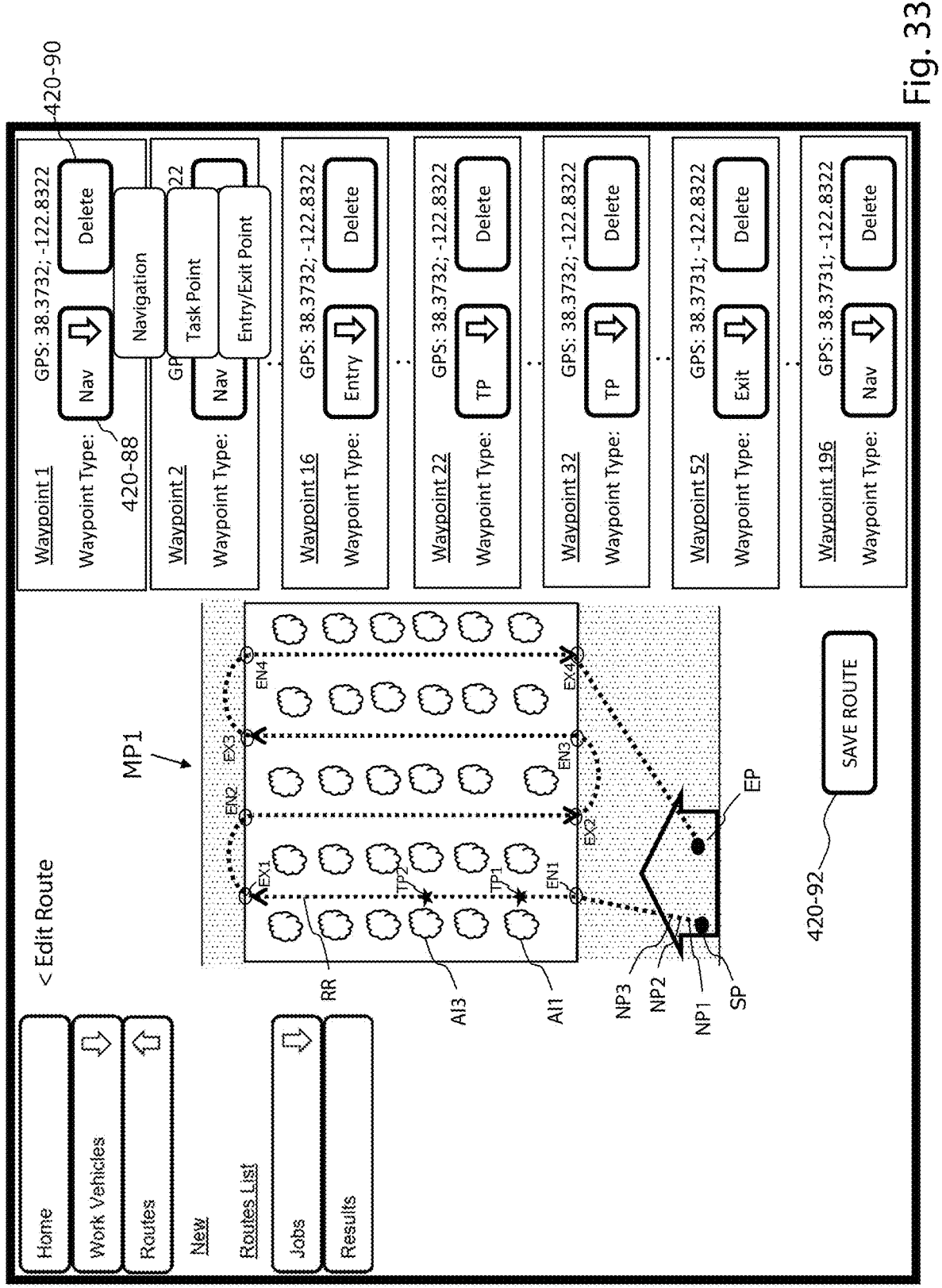
FIG. 33 is an example of a user interface according to a preferred embodiment of the present invention.

In a preferred embodiment of the present invention, when the user presses the "Edit Route" button 420-82, the user interface proceeds to a display screen shown in FIG. 33. The user interface screen shown in FIG. 33 includes the list of the plurality of waypoints included in the registered route RR and an agricultural field map MP1 that displays the registered route RR. In a preferred embodiment, each of the plurality of waypoints included in the list includes a waypoint-type drop down button 420-88 and a "Delete" button 420-90. The "Delete" button 420-90 allows a user to delete a certain waypoint from the registered route RR. The waypoint-type drop down button 420-88 allows the user to modify/change a certain waypoint to a different type of waypoint. For instance, in the example shown in FIG. 33, the waypoint-type drop down button 420-88 that corresponds to waypoint 1 can be used to change waypoint 1 from a navigation point to a task point or an entry/exit point. Similarly, the waypoint-type drop down button 420-88 that corresponds to waypoint 16 can be used to change the waypoint 16 from an entry point to a navigation point or a task point, and the waypoint-type drop down button 420-88 that corresponds to waypoint 22 can be used to change waypoint 22 from a task point to a navigation point or an entry/exit point.

In the example shown in FIG. 33, the list of the plurality of waypoints included in the registered route RR does not include the start SP or the end EP because the registered route RR must include a start SP or an end EP, such that functionality to change the start SP or the end EP to a different type of waypoint, or to delete the start SP or an end EP, may not be necessary. However, in an alternative embodiment, the list of the plurality of waypoints included in the registered route RR can include the start SP or the end EP.

In a preferred embodiment, the user interface shown in FIG. 33 allows a user to move the location of each of the plurality of waypoints included in the registered route. For example, the user interface shown in FIG. 33 can allow a user to move each of the start point SP, the navigation points NP, the entry points EN and the exit points EX, the task points TP, and the end point EP. For instance, each of the plurality of waypoints of the registered route RR displayed on the agricultural field map MP1 shown in FIG. 33 can be selected (pressed) and moved to a new location. For example, the user interface can allow the user to select the start point SP and drag the start point SP to a new location, or select the end point EP and drag the end point EP to a new location.

In a preferred embodiment of the present invention, after the registered route RR has been edited/modified, the user interface allows the user to save the modified registered route. For example, after the registered route RR has been edited/modified, the user is able to press the "Save Route" button 420-92 to save the modified registered route. The modified registered route can be saved with the previous name for the registered route or saved with a new name for the registered route.

Figure 19:
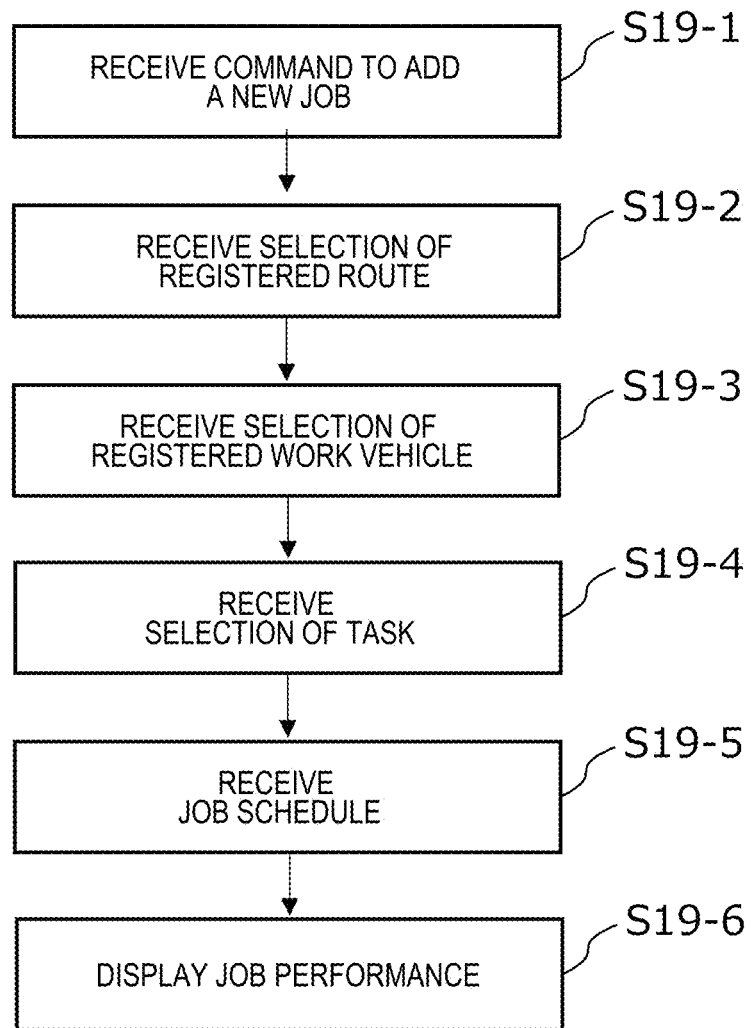
FIG. 19 is a flowchart that shows steps related to the process of scheduling a job with the work vehicle system according to a preferred embodiment of the present invention.

FIG. 19 shows a flowchart that includes steps related to the process of scheduling a job with the work vehicle system. In a preferred embodiment, the processor 460 of the terminal 400 and/or the processor 560 of the processing unit 560 can be configured or programmed to perform the steps shown in FIG. 19. In a case in which the processor 560 performs the steps shown in FIG. 19, the processor 560 can be configured or programmed to perform these steps in accordance with inputs received by the input device 420 of the terminal 400.

Figure 20:
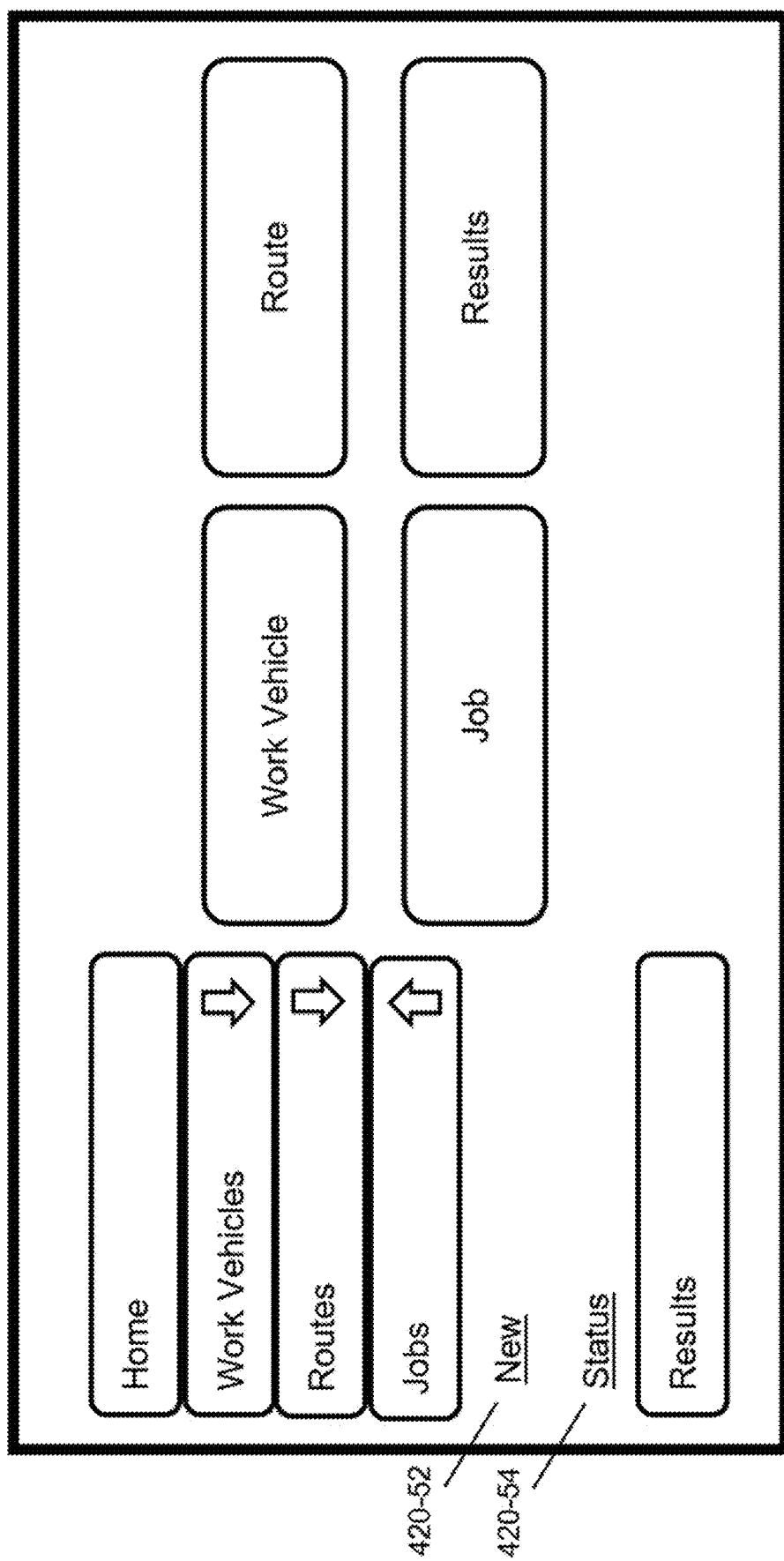
FIG. 20 is an example of a user interface according to a preferred embodiment of the present invention.

In step S19-1, an input to add a new job to the work vehicle system is received using the user interface of the terminal 400. For example, the user interface of the terminal 400 allows a user to input a command to add a new job to the work vehicle system. More specifically, if a user presses the jobs pull down menu 420-8 shown in FIG. 10, the user interface of the terminal 400 will proceed to a display screen shown in FIG. 20, in which an "New" button 420-52 and a "Status" button 420-54 are displayed. In step S19-1, a user is able to press the "New" button 420-52 to input a command to add a new job to the work vehicle system. When the "New" button 420-52 is pressed, the user interface of the terminal 400 will proceed to display screen shown in FIG. 21.

In step S19-2, an input to select a registered route for the new job is received by the user interface of the terminal 400. For example, the user interface of the terminal 400 allows a user to select a registered route that the work vehicle will follow when the work vehicle executes the new job. More specifically, the user interface of the terminal 400 shown in FIG. 21 allows a user to use the routes pull down menu 420-56 to select a registered route with which the new job will be executed. In a preferred embodiment, the registered route selected in step S19-2 and used to execute the new job must be a registered route (i.e., a route which has been previously registered with the system). For example, the registered route selected to be used to execute the new job can be a route which has previously been registered with the system using the steps discussed above with respect to FIG. 14. The routes pull down menu 420-56 can allow a user to search/scroll through a list of registered routes from which to select the registered route to be used to execute the new job.

Figure 21:
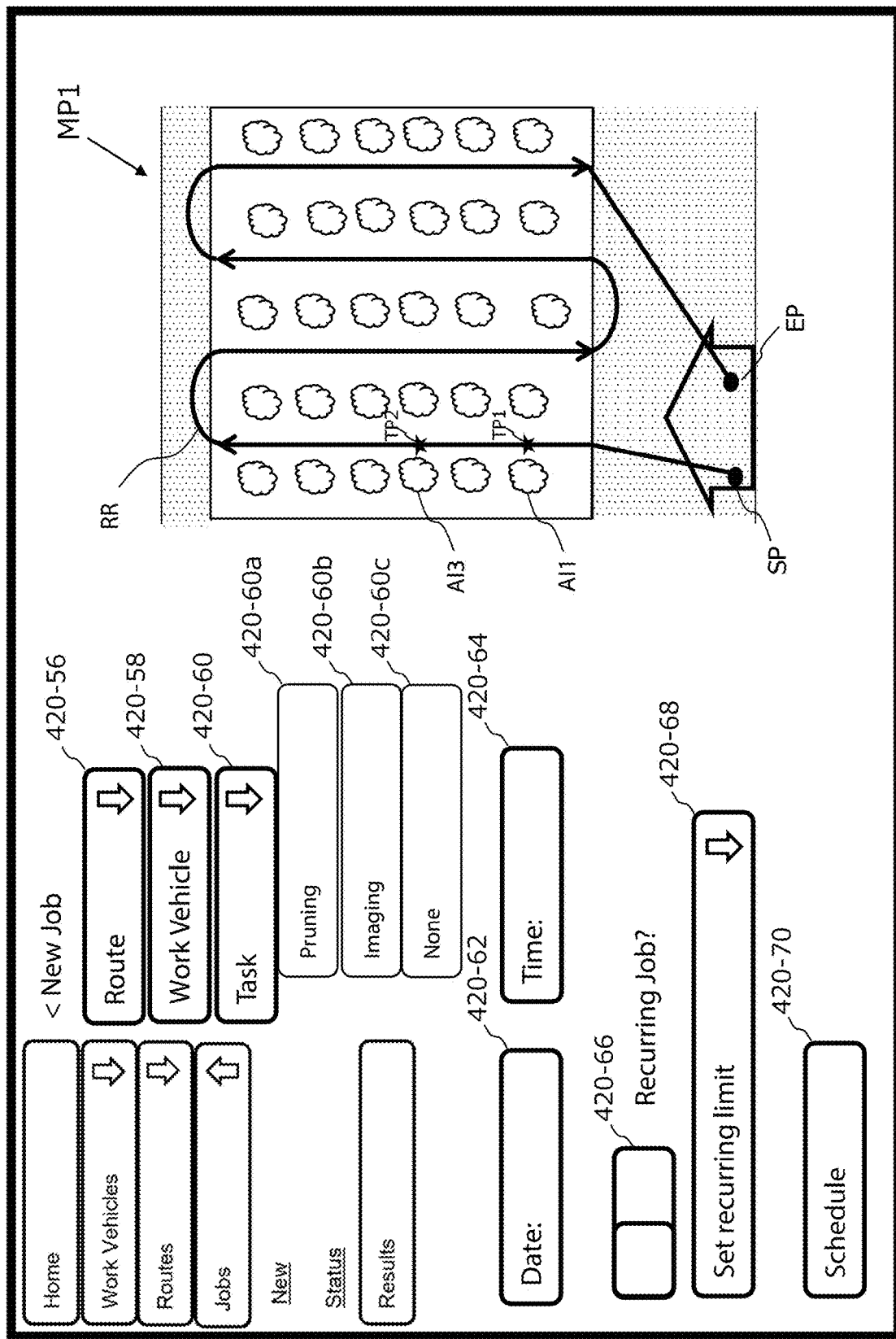
FIG. 21 is an example of a user interface according to a preferred embodiment of the present invention.

In a preferred embodiment of the present invention, when the registered route for the new job has been selected in step 19-2, the user interface of the terminal 400 displays a preview of the registered route RR. For example, in FIG. 21, the user interface of the terminal 400 displays a preview of the registered route RR that includes the start point SP, the task points TP, and the end point EP, as shown in FIG. 21, for example. Although, the preview of the registered route RR can also include the navigation points NP and/or the entry points EN and the exit points EX.

In step S19-3, an input to select a registered work vehicle for the new job is received using the user interface of the terminal 400. For example, the user interface of the terminal 400 allows a user to select a registered work vehicle to execute the new job. More specifically, the user interface of the terminal 400 shown in FIG. 21 allows a user to use the work vehicle pull down menu 420-58 to select a registered work vehicle with which the new job will be executed. In a preferred embodiment, the registered work vehicle selected in step S19-3 and used to execute the new job must be a registered work vehicle (i.e., a work vehicle which has previously been registered with the system). For example, the registered work vehicle selected to be used to execute the new job can be a work vehicle which has previously been registered with the system using the steps discussed above with respect to FIG. 11. The work vehicle pull down menu 420-58 can allow a user to search/scroll through a list of registered work vehicle from which to select the work vehicle to be used to execute the new job.

In a preferred embodiment of the present invention, the registered work vehicle selected in step S19-3 to execute the new job can be a registered work vehicle different from the registered work vehicle used to register the route selected in step 19-2. For example, even if a first registered work vehicle (e.g., registered work vehicle 1) was used to register a registered route (e.g., registered route 1), a second registered work vehicle (e.g., registered work vehicle 2) can be selected in step S19-3 to execute the new job which includes following the registered route (e.g., registered route 1).

In a preferred embodiment of the present invention, step S34-6 in FIG. 34 is performed in response to step S19-3 in which the registered work vehicle for the new job is selected. In step S34-6, a request for work vehicle status information is sent from the work vehicle system (e.g., the processing unit 500) to the registered work vehicle selected in step S19-3. In the example shown in FIG. 34, the work vehicle 100A corresponds to the registered work vehicle selected in step S19-3. In response to receiving the request for work vehicle status information from the work vehicle system, the work vehicle 100A that corresponds to the registered work vehicle selected in step S19-3 sends work vehicle status information to the work vehicle system (e.g., the processing unit 500) in step S34-7.

In step S19-4, an input to select a task for the new job is received using the user interface of the terminal 400. For example, the user interface of the terminal 400 allows a user to select a task (e.g., an agricultural task) to be performed when the new job is executed. The task selected in step 19-4 will be performed at the one or more task points (e.g., task point TP1 and task point TP2) included in the selected registered route when the new job is executed.

In the example shown in FIG. 21, the user interface of the terminal 400 allows a user to use the task pull down menu 420-60 to select a task to be performed when the new job is executed. The task pull down menu 420-60 can allow a user to search/scroll through a list of tasks from which to select the task to be perform when the new job is executed. In a preferred embodiment, the list of tasks from which to select the task to be perform when the new job is executed can be based on the registered work vehicle that was selected in step S19-3. In other words, the list of tasks from which to select the task to be perform when the new job is executed can only include tasks that the registered work vehicle selected in step S19-3 is able to perform. In the example show in FIG. 21, the list of tasks includes a pruning task which can be selected by pressing the pruning task button 420-60a, an imaging task which can be selected by pressing the imaging task button 420-60b, and a "None" task which can be selected by pressing the "None" task button 420-60c. However, the tasks included in the list of tasks is not limited to a pruning or imaging task.

In the example shown in FIG. 21, if the pruning task button 420-60a is selected then a pruning task will be performed at the one or more task points (e.g., task point TP1 and task point TP2) when the new job is executed. For example, if the pruning task button 420-60a is selected in step S19-4, when the new job is executed the work vehicle 100 will prune the agricultural item AI1 when the work vehicle 100 is positioned at the first task point TP1 and prune the agricultural item AI3 when the work vehicle 100 is positioned at the second task point TP2. Similarly, if the imaging task button 420-60b is selected, then an imaging task will be performed at the one or more task points (e.g., task point TP1 and task point TP2) when the new job is executed. That is, if the imaging task button 420-60c is selected in step S19-4, when the new job is executed the work vehicle 100 will image the agricultural item AI1 when the work vehicle 100 is positioned at the first task point TP1 and image the agricultural item AI3 when the work vehicle 100 is positioned at the second task point TP2.

In a preferred embodiment, if the "None" task button 420-60c is selected in step S19-4, no task will be performed at the one or more task points when the new job is executed by the work vehicle 100. The ability to select the "None" task button 420-60c in step S19-4 is beneficial to functionality because it allows the user to select a registered route (in step 19-2) that includes task points associated with agricultural items (e.g., the first task point TP1 associated with agricultural item AI1 and the second task point TP2 associated with agricultural item AI3) without having to have a task performed at the one or more task points when the new job is executed by the work vehicle 100. By selecting the "None" task button 420-60c in step S19-4, no task will be performed at the one or more task points when the new job is executed by the work vehicle 100. If there was no ability to select the "None" task button 420-60c in step S19-4, the user would need to modify the registered route to change the one or more task points to navigation points if the user did not want to have a task performed when the new job is executed. However, modifying the registered route in this manner can be time-consuming, inconvenient, and would require the user to modify the registered route again to include the one or more task points if the user wanted to have a task performed when a future new job is executed.

In step S19-5, an input to set a schedule for the new job is received using the user interface of the terminal 400. For example, the user interface of the terminal 400 allows a user to set a date, time, and frequency for the new job. In the example shown in FIG. 21, the user interface of the terminal 400 allows a user to set a date for the new job using the date field 420-62 and set a time for the new job using the time field 420-64. The user interface can also allow a user to set whether or not the job will be a recurring/repeated job using the recurring jobs toggle button 420-66. If the recurring jobs toggle button 420-62 is used to set that the job will be a recurring/repeated job, then the user interface of the terminal 400 allows a user to use the set recurring limit field 420-68 to set the frequency at which the job will be executed. For example, the set recurring limit field 420-68 can be used to set the job to be executed every day at 8 AM or every Sunday at 8 AM, for example. When the date, time, and/or frequency for the new job has been set, the user interface of the terminal 400 allows a user to input an instruction to finalize the schedule for the new job. For example, the user can finalize the schedule for the new job by pressing the "Schedule" button 420-70 shown in FIG. 21.

In a preferred embodiment, the job is executed according to the schedule set in step S19-5. The job is executed by autonomously controlling the registered work vehicle 100 selected in step S19-3 to follow the registered route RR selected in step S19-2 and perform the task selected in step S19-4 at each of the task points TP included in the registered route RR.

In a preferred embodiment, when a job is executed according to the schedule set in step S19-5, instructions to perform the job, including the registered route RR selected in step S19-2 and the task selected in step S19-4, are sent from the work vehicle system (e.g., the processing unit 500) to the registered work vehicle selected in step S19-3. In the example shown in FIG. 34, the work vehicle 100A corresponds to the registered work vehicle selected in step S19-3. In step S34-8 shown in FIG. 34, instructions to perform the job, including the registered route RR selected in step S19-2 and the task selected in step S19-4, are sent from the work vehicle system (e.g., the processing unit 500) to the registered work vehicle selected in step S19-3. As shown in FIG. 34, when the registered work vehicle executes the job, data and results related to the job are sent from the registered work vehicle 100 executing the job to the work vehicle system (e.g., the processing unit 500) in step S34-9. For example, in step S34-9, data and results related to the job including image data obtained from the one or more of the plurality of cameras 120 when the job is being executed and information related to a task point result (discussed in more detail below) can be sent from the registered work vehicle 100 executing the job to the work vehicle system (e.g., the processing unit 500).

Figure 25:
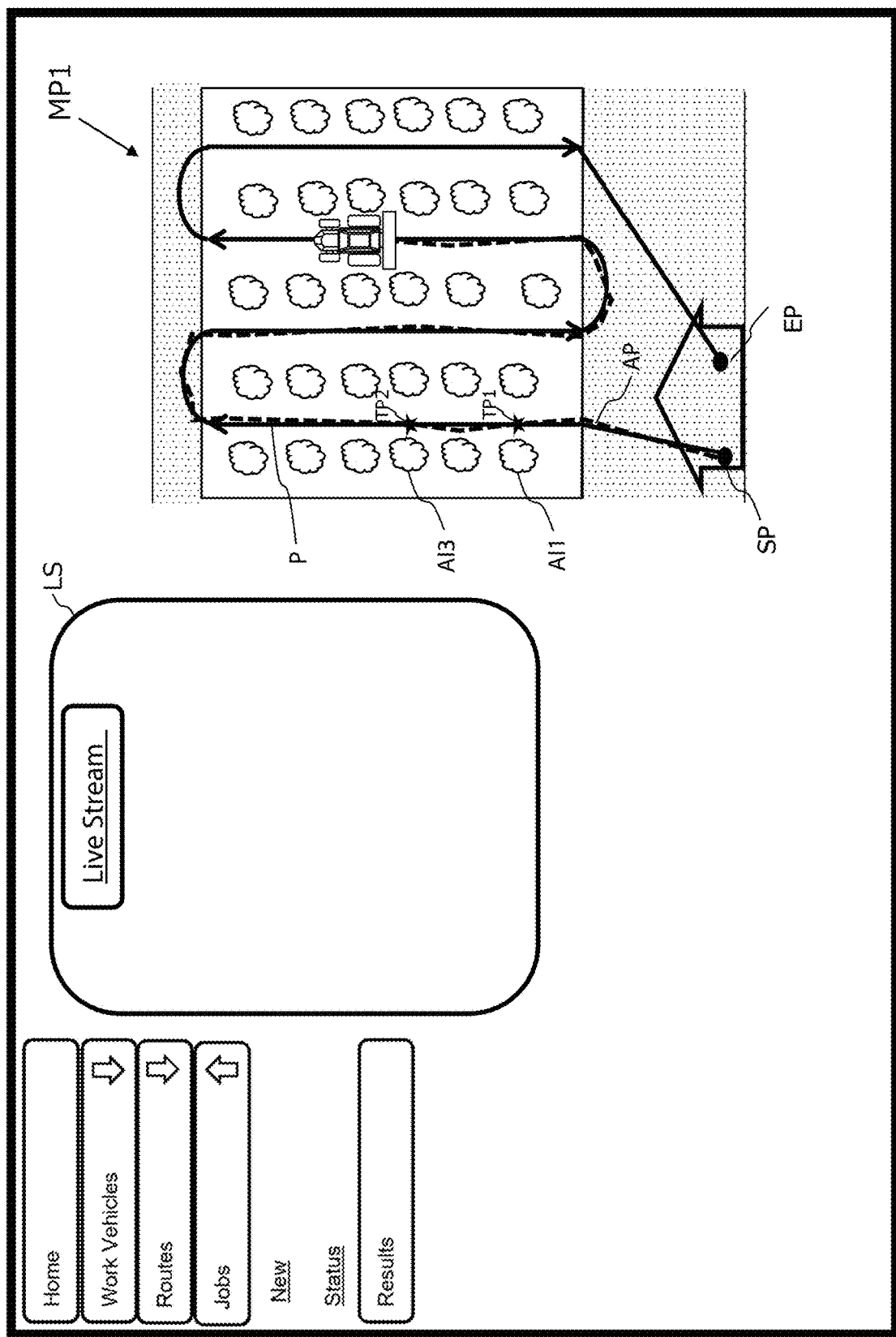
FIG. 25 is an example of a user interface according to a preferred embodiment of the present invention.

In a preferred embodiment of the present invention, when the registered work vehicle 100 executes a job, the registered work vehicle 100 is autonomously controlled to follow a target path P that is generated based on the selected registered route RR. For example, in a preferred embodiment, the controller 180 is configured or programmed to generate a target path P based on the plurality of waypoints of the registered route (e.g., the start point SP, the navigation points NP and/or the entry points EN and the exit points EX, the task points TP, and the end point EP). An example of a target path P is shown in FIG. 25.

In a preferred embodiment of the present invention, the controller 180 can be configured or programmed to function as a global planner and a local planner to generate the target path P. For example, the global planner can generate an initial target path based on the waypoints including the start point SP, the entry points EN and the exit points EX, the task points TP, and the end point EP. An example of the global planner includes a Dijkstra global planner, known to one of ordinary skill in the art. The local planner will receive the initial target path generated by the global planner, and if an obstacle is on the initial target path, for example, if an obstacle is detected by the one or more of the cameras 120, obstacle sensor 130, or the LIDAR sensor 135 as the work vehicle travels, then the local planner will change/update the initial target path so that the work vehicle avoids the obstacles. For example, the local planner is able to use Time Elastic Bands (TEB), known to one of ordinary skill in the art, to create a sequence of intermediate working machine poses (x-coordinate, y-coordinate, and heading 8) to modify the initial target path generated by the global planner.

However, in another preferred embodiment of the present invention, the controller 180 may not be configured or programmed to function as a global planner and a local planner to generate the target path P. For example, the controller 180 can be configured or programmed to generate the target path P based on each of the start point SP, the navigation points NP, the entry points EN and the exit points EX, the task points TP, and the end point EP.

Figure 22:
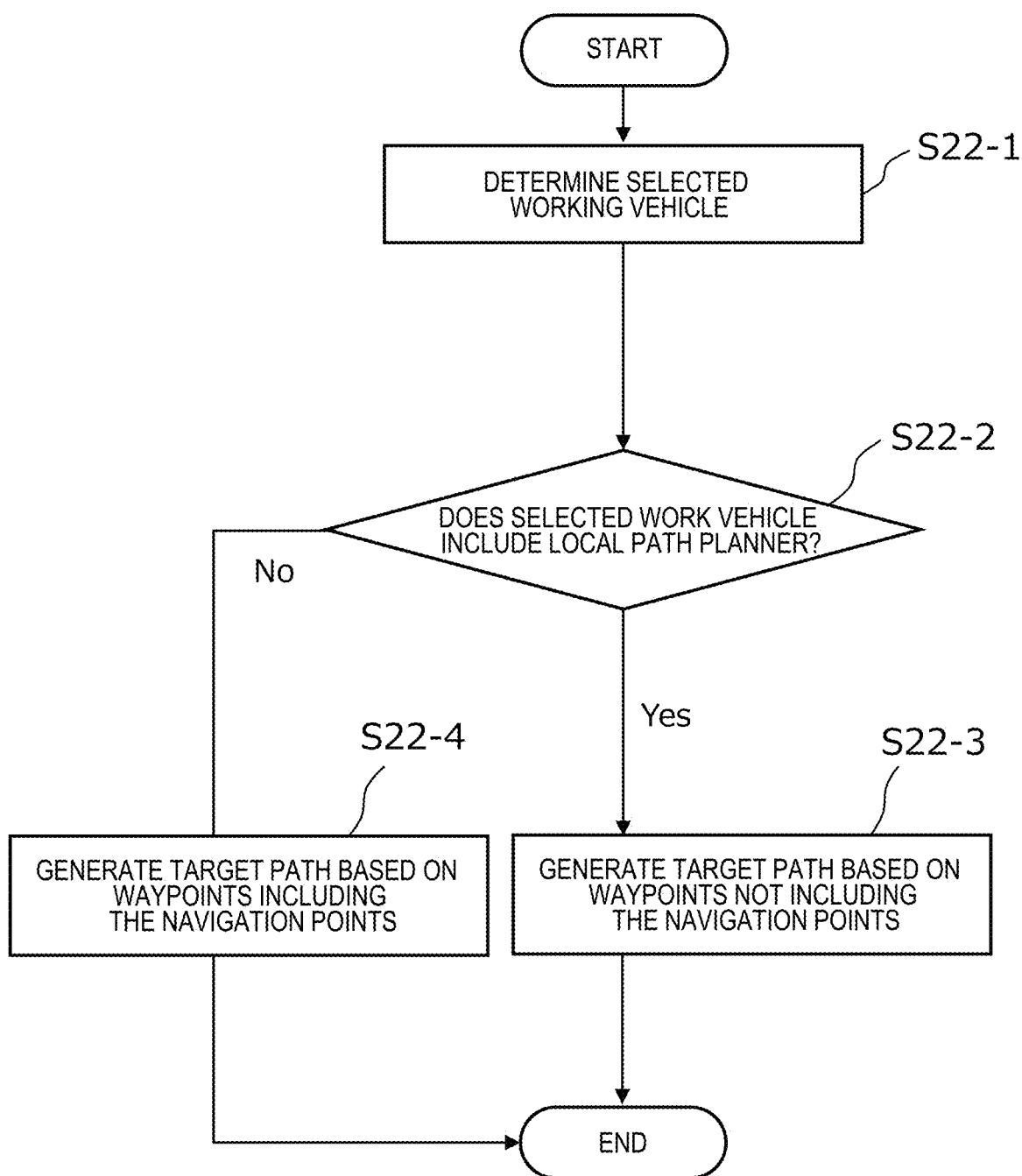
FIG. 22 is a flowchart that shows steps related to a process according to a preferred embodiment of the present invention.

FIG. 22 shows a process according to a preferred embodiment of the present invention. In a preferred embodiment, the controller 180 can be configured or programmed to perform the steps shown in FIG. 22. In step S22-1, the registered work vehicle selected in S19-3 is determined. Then, in step S22-2, it is determined whether or not the controller 180 of the registered work vehicle 100 is configured or programmed to function as a local planner. If in step S22-2, it is determined that the controller 180 of the registered work vehicle 100 is configured or programmed to function as a local planner (Yes in step S22-2), then the controller 180 generates the target path P based on waypoints of the registered route RR not including the navigation points NP (step S22-3). For example, the controller 180 can be configured or programmed to generate the target path P based on the start point SP, the entry points EN and the exit points EX, the task points TP, and the end point EP. In this case, the controller 180 can be configured or programmed to function as a local planner to generate the target path P between each of the entry points EN and the exit points EX.

On the other hand, if in step S22-2, it is determined that the controller 180 of the registered work vehicle 100 is not configured or programmed to function as a local planner (No in step S22-2), then the controller 180 generates the target path P based on waypoints of the registered route RR including the navigation points NP (step S22-4). For example, the controller 180 can be configured or programmed to generate the target path P based on the start point SP, the navigations points NP, the entry points EN and the exit points EX, the task points TP, and the end point EP. In this case, the controller 180 is configured or programmed to generate the target path P between each of the entry points EN and the exit points EX using the navigation points NP.

Figure 23:
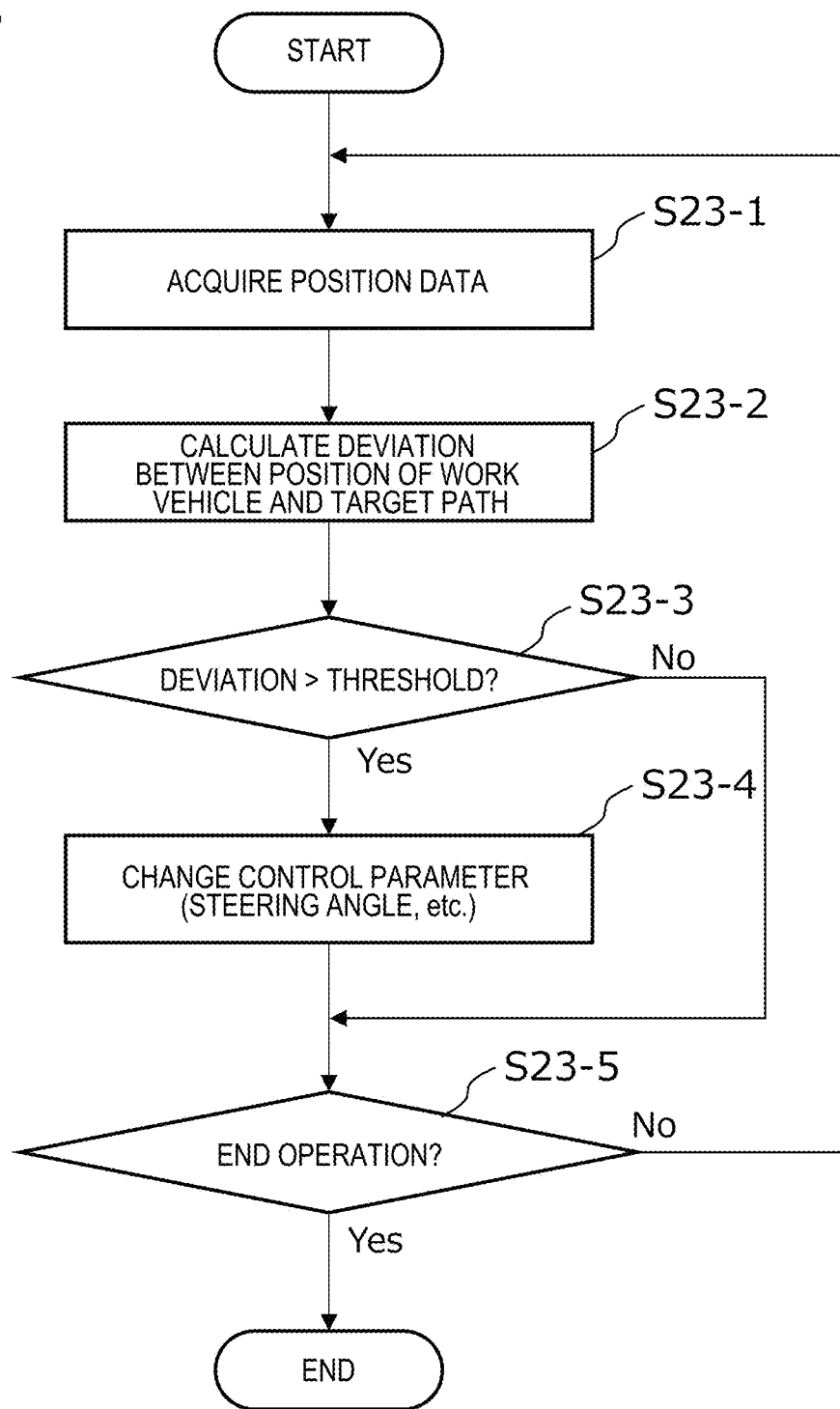
FIG. 23 is a flowchart that shows an example operation of steering control according to a preferred embodiment of the present invention.

FIG. 23 is a flowchart showing an example operation of steering control to be performed by the controller 180 when the registered work vehicle 100 is autonomously controlled to follow the target path P. During travel of the work vehicle 100, the controller 180 performs automatic steering by performing the operation from steps S23-1 to S23-5 shown in FIG. 23. The speed of the work vehicle 100 can be maintained at a previously-set speed, for example. First, during travel of the work vehicle 100, the controller 180 acquires data representing the position of the work vehicle 100 that is generated by the positioning device 110 (step S23-1). Next, the controller 180 calculates a deviation between the position of the work vehicle 100 and the target path (step S23-2). The deviation represents the distance between the position of the work vehicle 100 and the target path at that moment. The controller 180 determines whether the calculated deviation in position exceeds a previously-set threshold or not (step S23-3). If the deviation exceeds the threshold, the controller 180 changes a control parameter of the steering device included in the drive device 140 so as to reduce the deviation, thus changing the steering angle (step S23-4). If the deviation does not exceed the threshold at step S23-3, the operation of step S23-4 is omitted. At the following step S23-5, the controller 180 determines whether a command to end operation has been received or not. The command to end operation may be given when the user has instructed that self-driving be suspended through remote manipulations, or when the work vehicle 100 has arrived at the end of the target path (the end point EP), for example. If the command to end operation has not been issued, the control returns to step S23-1 and performs a similar operation based on a newly measured position of the work vehicle 100. The controller 180 repeats the operation from steps S23-1 to S23-5 until a command to end operation is given. The aforementioned operation is executed by the ECUs 182 and 184 in the controller 180, for example.

In the example shown in FIG. 23, the controller 180 controls the drive device 140 based on a deviation between the position of the work vehicle 100 as identified by the positioning device 110 and the target path P. However, a deviation in terms of directions may further be considered in the control. For example, when a directional deviation exceeds a previously-set threshold, where the directional deviation is an angle difference between the orientation of the work vehicle 100 as identified by the positioning device 110 and the direction of the target path P, the controller 180 may change the control parameter (e.g., steering angle) of the steering device of the drive device 140 in accordance with the deviation.

An example of steering control by the controller 180 will be described more specifically below with reference to FIGS. 24A to 24D.

Figure 24A:
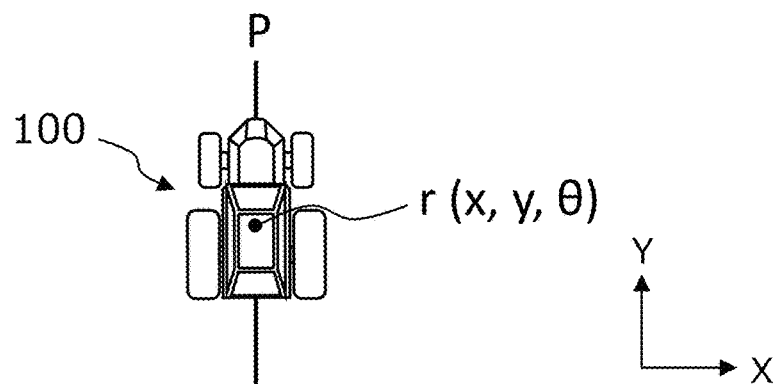
FIG. 24A is a diagram showing an example of a work vehicle that travels along a target path according to a preferred embodiment of the present invention.
Figure 24B:
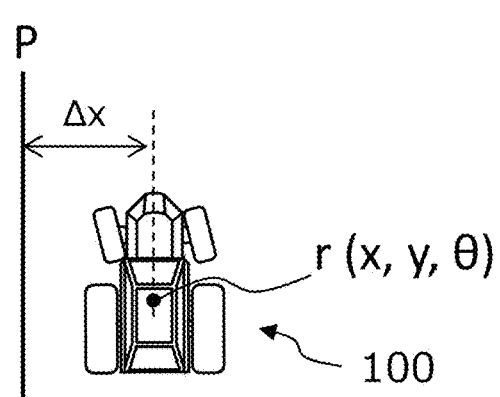
FIG. 24B is a diagram showing an example of a work vehicle at a position which is shifted rightward from a target path.
Figure 24C:
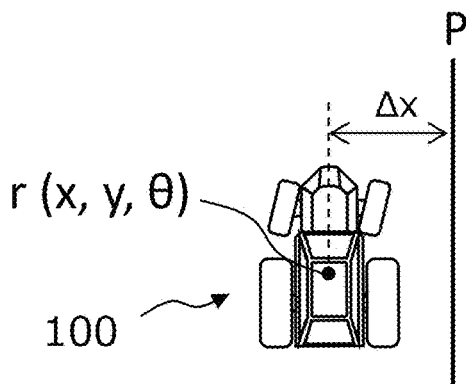
FIG. 24C is a diagram showing an example of a work vehicle at a position which is shifted leftward from a target path.
Figure 24D:
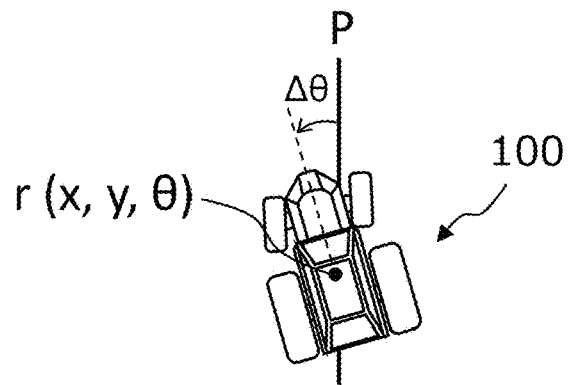
FIG. 24D is a diagram showing an example of a work vehicle which is oriented in an inclined direction with respect to a target path.

FIG. 24A is a diagram showing an example of a work vehicle 100 that travels along the target path P. FIG. 24B is a diagram showing an example of a work vehicle 100 at a position which is shifted rightward from the target path P. FIG. 24C is a diagram showing an example of a work vehicle 100 at a position which is shifted leftward from the target path P. FIG. 24D is a diagram showing an example of a work vehicle 100 which is oriented in an inclined direction with respect to the target path P. In these figures, the pose, i.e., the position and orientation, of the work vehicle 100 as measured by the positioning device 110 is expressed as r(x,y,θ). Herein, (x,y) are coordinates representing the position of a reference point on the work vehicle 100, in an XY coordinate system which is a two-dimensional coordinate system being fixed to the globe. In the examples shown in FIGS. 24A to 24D, the reference point on the work vehicle 100 is at a position on the cabin where a GNSS antenna is disposed, but the reference point may be at any arbitrary position. θ is an angle representing the measured orientation of the work vehicle 100. Although the target path P is shown parallel to the Y axis in the examples illustrated in these figures, generally speaking, the target path P may not necessarily be parallel to the Y axis.

As shown in FIG. 24A, in the case where the position and orientation of the work vehicle 100 are not deviated from the target path P, the controller 180 maintains the steering angle and speed of the work vehicle 100 without changing them.

As shown in FIG. 24B, when the position of the work vehicle 100 is shifted rightward from the target path P, the controller 180 changes the steering angle so that the traveling direction of the work vehicle 100 will be inclined leftward, thus bringing the work vehicle 100 closer to the target path P. Herein, not only the steering angle but also the speed may be changed. The magnitude of the steering angle may be adjusted in accordance with the magnitude of a positional deviation Δx, for example.

As shown in FIG. 24C, when the position of the work vehicle 100 is shifted leftward from the target path P, the controller 180 changes the steering angle so that the traveling direction of the work vehicle 100 will be inclined rightward, thus bringing the work vehicle 100 closer to the target path P. In this case, too, not only the steering angle but also the speed may be changed. The amount of change of the steering angle may be adjusted in accordance with the magnitude of the positional deviation Δx, for example.

As shown in FIG. 24D, in the case where the position of the work vehicle 100 is not considerably deviated from the target path P but its orientation is nonetheless different from the direction of the target path P, the controller 180 changes the steering angle so that the directional deviation Δθ will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the work vehicle 100 to return to the path P, so that the directional deviation Δθ will inevitably have a large absolute value. Conversely, when the positional deviation Δx has a small absolute value, the directional deviation Δθ needs to become closer to zero. Therefore, it may be advantageous to introduce a relatively large weight (i.e., control gain) for the directional deviation Δθ in determining the steering angle.

For the steering control and speed control of the work vehicle 100, control techniques such as PID control or MPC (Model Predictive Control) may be applied. Applying these control techniques will ensure smoothness of the control of bringing the work vehicle 100 closer to the target path P. Additionally, when an obstacle is detected by one or more obstacle sensors 130 during travel, the controller 180 can halt the work vehicle 100. Alternatively, when an obstacle is detected, the controller 180 may control the drive device 140 so as to avoid the obstacle.

In a preferred embodiment of the present invention, when the job is being executed by the work vehicle 100, the task selected in step S19-4 is performed at each of the task points TP included in the registered route. For example, when the controller 180 controls the work vehicle 100 to follow the target path P, the controller 180 can be configured or programmed to control the work vehicle 100 to stop at each task point TP for a predetermined period of time during which the work vehicle 100 performs the task at the respective task point TP. For example, the controller 180 can be configured or programmed to control the work vehicle 100 to stop at the first task point TP1 for a predetermined period of time during which the work vehicle 100 performs the task with respect to the agricultural item AI1, and stop at the second task point TP2 for a predetermined period of time during which the work vehicle 100 performs the task with respect to the agricultural item AI3.

In a preferred embodiment of the present invention, as discussed above, if the "None" task button 420-60c is selected in step S19-4, no task will be performed at the one or more task points when the new job is executed by the work vehicle 100. For example, the work vehicle can be controlled to travel/pass through each of the one or more task points without stopping at the one or more task points. Alternatively, the work vehicle can be controlled to stop at the one or more task points and not perform any task when stopped at the one or more task points.

Figure 28:
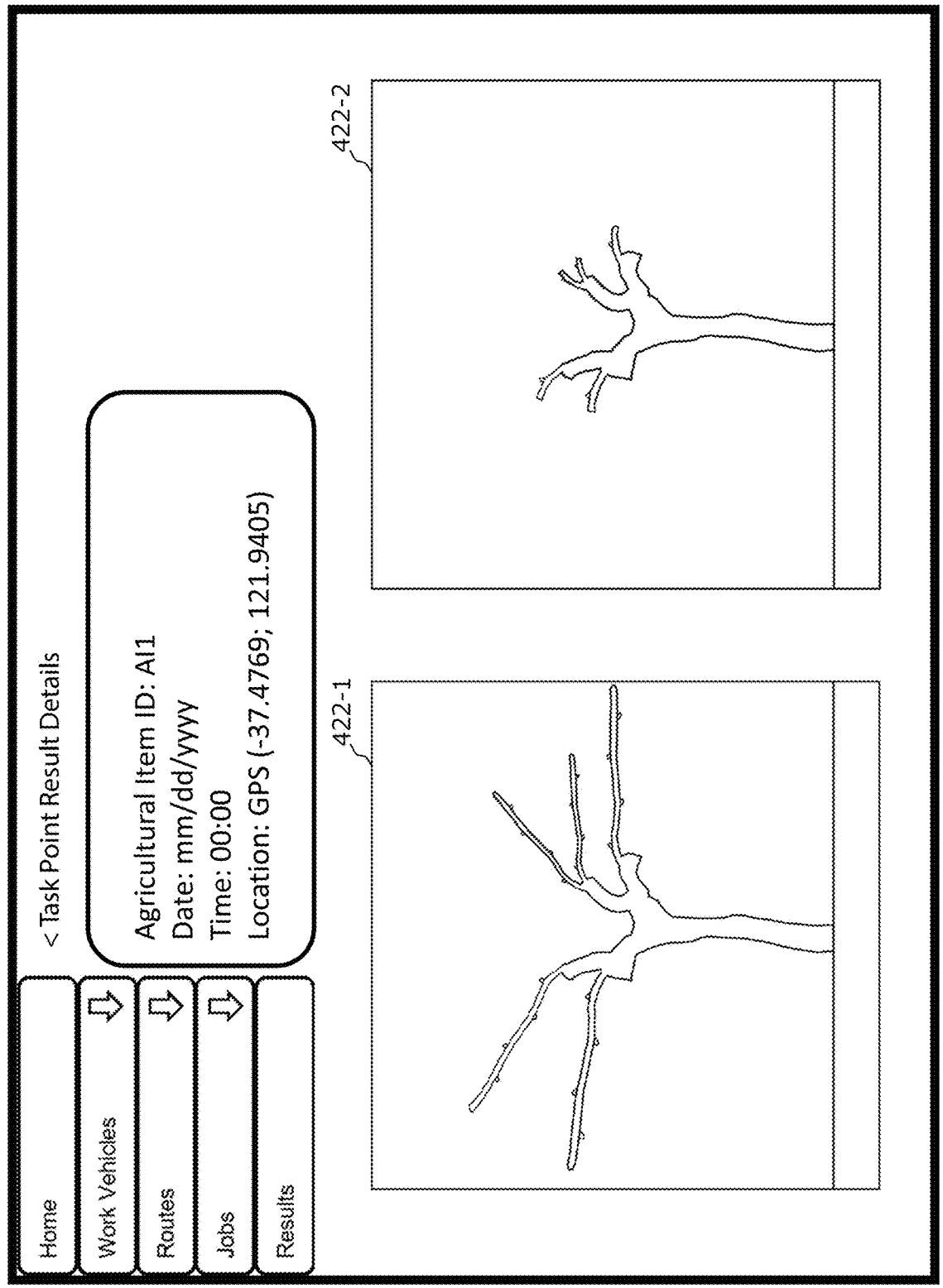
FIG. 28 is an example of a user interface according to a preferred embodiment of the present invention.

In a preferred embodiment of the present invention, when the work vehicle 100 is positioned at a task point TP, the cameras 120 can be used to capture image data of an agricultural item before, during, and after the work vehicle 100 performs the task with respect to the agricultural item. For example, the controller 180 can be configured or programed to control the one or more cameras 120 to capture image data of the first agricultural item AI1 before, during, and after the work vehicle 100 performs the task with respect to the first agricultural item AI1. For instance, if the task selected in step S19-4 is pruning, the one or more cameras 120 can be used to capture first image data of the first agricultural item AI1 before the work vehicle 100 performs pruning on the first agricultural item AI1 and second image data of the first agricultural item AI1 after the work vehicle 100 has pruned the first agricultural item AI1. FIG. 28 shows an example of first image data 422-1 of the first agricultural item AI1 before the work vehicle 100 performs pruning on the first agricultural item AI1 and second image data 422-2 of the first agricultural item AI1 after the work vehicle 100 has pruned the first agricultural item AI1. In a preferred embodiment, the work vehicle is located at the task point and does not move between when the first image data 422-1 of the first agricultural item AI1 is captured and when the second image data 422-2 of the first agricultural item AI1 is captured.

In a preferred embodiment of the present invention, the one or more cameras 120 can include a stereo camera and/or a depth camera, which can be used to capture data such as three-dimensional data and/or point cloud data of the agricultural item before, during, and after the work vehicle 100 performs the task with respect to the agricultural item. The LiDar sensor 135 can also be used to capture three-dimensional data of the agricultural item before, during, and after the work vehicle 100 performs the task with respect to the agricultural item. For example, the controller 180 can be configured or programed to control the one or more cameras 120 and/or the LiDar sensor 135 to capture three-dimensional data of the first agricultural item AI1 before, during, and after the work vehicle 100 performs the task with respect to the first agricultural item AI1.

In a preferred embodiment, the image data of an agricultural item (e.g., the first image data 422-1 and the second image data 422-2) captured when the work vehicle 100 is positioned at a task point TP can be included in a task point result that corresponds to the task point TP and can be recoded/saved in the system (e.g., in the storage device 450 of the terminal 400 and/or the storage device 570 of the processing unit 500). For example, a first task point result that corresponds to the first task point TP1 and a second task point result that corresponds to the second task point TP2 can be recorded/saved. Each of the task point results can also include information such as the type of task that was performed at the task point (e.g., a pruning task or an imaging task) and the registered route in which the task point is included (the registered route that the work vehicle 100 was following when the image data of an agricultural item was captured at the task point).

In a preferred embodiment of the present invention, when the job is being executed by the work vehicle 100, the user interface of the terminal 400 can display the job being executed (step S19-6). For example, the user interface of the terminal 400 can display the target path P, an actual path AP that was taken by the work vehicle 100, and the current position of the work vehicle 100. In an example shown in FIG. 25, the user interface of the terminal 400 displays the target path P with a solid line, the actual path AP that was taken by the work vehicle 100 with a dotted line, and the current position of the work vehicle 100. The actual path AP taken by the work vehicle 100 and the current position of the work vehicle 100 can be determined based on information received by the positioning device 110 as the job is being executed.

In a preferred embodiment of the present invention, when the job is being executed by the work vehicle 100, the user interface of the terminal 400 can display a live stream window LS, as shown in FIG. 25, for example. The live stream window LS shows an image or video stream that can be generated using image data obtained from the one or more the plurality of cameras 120. For example, the live stream window LS can show an image of the first agricultural item AI1 when the work vehicle 100 is positioned adjacent to the first agricultural item AI1 and the work vehicle 100 performs the task with respect to the first agricultural item AI1.

Figure 26:
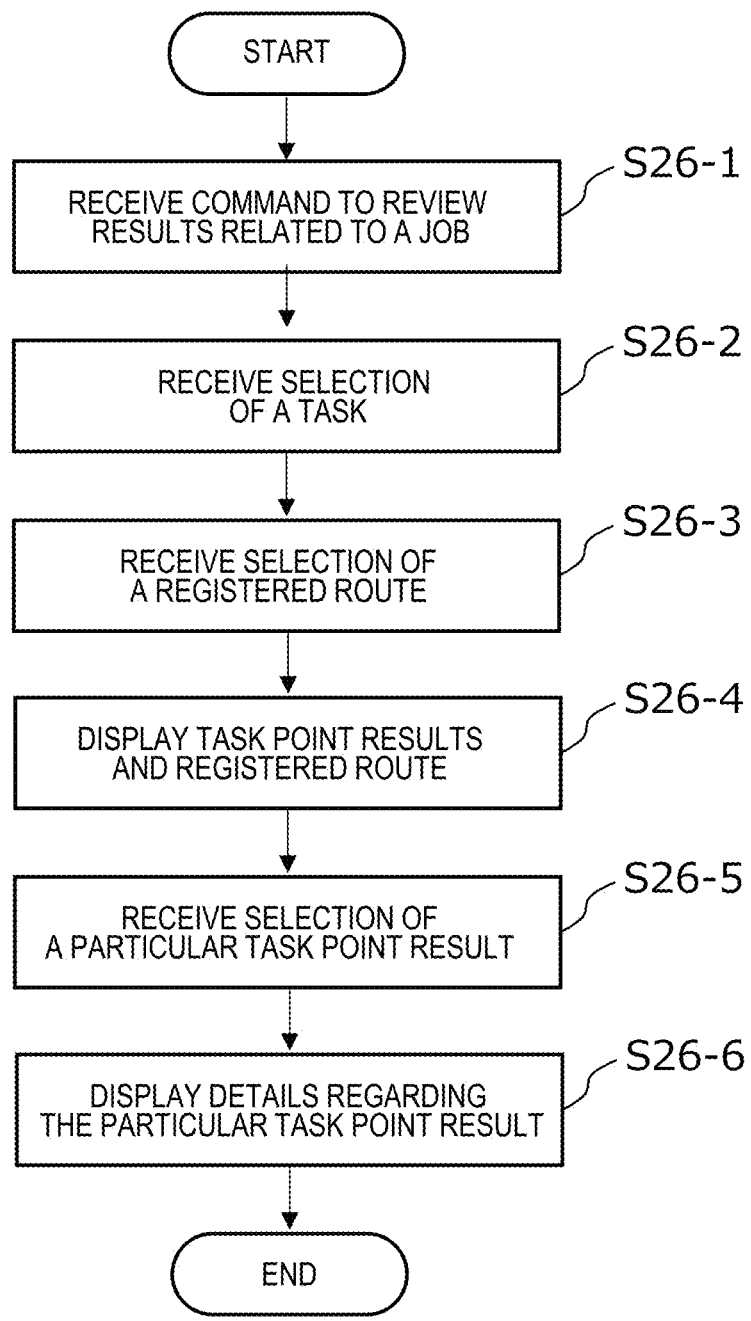
FIG. 26 is a flowchart that shows steps related to a process of viewing results related to a job according to a preferred embodiment of the present invention.

FIG. 26 shows a flowchart that includes steps related to the process of viewing results related to a job. In a preferred embodiment, the processor 460 of the terminal 400 and/or the processor 560 of the processing unit 560 can be configured or programmed to perform the steps shown in FIG. 26. In a case in which the processor 560 performs the steps shown in FIG. 26, the processor 560 can be configured or programmed to perform these steps in accordance with inputs received by the input device 420 of the terminal 400.

In step S26-1, an input to view results related to a job is received using the user interface of the terminal 400. For example, the user interface of the terminal 400 allows a user to input a command to view results related to a job. More specifically, if a user presses the results menu button 420-10 shown in FIG. 10, the user interface of the terminal 400 will proceed to the display screen shown in FIG. 27. The user interface of the terminal 400 shown in FIG. 27 allows a user to select a task in step S26-2 (e.g., using the task field 420-72) and select a registered route in step S26-3 (e.g., using the route field 420-74), which are used to search/filter the task point results that have been recorded/saved. When a task and a route have been selected, in step S26-4, the user interface of the terminal 400 displays a list of the task point results (e.g., a first task point result 420-76a and a second task point result 420-76b shown in FIG. 27) based on the task selected in step S26-2 and the route selected in step S26-3. The list of task point results includes information such as an agricultural item identifier that identifies the agricultural item on which the task was performed, a location at which the task was performed (e.g., the GPS location of the work vehicle 100 when the task was performed on the agricultural item), and the date and time at which the task was performed.

Figure 27:
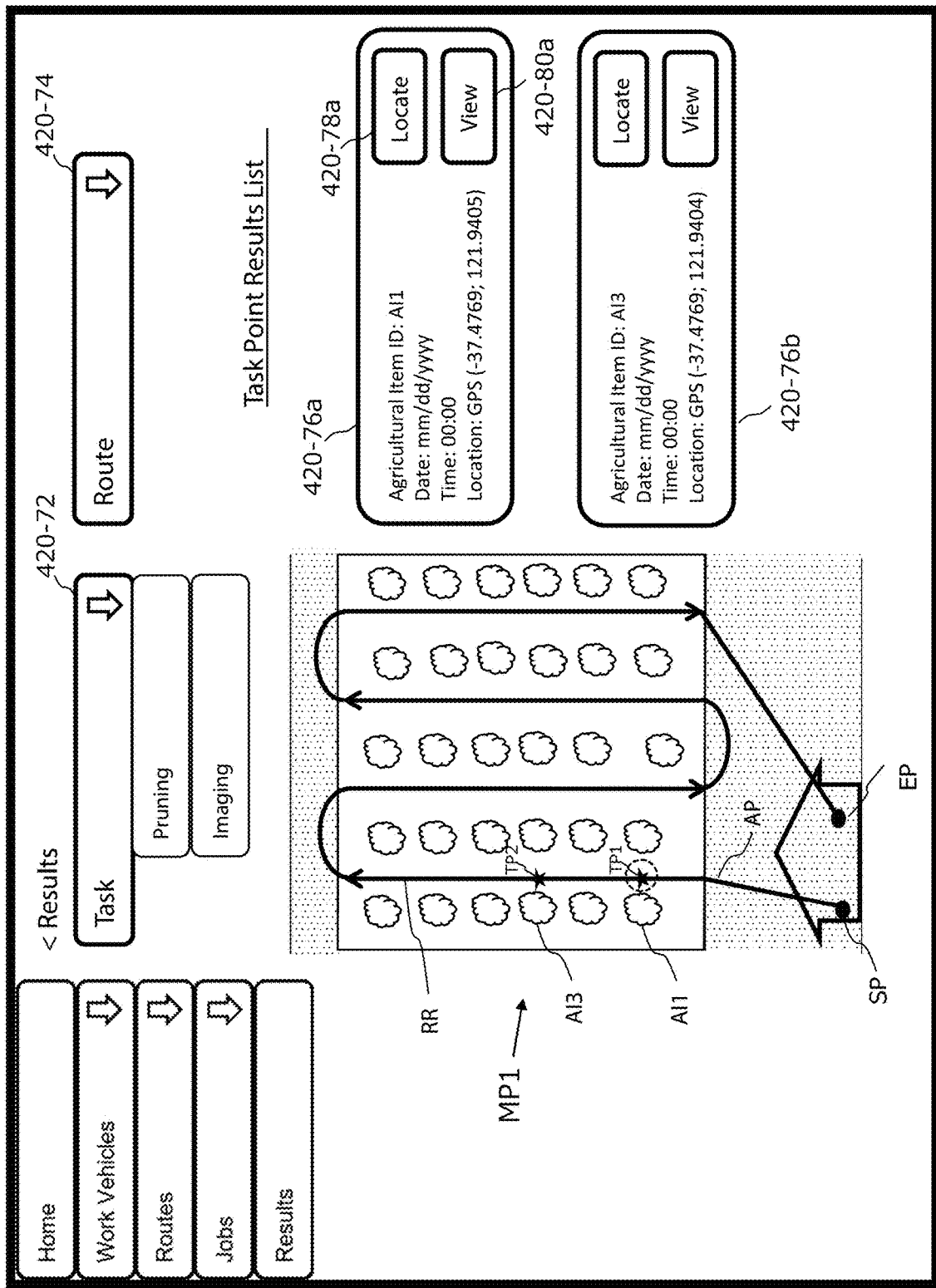
FIG. 27 is an example of a user interface according to a preferred embodiment of the present invention.

In a preferred embodiment of the present invention, in step S26-4, the user interface of the terminal 400 can also display the registered route RR selected in step S26-3 including the task points TP included in the registered route RR. For example, as shown in FIG. 27, the user interface of the terminal 400 can display the registered route RR including the first task point TP1 and the second task point TP2.

In a preferred embodiment of the present invention, the list of task point results can also include a locate button 420-78 and a view button 420-80. The locate button 420-78 and the view button 420-80 can be used to select a particular task point result to receive details/information regarding the task point result. When the locate button 420-78 is pressed (e.g., an example of step S26-5), the location of the task point that corresponds to the task point result is highlighted on the registered route RR displayed on the user interface of the terminal 400 (e.g., an example of step S26-6). For example, the location of the task point TP can highlighted on the registered route RR displayed on the user interface of the terminal 400 by displaying the task point TP with a color or symbol different from the other task points TP included in the registered route RR displayed on the user interface of the terminal 400. For instance, in FIG. 27, when the locate button 420-78*a* is pressed, the location of the first task point TP1 is highlighted on the registered route RR displayed on the user interface of the terminal 400 by displaying the task point TP1 surrounded by a dashed circle.

In a preferred embodiment of the present invention, when the view button 420-80 is pressed (e.g., an example of step S26-5), the user interface of the terminal 400 can display information regarding the task point result. For example, when the view button 420-80 is pressed, the user interface of the terminal 400 can display details/information regarding the task point result such as image data of the agricultural item before the work vehicle 100 performed the task on the agricultural item and image data of the agricultural item after the work vehicle 100 performed the task on the agricultural item (e.g., an example of step S26-6). For example, if the view button 420-80*a* is pressed, the user interface of the terminal 400 can proceed to the display screen shown in FIG. 28 which displays information regarding the task point result such as the first image data 422-1 of the first agricultural item AI1 before the work vehicle 100 performed pruning on the first agricultural item AI1 and the second image data 422-2 of the first agricultural item AI1 after the work vehicle 100 has pruned the first agricultural item AI1. In a preferred embodiment, the first image data 422-1 of the first agricultural item AI1 captured before the work vehicle 100 performed pruning on the first agricultural item AI1 and the second image data 422-2 of the first agricultural item AI1 captured after the work vehicle 100 has pruned the first agricultural item AI1 can be displayed on a same screen, for example, as shown in FIG. 28. However, the first image data 422-1 and the second image data 422-2 can also be displayed on separate screens.

In a preferred embodiment, the first image data 422-1 of the first agricultural item AI1 captured before the work vehicle 100 performed pruning on the first agricultural item AI1 and the second image data 422-2 of the first agricultural item AI1 captured after the work vehicle 100 has pruned the first agricultural item AI1 can be associated with the agricultural item identifier that identifies the agricultural item on which the task was performed. In a preferred embodiment, the agricultural item identifier can be displayed when the first image data 422-1 and the second image data 422-2 are displayed, as shown in FIG. 28, for example.

Figure 35:
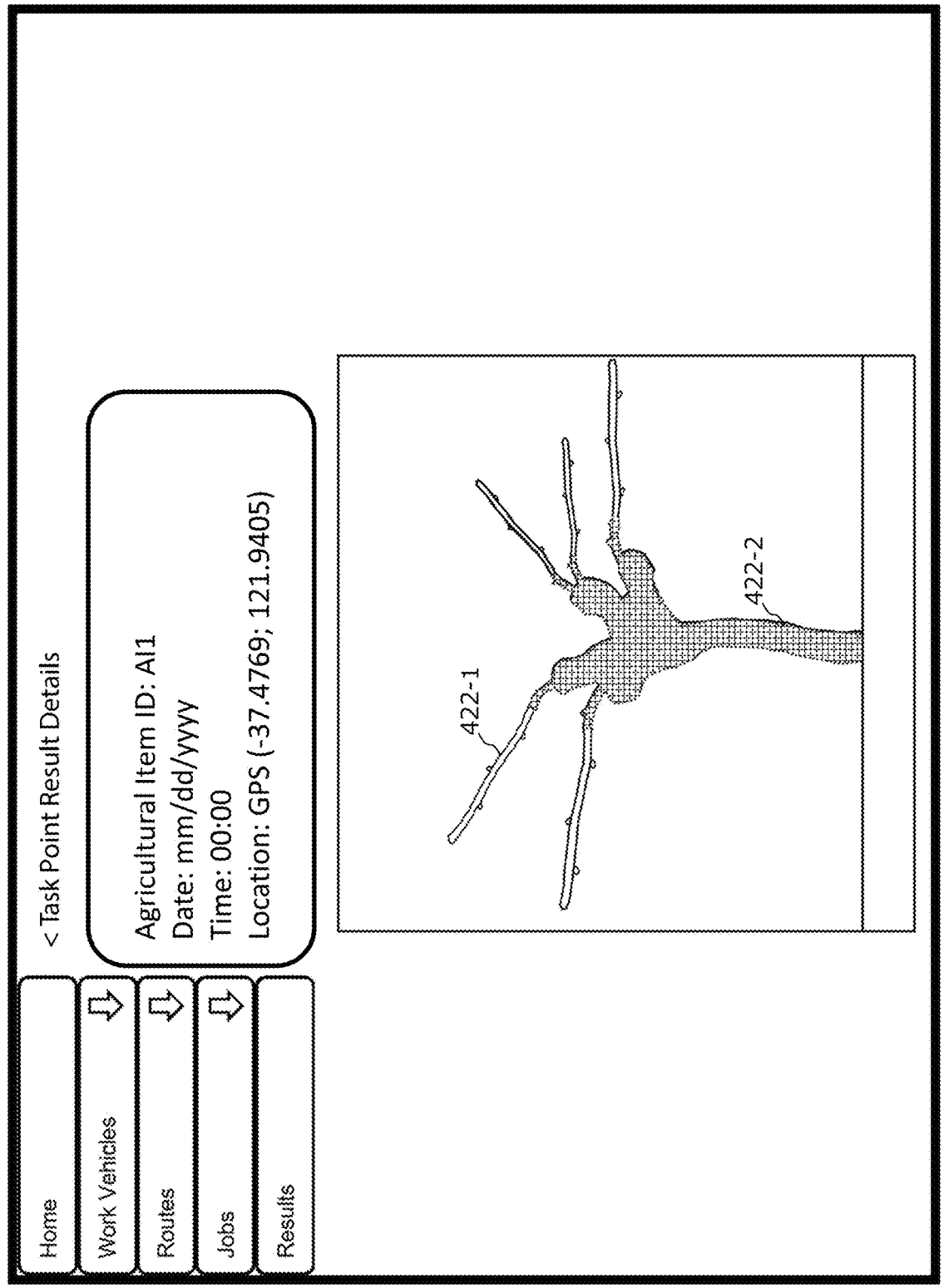
FIG. 35 is an example of a user interface according to a preferred embodiment of the present invention.

In a preferred embodiment of the present invention, in addition to displaying the first image data 422-1 and the second image data 422-2 separately, the second image data 422-2 can be displayed superimposed on the first image data 422-1, as shown in FIG. 35, for example. The second image data 422-2 displayed superimposed on the first image data 422-1 can show the point and angle at which the agricultural item was pruned, for example. In the example shown in FIG. 35, the second image data 422-2 is displayed with a pattern and is superimposed on the first image data 422-1, for example, to show the point and angle at which the agricultural item was pruned.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims,

What is claimed is:

1. A method comprising:
   selecting a registered route of a work vehicle system, the registered route including one or more task points each of which including a geographical location;
   capturing first data of an agricultural item before a particular agricultural task is performed by a work vehicle at a particular task point of the one or more task points;
   controlling, by a processor, the work vehicle to perform the particular agricultural task at the particular task point;
   capturing second data of the agricultural item after the particular agricultural task is performed at the particular task point; and
   displaying the first data of the agricultural item and the second data of the agricultural item on a display; wherein
   the work vehicle is controlled to stop at the particular task point for a predetermined period of time and the work vehicle remains stopped and does not move between a time when the first data of the agricultural item is captured and a time when the second data of the agricultural item is captured.

2. The method of claim 1, wherein
   the particular agricultural task includes pruning the agricultural item.

3. The method of claim 1, wherein
   the first data of the agricultural item includes first image data of the agricultural item before the particular agricultural task is performed at the particular task point; and
   the second data of the agricultural item includes second image data of the agricultural item after the particular agricultural task is performed at the particular task point.

4. The method of claim 1, wherein
   the first data of the agricultural item includes first three-dimensional data of the agricultural item before the particular agricultural task is performed at the particular task point; and
   the second data of the agricultural item includes second three-dimensional data of the agricultural item after the particular agricultural task is performed at the particular task point.

5. The method of claim 1, further comprising:
   capturing third data of the agricultural item during the particular agricultural task being performed at the particular task point.

6. The method of claim 5, wherein the third data of the agricultural item includes image data of the agricultural item and/or three-dimensional data of the agricultural item.

7. The method of claim 1, further comprising:
   selecting the particular agricultural task for the work vehicle to perform at the one or more task points when the work vehicle follows the registered route.

8. The method of claim 1, wherein the first data of the agricultural item and the second data of the agricultural item are displayed on a same screen of the display.

9. A method comprising:
   selecting a registered route of a work vehicle system, the registered route including one or more task points each of which including a geographical location;
   capturing first data of an agricultural item before a particular agricultural task is performed by a work vehicle at a particular task point of the one or more task points;

controlling, by a processor, the work vehicle to perform the particular agricultural task at the particular task point;

capturing second data of the agricultural item after the particular agricultural task is performed at the particular task point; and displaying the first data of the agricultural item and the second data of the agricultural item on a display; wherein each of the first data of the agricultural item and the second data of the agricultural item is associated with an agricultural item identifier of the agricultural item; and the agricultural item identifier is displayed on the display when the first data of the agricultural item and the second data of the agricultural item are displayed on the display; and the work vehicle is controlled to stop at the particular task point for a predetermined period of time and the work vehicle remains stopped and does not move between a time when the first data of the agricultural item is captured and a time when the second data of the agricultural item is captured.

10. The method of claim 1, further comprising:
displaying, on the display, the second data of the agricultural item superimposed on the first data of the agricultural item.

11. The method of claim 1, further comprising:
controlling the work vehicle to stop at each of the one or more task points to perform the particular agricultural task.

12. The method of claim 1, further comprising:
registering the registered route in the work vehicle system; wherein
the registering the registered route in the work vehicle system includes:
controlling a route recording work vehicle to record a new route, the route recording work vehicle being the work vehicle or another work vehicle different from the work vehicle; and
saving the new route as the registered route in the work vehicle system.

13. The method of claim 12, wherein
the registering the registered route in the work vehicle system includes:
receiving an instruction to start recording the new route; and
receiving an instruction to stop recording the new route;
when the instruction to start recording the new route is received, a position of the route recording work vehicle is saved as a location of a start point of the new route; and
when the instruction to stop recording the new route is received, a position of the route recording work vehicle is saved as a location of an end point of the new route.

14. The method of claim 13, further comprising:
displaying an agricultural field map including a position of the route recording work vehicle, an area surrounding the route recording work vehicle, and the location of the start point of the new route when the instruction to start recording the new route is received; and
displaying an agricultural field map including a position of the route recording work vehicle, an area surrounding the route recording work vehicle, and the location of the end point of the new route when the instruction to stop recording the new route is received.

15. The method of claim 12, further comprising:
displaying an agricultural field map; wherein
the registering the registered route in the work vehicle system includes receiving an instruction to add the one or more task points to the new route;
when the instruction to add the one or more task points to the new route is received, a position of the route recording work vehicle is saved as a location of the one or more task points of the new route;
the agricultural field map includes a position of the route recording work vehicle, an area surrounding the route recording work vehicle, and the location of the one or more task points; and
the agricultural field map is displayed when the instruction to add the one or more task points to the new route is received.

16. The method of claim 12, wherein
the controlling the route recording work vehicle to record the new route includes manually, remotely, or autonomously controlling the route recording work vehicle.

17. The method of claim 1, further comprising:
registering the registered route in the work vehicle system; wherein
the registering the registered route in the work vehicle system includes adding the one or more task points to the registered route using at least one of artificial intelligence or an object detection system.

18. The method of claim 1, further comprising:
registering the registered route in the work vehicle system; wherein
the registering the registered route in the work vehicle system includes adding the one or more task points to the registered route using a user interface.

19. A work vehicle system comprising:
one or more processors;
a user interface including an input to receive one or more inputs from a user and a display; wherein
the one or more processors are operatively connected to the input and the display of the user interface; wherein
the one or more processors are configured or programmed to:
  select, based on the one or more inputs received by the input, a registered route of the work vehicle system, the registered route including one or more task points each of which including a geographical location;
  receive first data of an agricultural item before a particular agricultural task is performed by a work vehicle at a particular task point of the one or more task points;
  control the work vehicle to perform the particular agricultural task at the particular task point;
  receive second data of the agricultural item after the particular agricultural task is performed at the particular task point; and
  control the display to display the first data of the agricultural item and the second data of the agricultural item; and
the work vehicle is controlled to stop at the particular task point for a predetermined period of time and the work vehicle remains stopped and does not move between a time when the first data of the agricultural item is received and a time when the second data of the agricultural item is received.

* * * * *